INVENTORS
NEAL ZIERLER
JOHN TERZIAN
BY Kenway, Jenney & Hildreth
ATTORNEYS

INVENTORS
NEAL ZIERLER
JOHN TERZIAN
BY
Kenway, Jenney & Hildreth
ATTORNEYS

INVENTORS
NEAL ZIERLER
JOHN TERZIAN
BY
Kenway, Jenney & Hildreth
ATTORNEYS

INVENTORS
NEAL ZIERLER
JOHN TERZIAN
BY
Kenway, Jenney & Hildreth
ATTORNEYS

INVENTORS
NEAL ZIERLER
JOHN TERZIAN
BY Kenway, Jenney & Hildreth
ATTORNEYS

ERROR CORRECTING DIGITAL CODING AND DECODING APPARATUS

Filed June 15, 1967

INVENTORS
NEAL ZIERLER
JOHN TERZIAN
BY
Kenway, Jenney & Hildreth
ATTORNEYS

Oct. 6, 1970 N. ZIERLER ET AL 3,533,067

ERROR CORRECTING DIGITAL CODING AND DECODING APPARATUS

Filed June 15, 1967 19 Sheets-Sheet 7

INVENTORS
NEAL ZIERLER
JOHN TERZIAN

BY Kenway, Jenney & Hildreth
ATTORNEYS

ERROR CORRECTING DIGITAL CODING AND DECODING APPARATUS

Filed June 15, 1967 19 Sheets-Sheet 8

INVENTORS
NEAL ZIERLER
JOHN TERZIAN
BY
Kenway, Jenney & Hildreth
ATTORNEYS

INVENTORS
NEAL ZIERLER
JOHN TERZIAN
BY
Kenway, Jenney & Hildreth
ATTORNEYS

INVENTORS
NEAL ZIERLER
JOHN TERZIAN
BY Kenway, Jenney & Hildreth
ATTORNEYS

INVENTORS
NEAL ZIERLER
JOHN TERZIAN
BY Kenway, Jenney & Hildreth
ATTORNEYS

INVENTORS
NEAL ZIERLER
JOHN TERZIAN
BY
Kenway, Jenney & Hildreth
ATTORNEYS

INVENTORS
NEAL ZIERLER
BY JOHN TERZIAN

Kenway, Jenney & Hildreth
ATTORNEYS

ERROR CORRECTING DIGITAL CODING AND DECODING APPARATUS

Filed June 15, 1967 19 Sheets-Sheet 14

INVENTORS
NEAL ZIERLER
JOHN TERZIAN
BY Kenway, Jenney & Hildreth
ATTORNEYS

Oct. 6, 1970 N. ZIERLER ET AL 3,533,067

ERROR CORRECTING DIGITAL CODING AND DECODING APPARATUS

Filed June 15, 1967 19 Sheets-Sheet 15

INVENTORS
NEAL ZIERLER
JOHN TERZIAN
BY Kenway, Jenney & Hildreth
ATTORNEYS

Oct. 6, 1970 N. ZIERLER ET AL 3,533,067

ERROR CORRECTING DIGITAL CODING AND DECODING APPARATUS

Filed June 15, 1967 19 Sheets-Sheet 16

INVENTORS
NEAL ZIERLER
JOHN TERZIAN

BY Kenway, Jenney & Hildreth
ATTORNEYS

ERROR CORRECTING DIGITAL CODING AND DECODING APPARATUS

Filed June 15, 1967

INVENTORS
NEAL ZIERLER
JOHN TERZIAN
BY
Kenway, Jenney & Hildreth
ATTORNEYS

INVENTORS
NEAL ZIERLER
JOHN TERZIAN
BY Kenway, Jenney & Hildreth
ATTORNEYS

ERROR CORRECTING DIGITAL CODING AND DECODING APPARATUS

INVENTORS
NEAL ZIERLER
JOHN TERZIAN
BY Kenway, Jenney & Hildreth
ATTORNEYS

United States Patent Office 3,533,067
Patented Oct. 6, 1970

3,533,067

ERROR CORRECTING DIGITAL CODING AND DECODING APPARATUS

Neal Zierler, Lexington, and John Terzian, Winchester, Mass., assignors to Mitre Corporation, Bedford, Mass., a corporation of Delaware Filed June 15, 1967, Ser. No. 646,343
Int. Cl. G06f 11/12, 7/38
U.S. Cl. 340—146.1 10 Claims

ABSTRACT OF THE DISCLOSURE

Apparatus for coding and decoding $m$-bit digital signals in an error correcting code characterized by blocks of $m$-bit signals of fixed length including signals representing message symbols and signals representing check symbols, the latter being computed so that a predetermined number of symbol errors can be detected and corrected by evaluating functions of the contents of the block. The apparatus comprises a memory, a finite field arithmetic unit, and sequencing means for exchanging information between the memory and the arithmetic unit to perform rapid calculations, such as the evaluation of polynomials and matrix reductions, in finite field arithmetic. The full specification should be consulted for an understanding of the invention.

Our invention relates to digital data processing, and particularly to novel apparatus for coding and decoding digital information in an error correcting code.

Digital communication channels, which may include wire links, radio links, or both, are subject to error rates that generally increase with the bit rate of information transfer and are directly affected by noise in the channel. Radio transmission channels are associated with particularly high error rates caused by noise, fading and interference. Various expedients have been devised for using channels of this kind. All involve a compromise between channel bandwidth, cost and complexity of transmitting and receiving equipment, and the useful bit rate of information transfer.

In many instances, it is necessary to use a communication channel of limited bandwidth and quality, and economics dictates definite upper limits on the cost and complexity of the transmitting and receiving equipment. Under those circumstances, it is necessary to introduce sufficient redundancy into the data transmitted so that the existing error rate can be tolerated.

One approach is to simply repeat the transmitted information until it can be assumed to have been received. A more efficient method, effective when some errors are permissible, is to employ an error detecting code, such as those codes in which parity bits are included. Using such a code, a class of errors can be detected at the receiving end of the channel, making it possible to request re-transmission of information in which an error has been detected. In principle, a much more powerful approach is to transmit the information in an error-correcting code. Many such codes have been developed, and they share the property that redundant information is incorporated in the transmitted data in such a way that the data can be reconstituted if no more than a predetermined number of randomly distributed errors have occurred. Some error correcting codes are impractical, because they involve too high a degree of redundancy for the number of errors that can be corrected, thereby defeating the purpose of a high speed communication channel. Prior to our invention, even those codes involving an acceptable degree of redundancy have found little use, because either they are relatively ineffective or the apparatus required to decode the information and correct any errors that may be found has been too complex and costly. The object of our invention is to facilitate the coding and decoding of information in an error-correcting code, thereby making it practical to use the code in digital communication channels.

The codes usable with the apparatus of our invention are of a class in which code blocks are employed. Each code block includes a group of $m$-bit symbols each representing a data character, and a group of $m$-bit check symbols computed from the data symbols, the total number of symbols in each block being a constant. If data is so encoded, and certain additional constraints to be described below are observed, so long as there remains a number of correct symbols in the block equal to the number of data symbols plus at least half of the check symbols, then the other symbols can be corrected even though each bit in each of them is in error. Moreover, if there are additional symbols in error, it is possible to discover that there are too many errors to correct and take appropriate action. The two functions which the apparatus of our invention is especially adapted to perform are the coding of data into error correcting code blocks and the performance of the decoding process on data so encoded. Following the decoding of a block of signals, the apparatus will either supply the decoded data in corrected form to a data sink, or provide an indication that an uncorrectable number or errors have occurred.

Briefly, the apparatus of our invention comprises a random access memory, a finite field arithmetic unit, and sequencing means for exchanging information between the memory and the arithmetic unit. A buffer is provided for exchanging information between this apparatus and a communications link, and means are provided for supplying decoded information to a data sink.

The finite field arithmetic unit includes a set of registers, a finite field adder, and a finite field multiplier. The sequencing means comprises apparatus for storing a block of encoded data in the memory, and thereafter sequentially making a predetermined set of interconnections between the memory and the various components of the arithmetic unit. During coding, the apparatus computes the check symbols needed to provide a complete code block. During decoding, the apparatus progressively detects any errors that are present in the encoded data, provides an indication if there are too many to correct, computes the correct data when a suitably limited number of errors have been detected, and supplies the corrected and decoded data to the data sink.

The apparatus of our invention, and its mode of operation, will best be understood in the light of the following detailed description, together with the accompanying drawings, of a preferred embodiment thereof.

Figure 1:
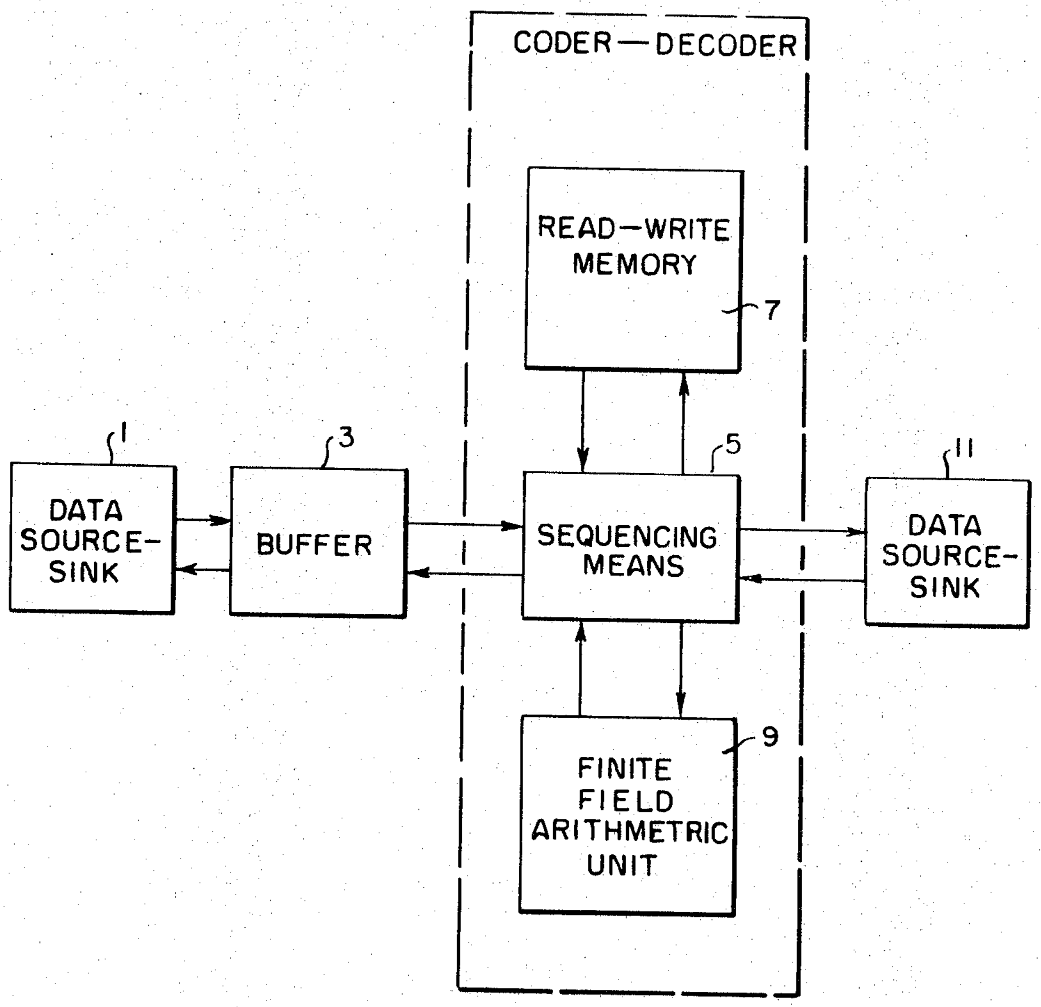
FIG. 1 is a block diagram of coding and decoding apparatus in accordance with our invention connected as a station in a communication link.
Figure 2:
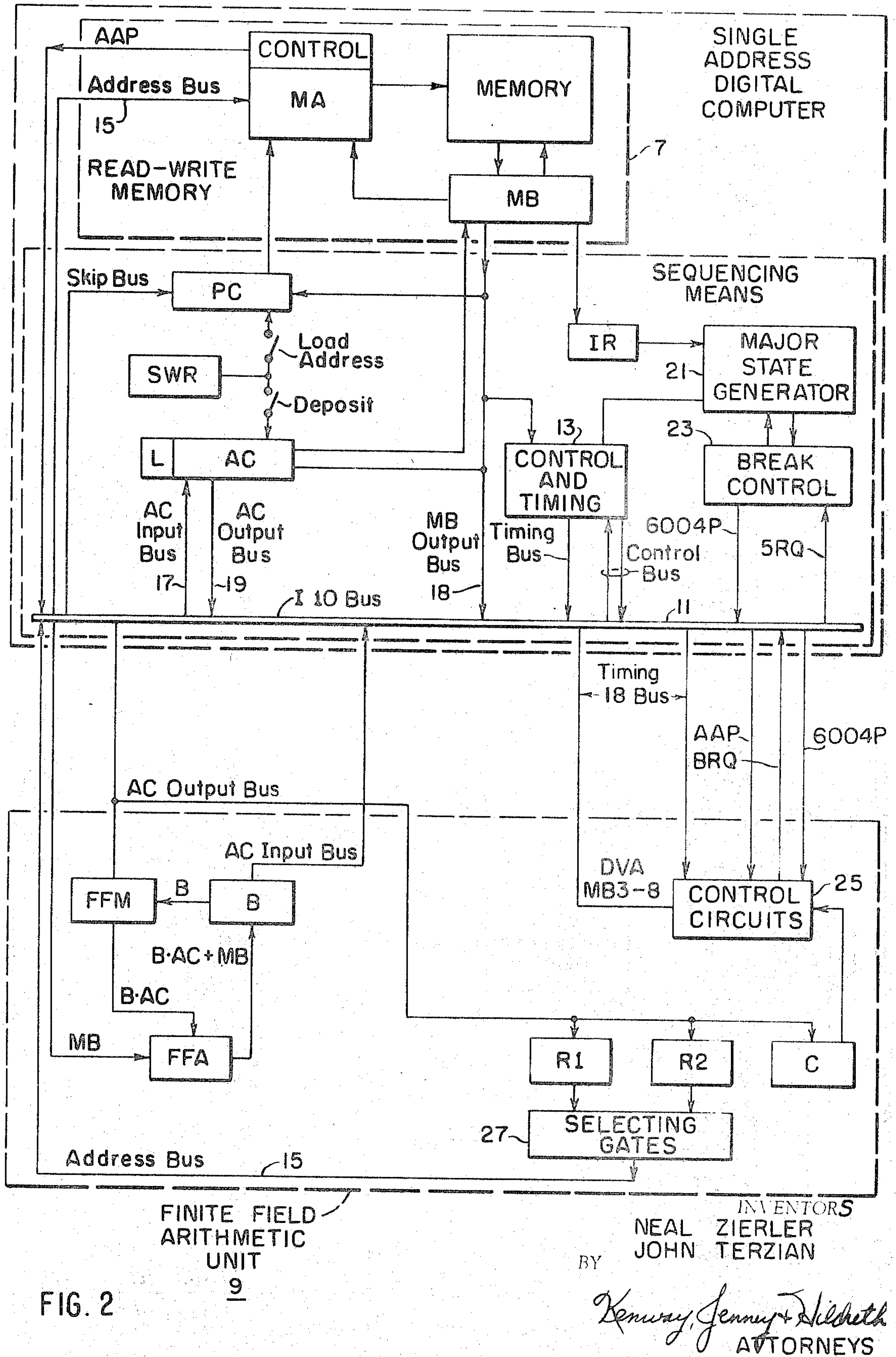
FIG. 2 is a block diagram showing portions of the apparatus of FIG. 1 in somewhat more detail.
Figure 12A:
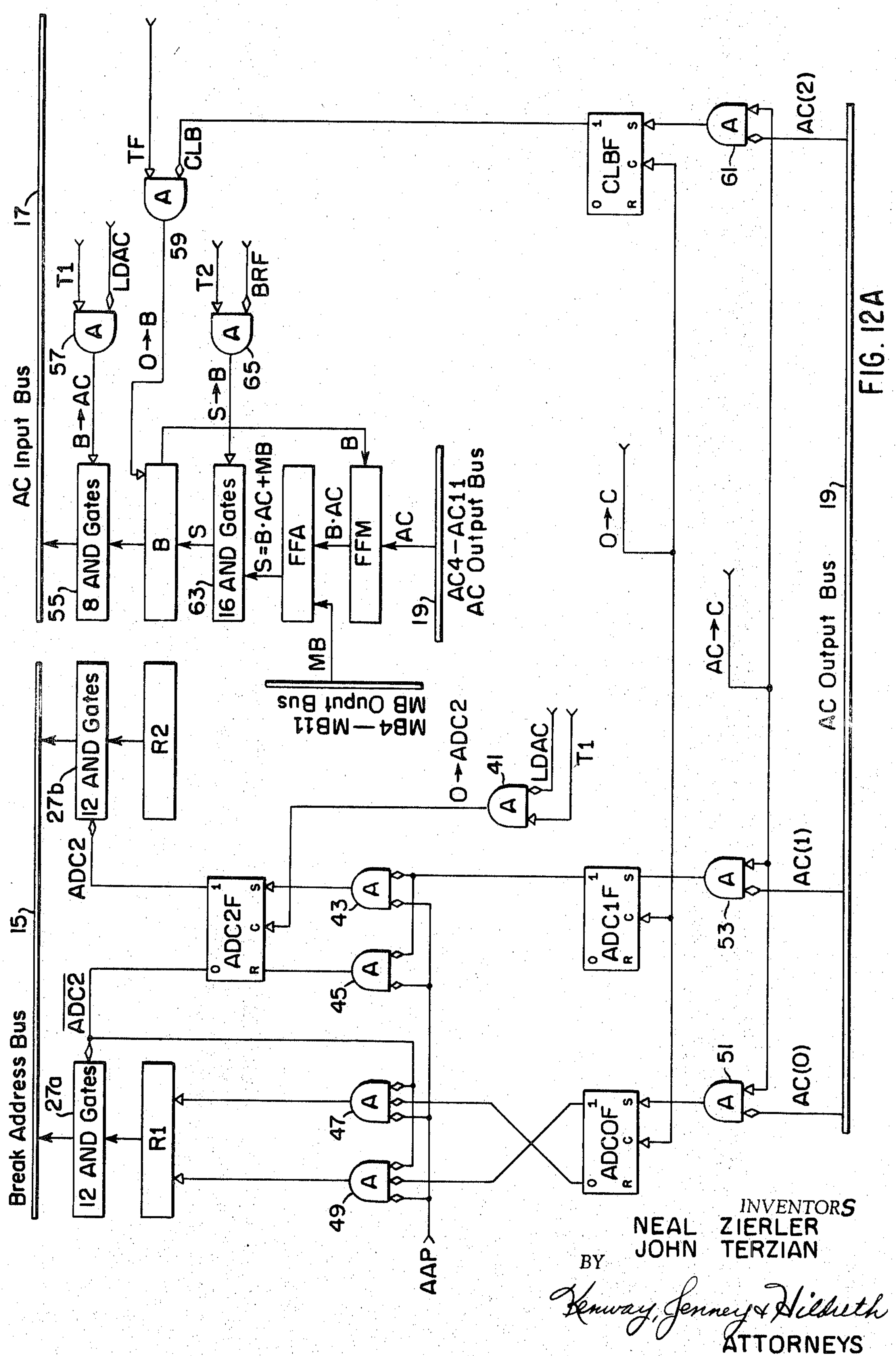
Figure 12B:
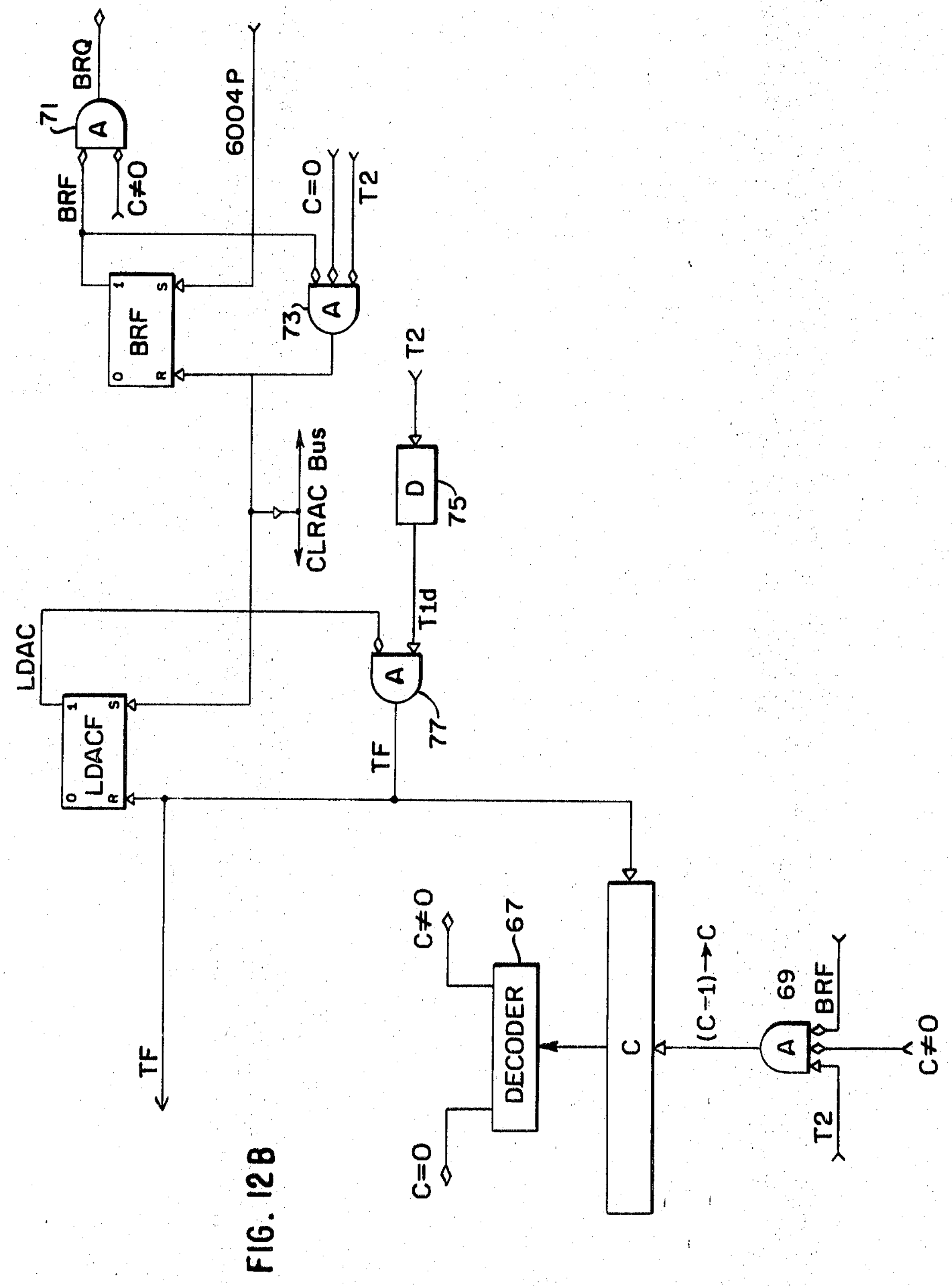
Figure 13A:
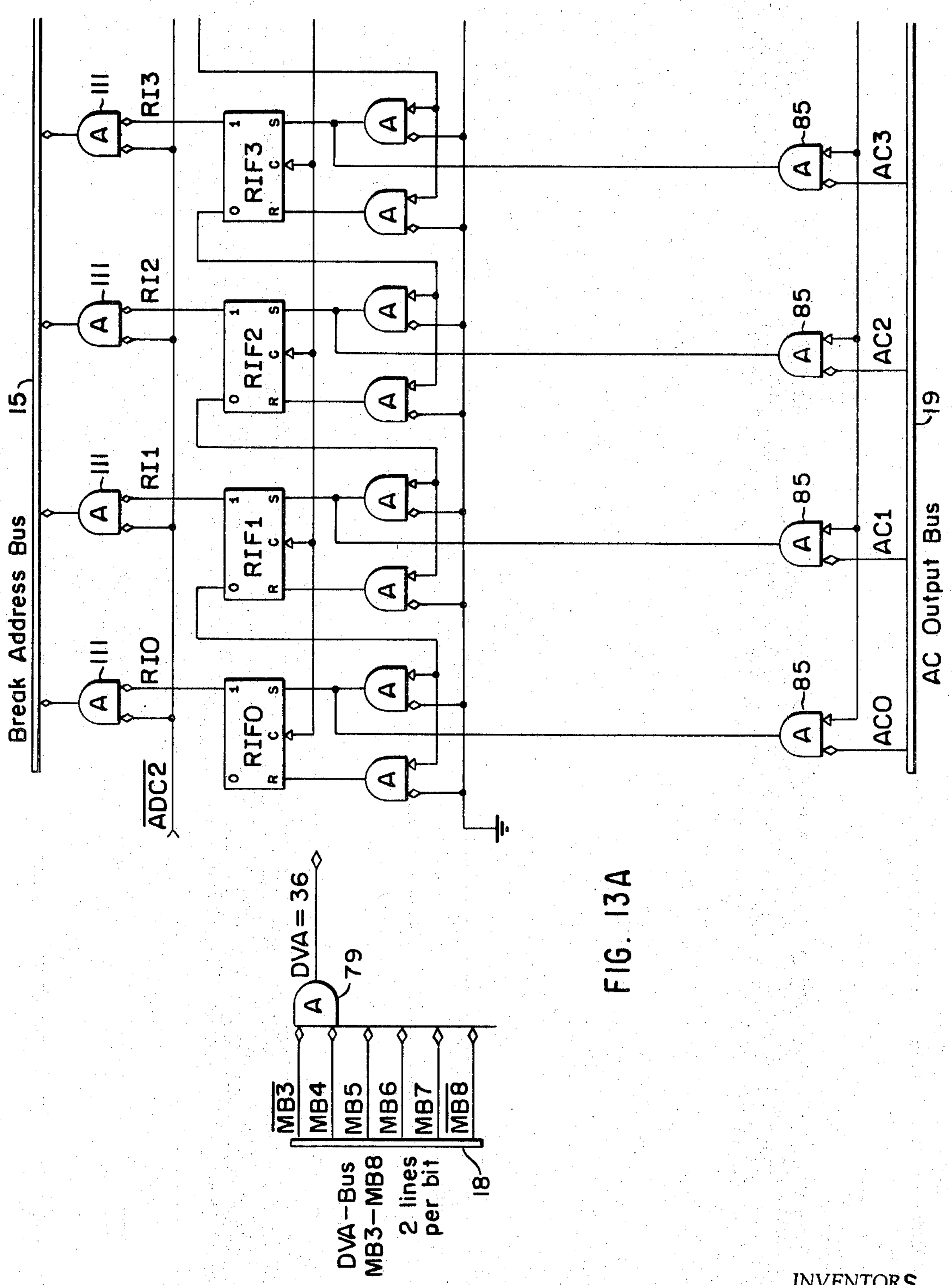
Figure 13B:
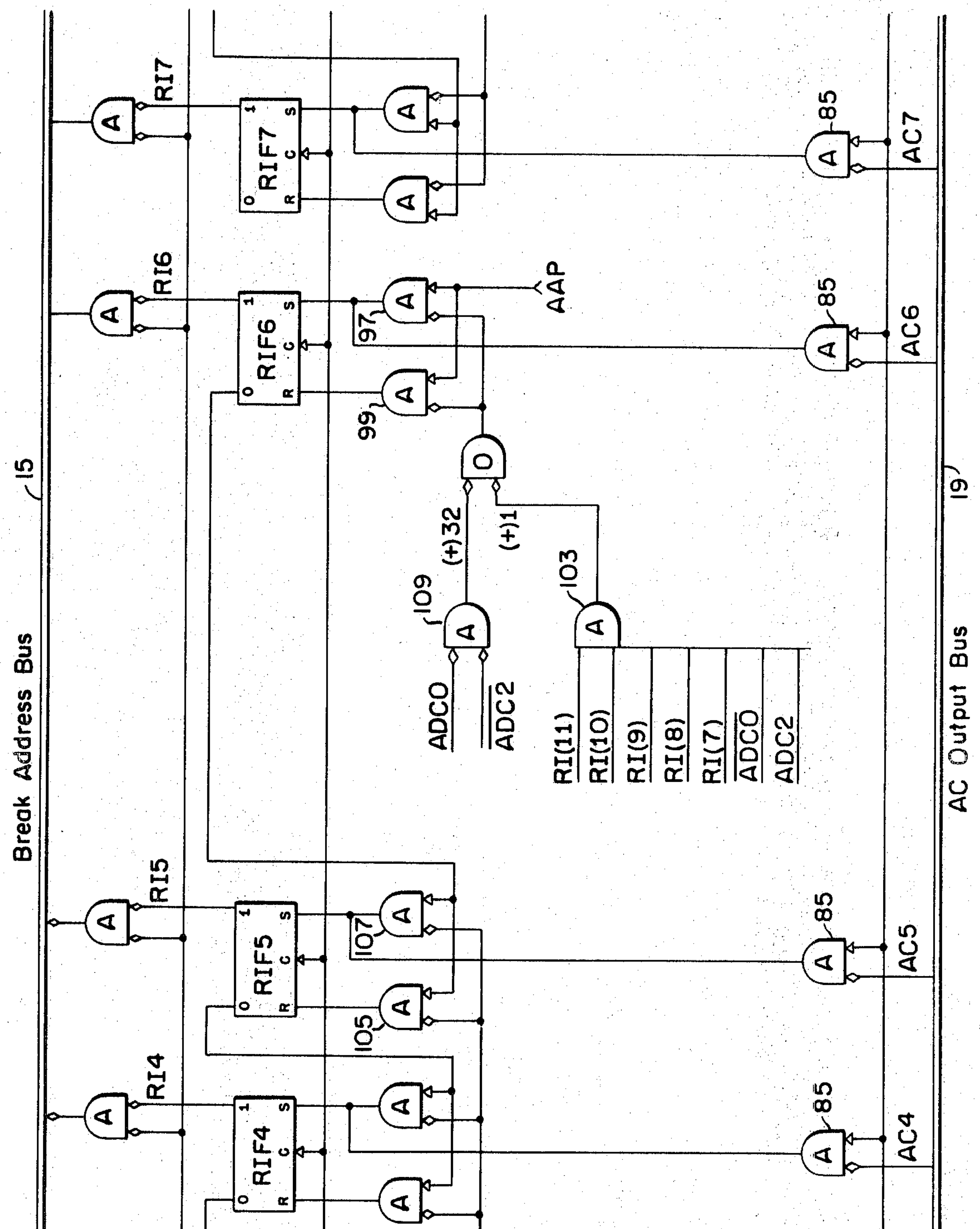
Figure 13C:
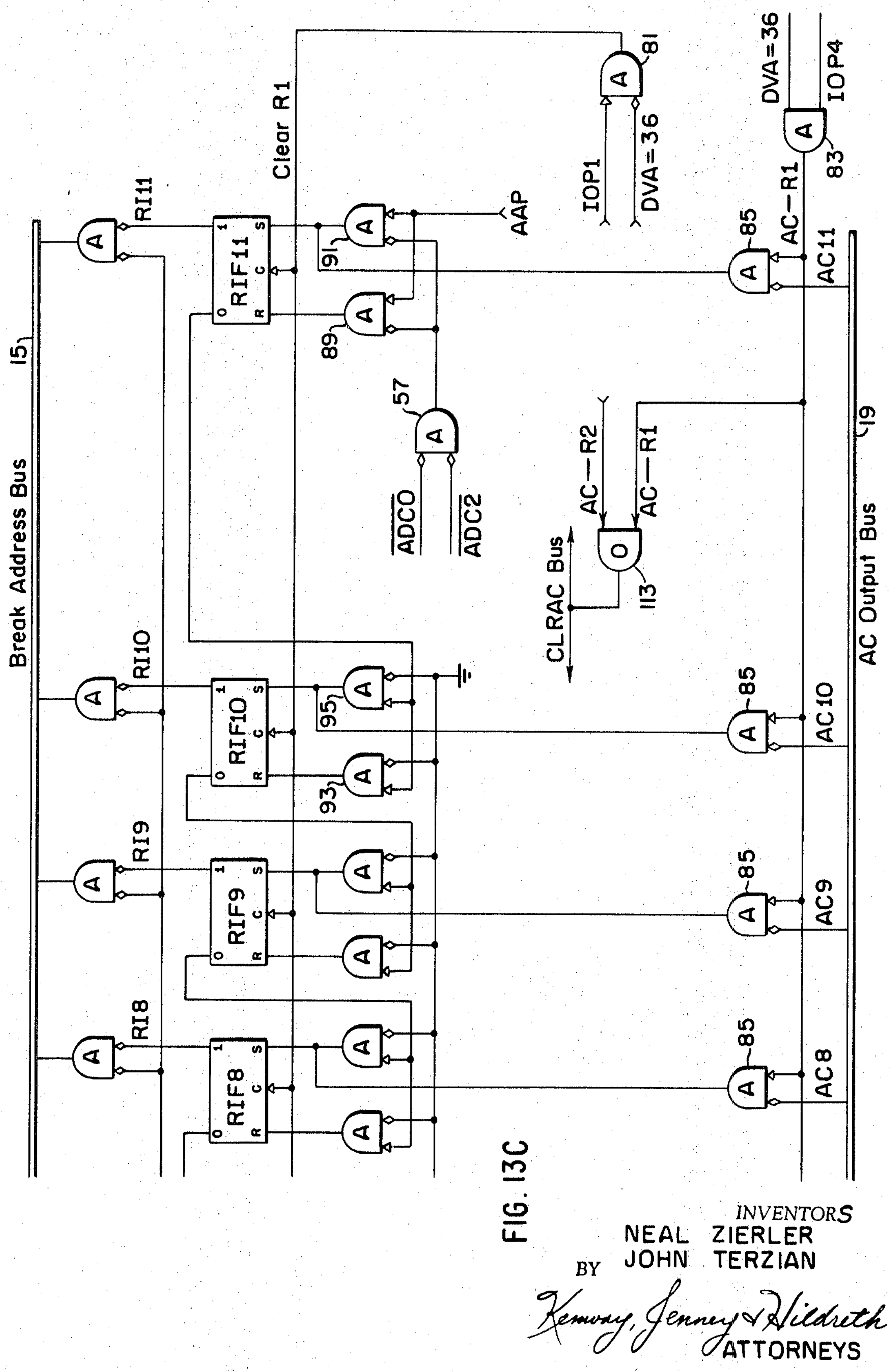
Figure 14:
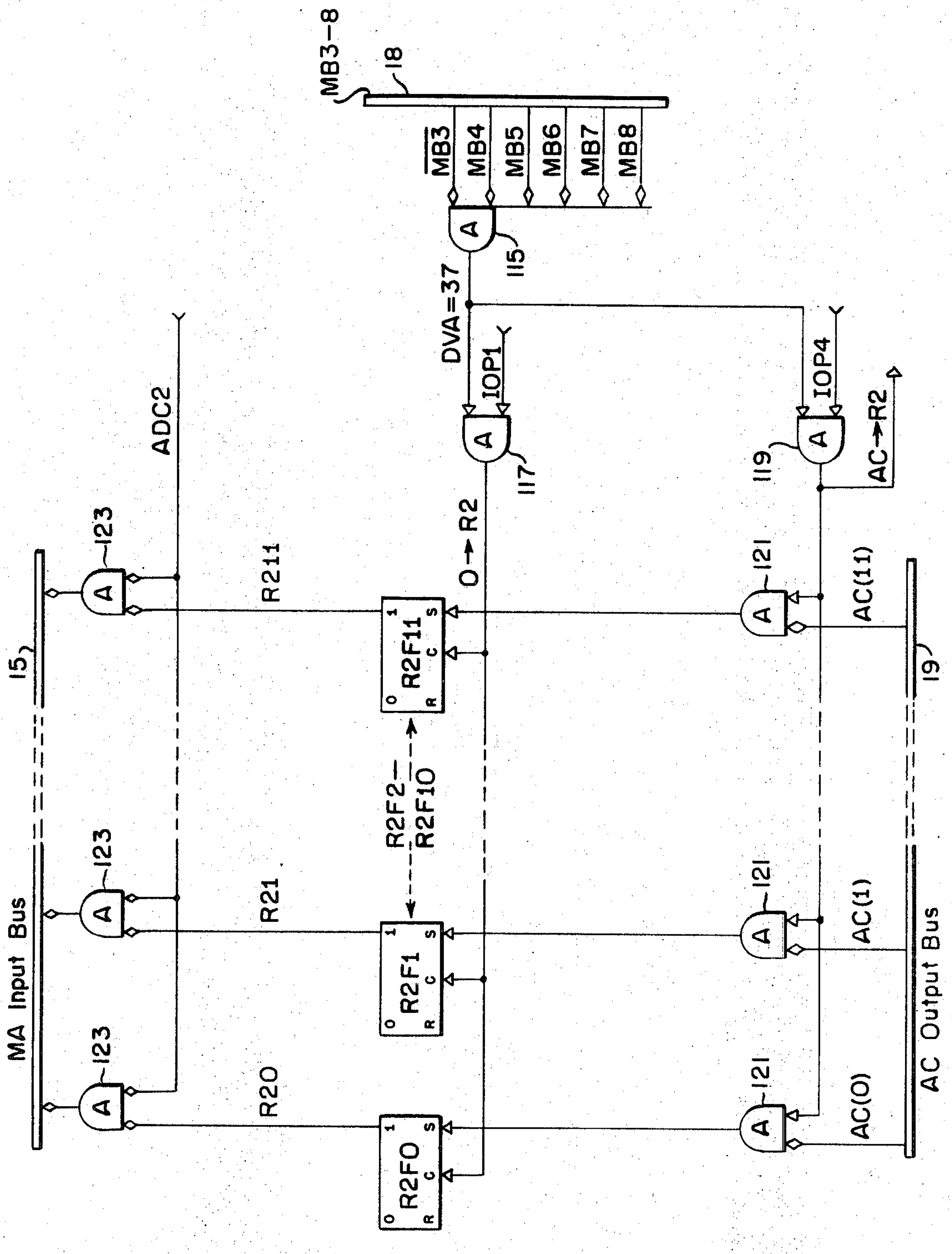
Figure 15:
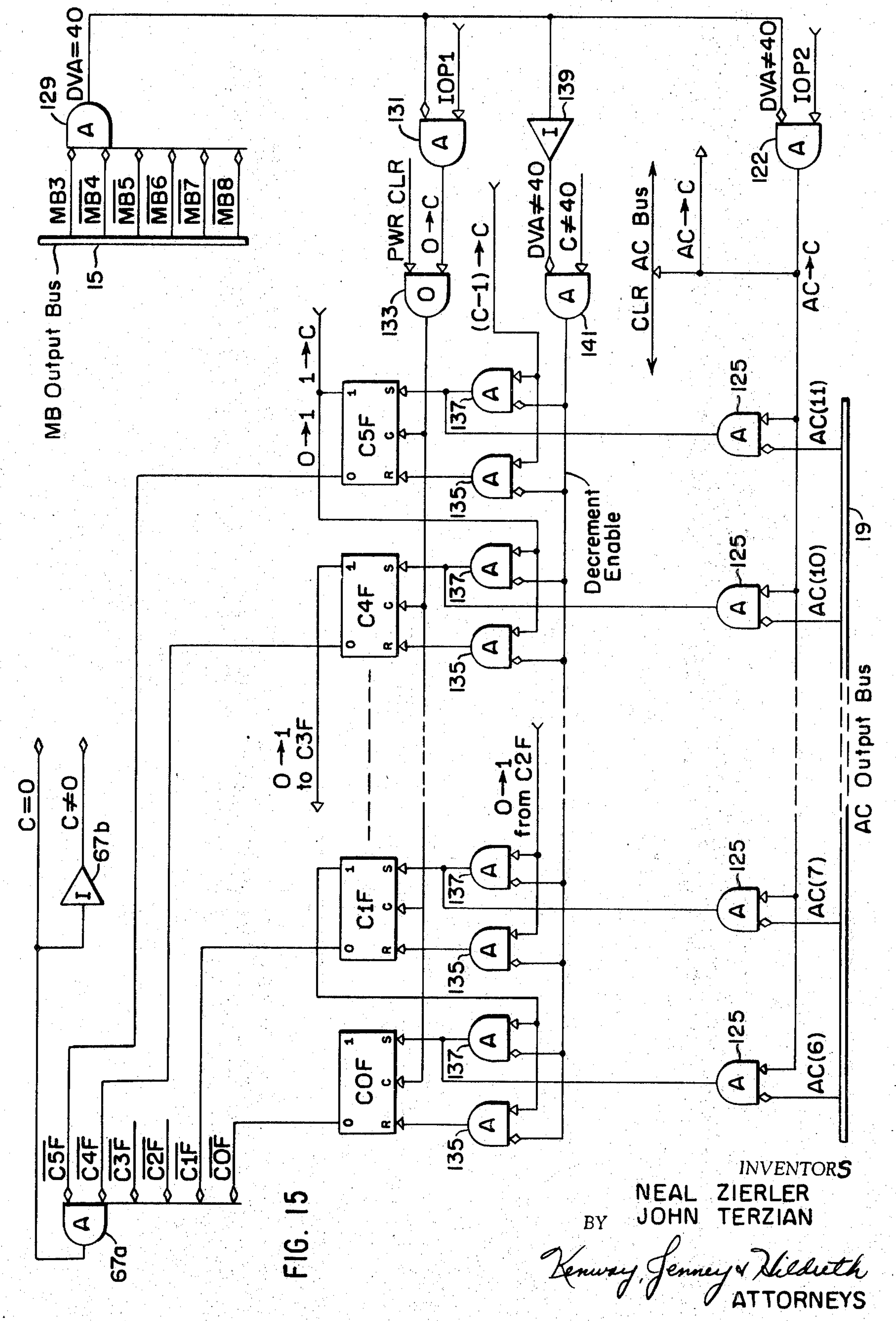
Figure 16:
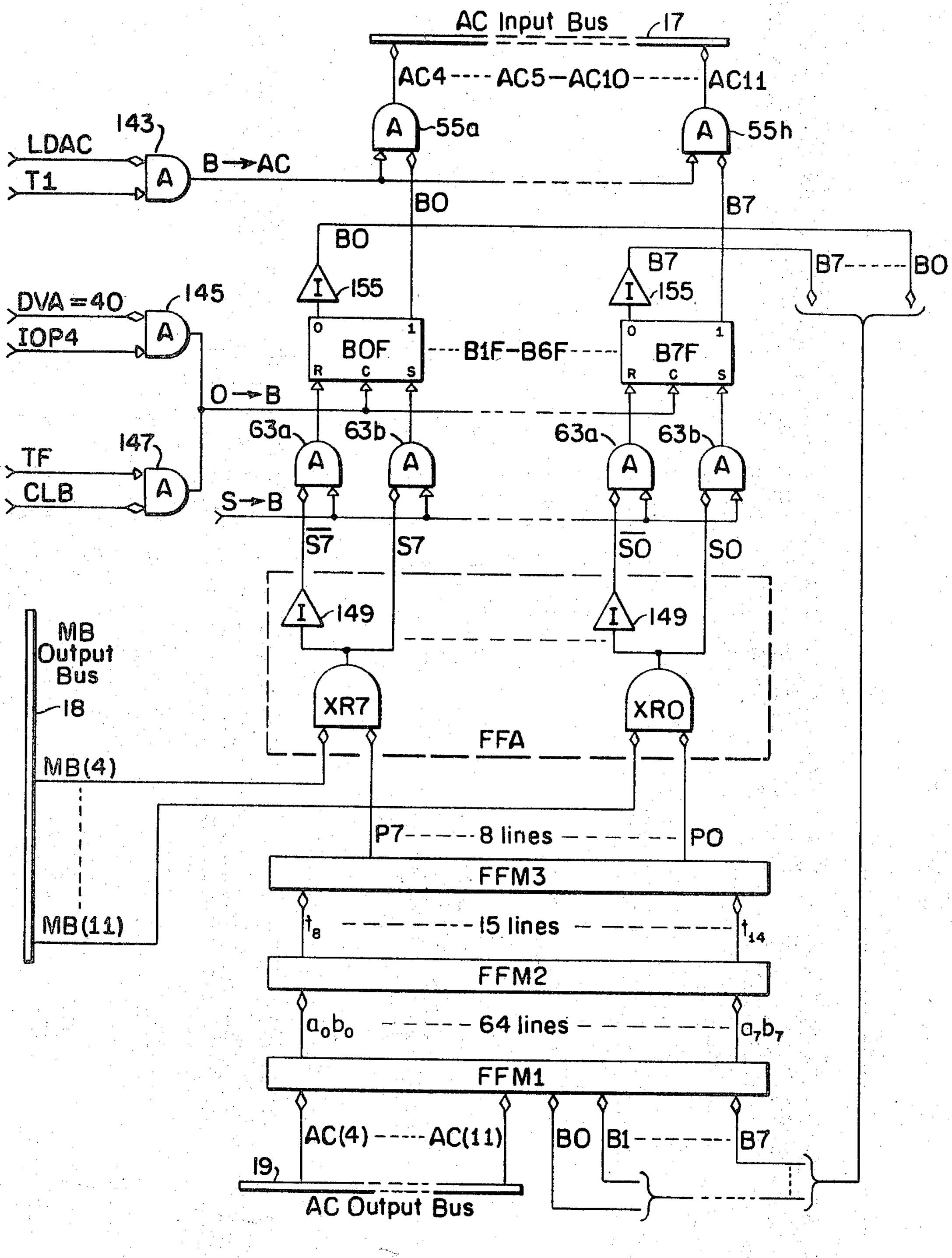
Figure 20:
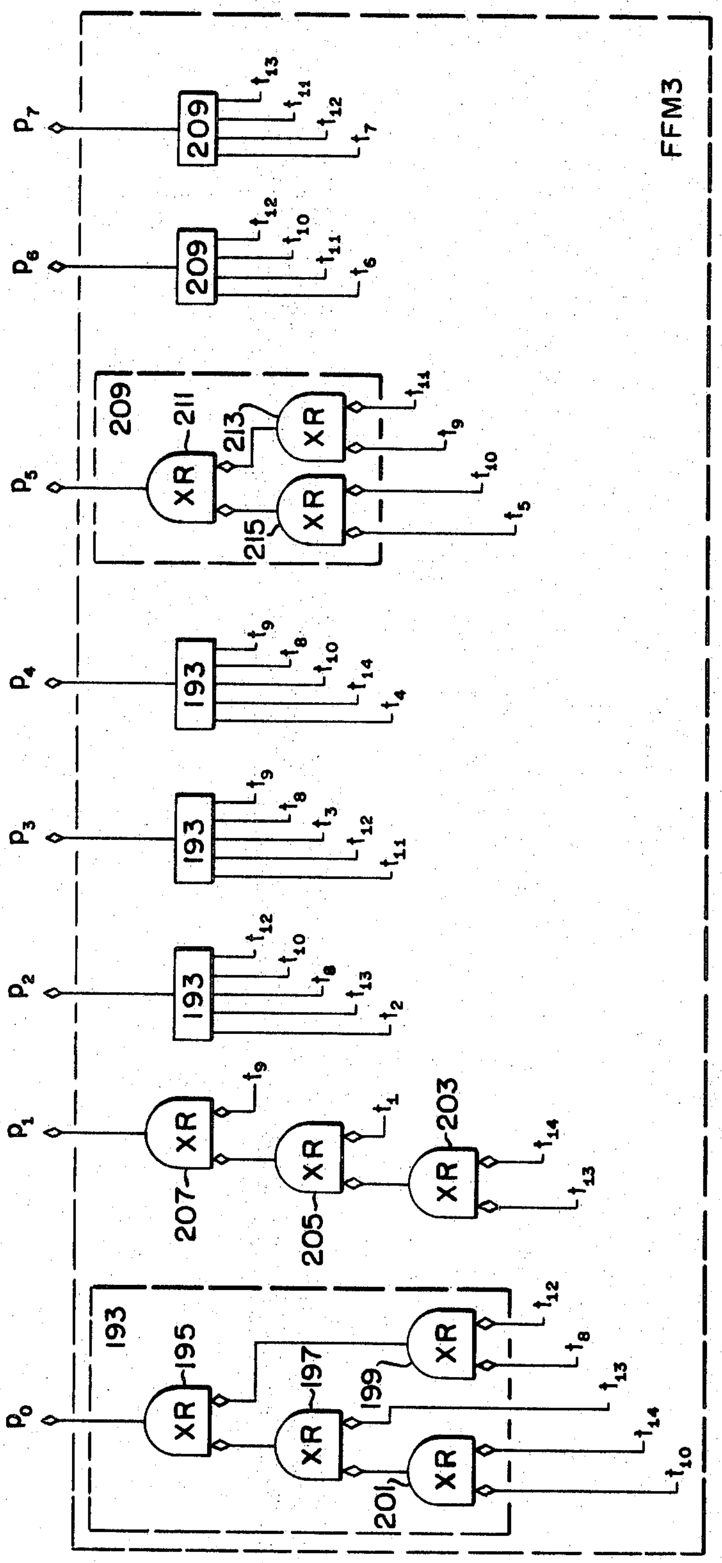
Figure 17:
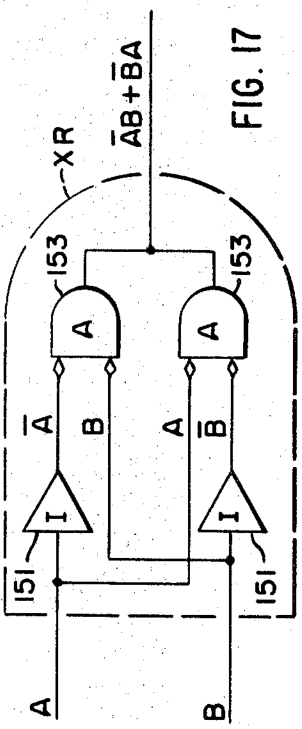
Figure 18:
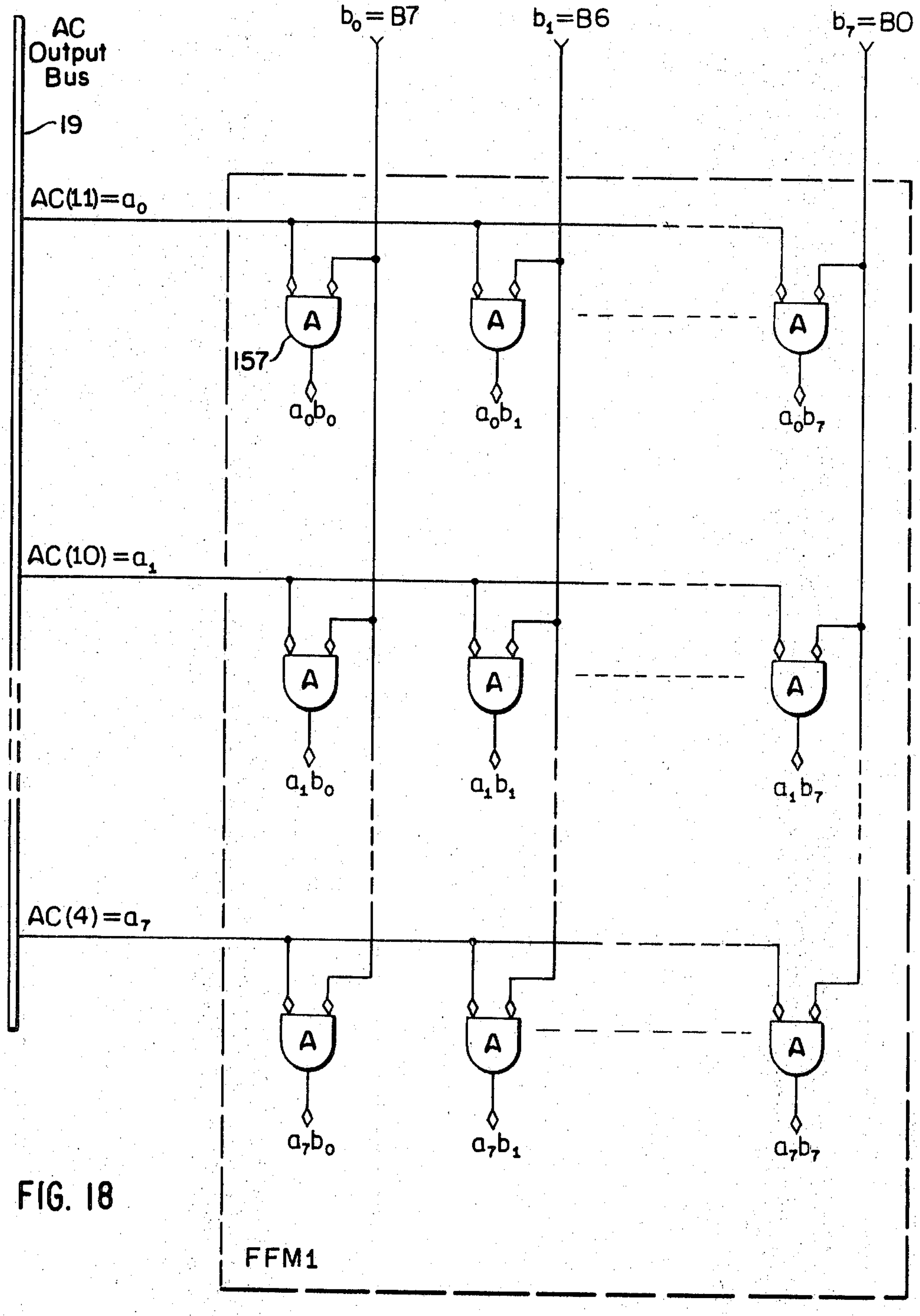
Figure 19:
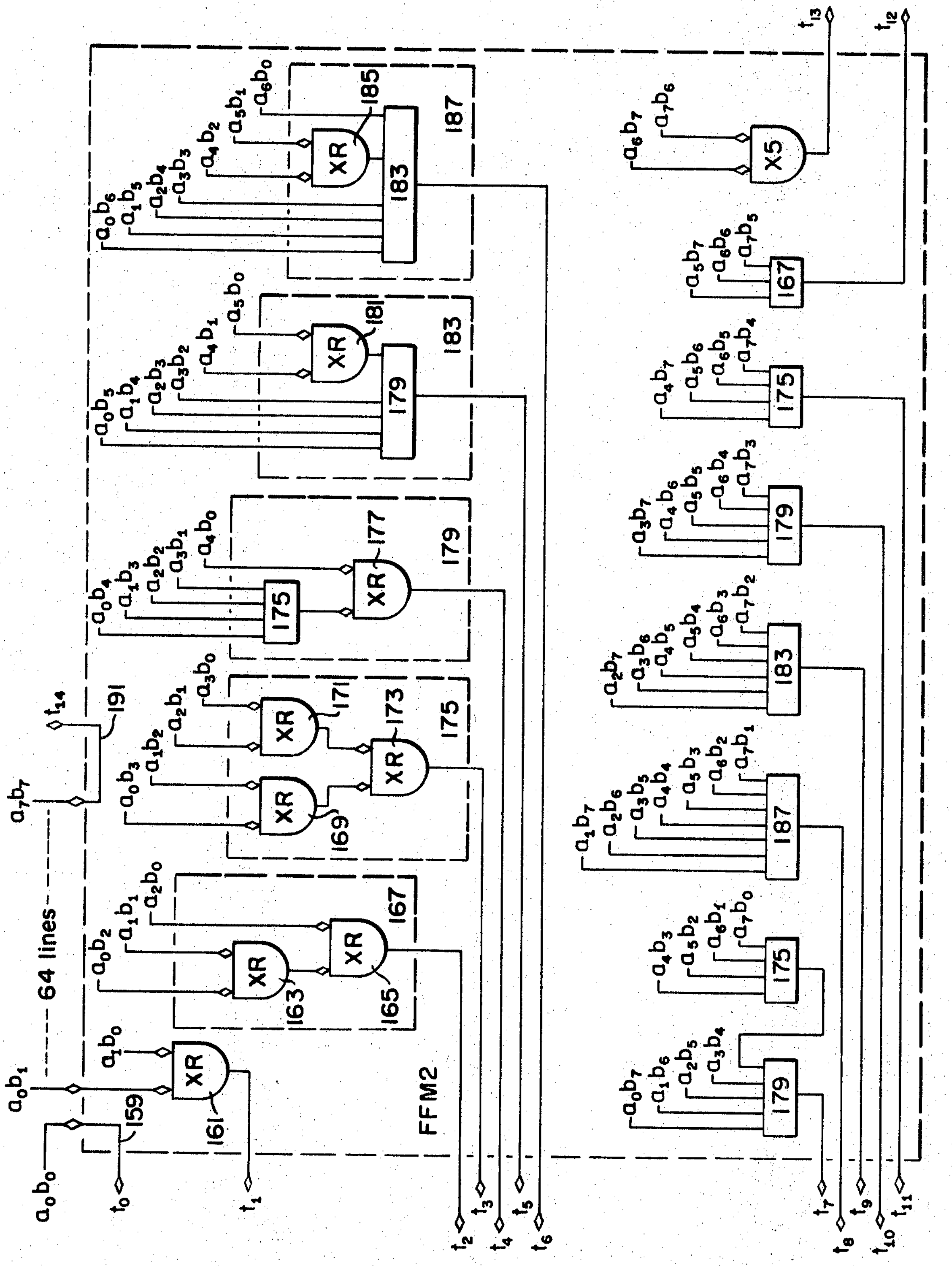
Figure 21:
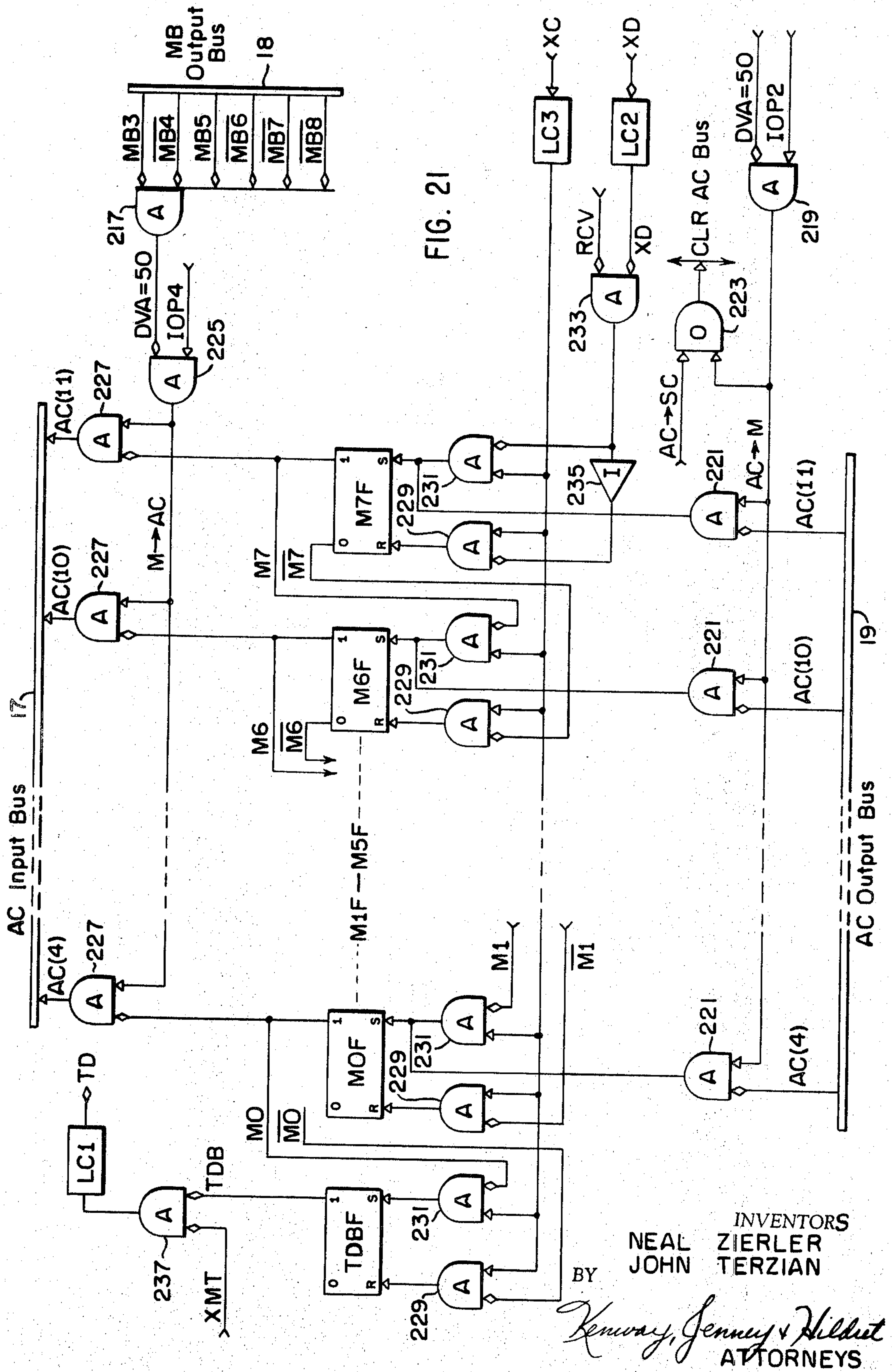
Figure 22:
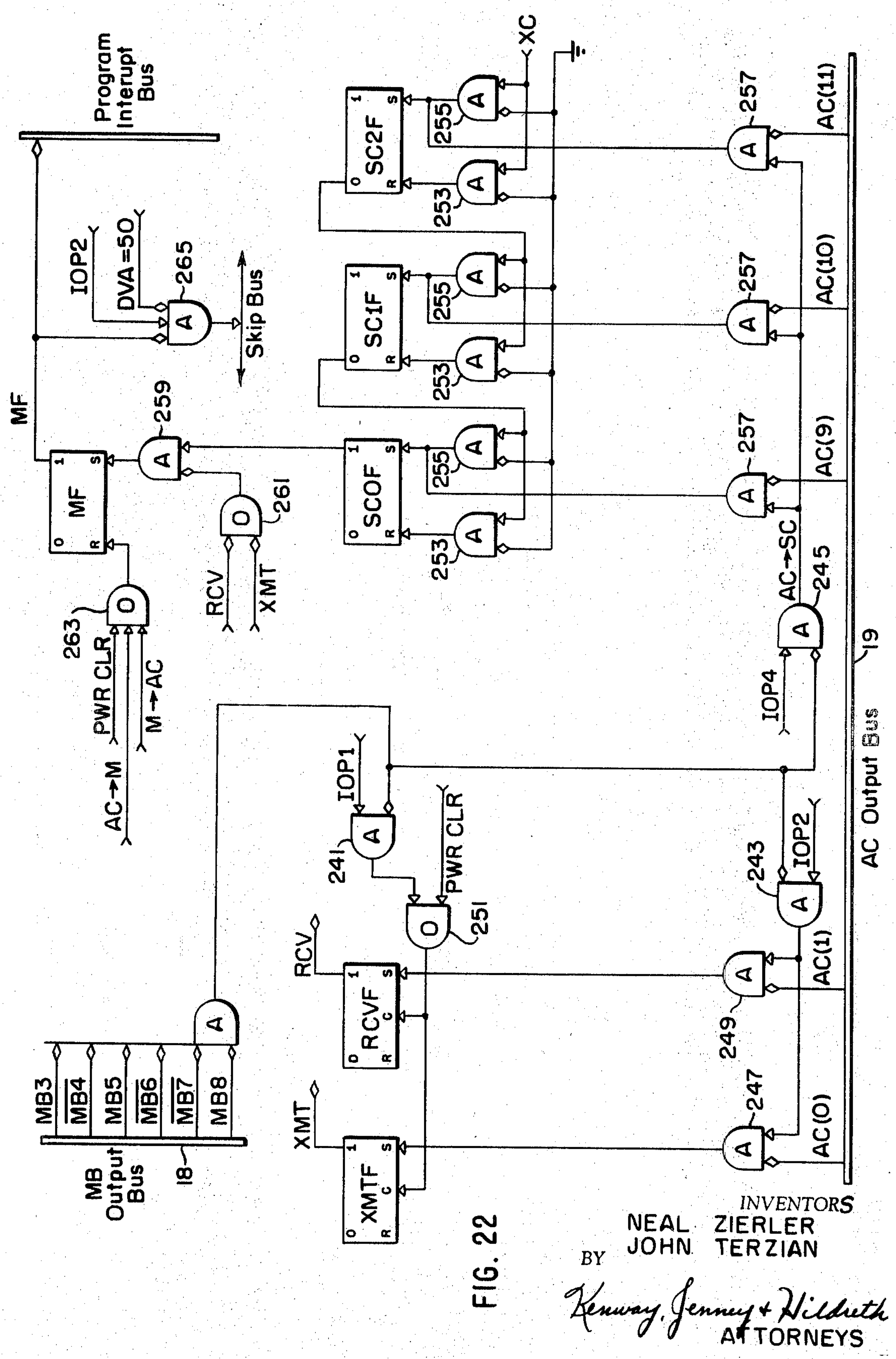

FIGS. 12A and 12B comprise a schematic diagram illustrating a portion of the apparatus of FIGS. 1 and 2 in more detail;

FIGS. 13A, 13B and 13C together comprise a schematic wiring diagram of an address control register forming a part of the apparatus of FIGS. 1 and 2;

FIG. 14 is a schematic wiring diagram of another address control register forming a part of the apparatus of FIGS. 1 and 2;

FIG. 15 is a schematic wiring diagram of a cycle counter forming a part of the apparatus of FIGS. 1 and 2;

FIG. 16 is a schematic wiring diagram of the arithmetic circuits in the finite field arithmetic unit forming a part of the apparatus of FIGS. 1 and 2;

FIG. 17 is a schematic wiring diagram showing the details of an exclusive OR gate used extensively in the apparatus shown in the other figures;

FIG. 18 is a schematic wiring diagram showing in more detail a portion of a finite field multiplier forming a part of the apparatus of FIG. 16;

FIG. 19 is a schematic wiring diagram of a second portion of the finite field multiplier of the apparatus of FIG. 16;

FIG. 20 is a schematic wiring diagram of a third portion of the finite field multiplier apparatus as shown in FIG. 16;

FIG. 21 is a schematic wiring diagram of an external data buffer forming a part of the apparatus of FIG. 1;

FIG. 22 is a schematic wiring diagram of control circuits for the external data buffer shown in FIG. 21.

Prior to a description of the apparatus of our invention, the class of codes with which it is useful will be described, and the mathematical principles upon which the operation of the apparatus can be explained will be developed.

The family of codes with which our invention is concerned are symbol-correcting block codes. Data is encoded in blocks of $n$ $m$-bit symbols, of which $2e$ are check symbols and $n-2e$ are information symbols, where $e$ is the number of symbol errors that can be corrected in a code block. $n$ is chosen to equal $2^m-1$. For example, in one practical embodiment of our invention in which data is represented in an 8 bit binary code, the value of $m$ would be 8, the value of $n$ would be 255, or 255 symbols per block, and there would be $m \times n$, or 2040 bits per block. Provision was made for the correction of up to 32 symbol errors, giving $e$ the value of 32. Accordingly, there were 64 check symbols included in a block, and 191 information symbols. Seventy-five percent of the data in a block would thus be the desired information, a very low redundancy for the error correction capability provided.

In encoding, the information symbols taken from the data source are not changed. However, they are treated, regardless of their original significance, as elements of a finite field defined as the set of all possible $m$-bit numbers. In computing the check symbols, which would necessarily also be elements of the finite field, a special $m$-bit arithmetic is used that is characterized by the property that all arithmetic operations between elements of the field yield results which are also elements of the field.

More specifically, addition of elements of the finite field is modulo two, defined by the relations $$0+0=1+1=0 \text{ and } 0+1=1+0=1$$

Thus, 0110+1010=1100. Addition so defined is sometimes referred to as "half-adding"; the equivalent logical function is "exclusive or."

Multiplication depends upon the representation of each non-zero member of the finite field by a different number $\alpha^i$, where $\alpha$ is a special number constituting a primitive element of the field and $i$ is a different one of the set of integers 0, 1, 2, 3 . . . $(2^m-2)$. It can be shown that for any finite field there exist one or more functions $f(\alpha^i)$, $i<m$ such that $\alpha^n=f(\alpha^i)$. For the specific 8-bit binary finite field used in the particular embodiment of our invention to be described, the relationship is $$\alpha^8=\alpha^4+\alpha^3+\alpha^2+1 \quad (1)$$

Multiplication of two elements $\alpha^r$ and $\alpha^s$ of an $m$-bit field is defined by the relationship $$\alpha^r \cdot \alpha^s=\alpha^{(r+s)} \quad (2)$$

The addition $r+s$ is to be performed modulo $2^m-1$. This means that any sum $r+s>2^m-2$, and representable as $r+s=k(2^m-1)+p$, where $k$ is an integer and $p$ is an integer such that $0 \leq p<2^m-1$, will be made equal to $p$.

Next, multiplying Equation 1 by $\alpha^i$ we obtain $$\alpha^{(8+i)}=\alpha^{(4+i)}+\alpha^{(3+i)}+\alpha^{(2+i)}+\alpha^i \quad (3)$$

By the application of Equation 3, any binary number of more than 8 bits can be converted to its 8-bit equivalent in the finite field. For example, the 10-bit number R=1001100001 may be represented as $$R=\alpha^9+\alpha^6+\alpha^5+1$$

From Equation 3, $\alpha^9=\alpha^5+\alpha^4+\alpha^3+\alpha$

By substitution, $$R=\alpha^6+\alpha^5+\alpha^5+\alpha^4+\alpha^3+\alpha+1$$

Recalling the definition of addition modulo two, evidently $\alpha^5+\alpha^5=0$ Therefore, $$R=\alpha^6+\alpha^4+\alpha^3+\alpha+1=01011011$$

It can be shown that a characteristic property of a correctly encoded code block in the code with which our invention is concerned is that the following relationships exist:

$$\sum_{i=0}^{2^m-2} B_i\alpha^{ij}=0,\ j=0,\ 1,\ 2,\ 3\ .\ .\ .\ (2e-1) \quad (4)$$

There are evidently $2e$ such equations. If $n-2e$ of the symbols B$i$ are specified as being the information symbols to be encoded, it will be apparent that the remaining $2e$ check symbols can be computed from Equations 4. That is the equivalent of the process by which the data is encoded by the apparatus of our invention to form a correctly encoded block. In practice, we find it more efficient to cause the apparatus to obtain the same results by a different process, described below.

The apparatus of our invention also serves to decode information encoded in error correcting code blocks. The received code block will consist of $n$ $m$-bit symbols $Bi'=Bi$ if no error has occurred, and $Bi'=Bi+Vi$ if there has been an error. The V$i$ are $m$-bit symbols each of which, if added modulo 2 to the corresponding correct symbol B$i$, will produce the received symbol B$i'$. Let $2e$ functions $S_j$, conveniently termed "syndromes," be defined as (5) $$S_j=\sum_{i=0}^{2^m-2} B_i'\alpha^{ij},\ j=0,\ 1,\ 2\ \ldots\ (2e-1)$$

The values of these syndromes can be calculated from the received symbols $Bi'$.

Substituting $Bi'=Bi+Vi$ (6) $$S_j=\sum_{i=0}^{2^m-2} B_i\alpha^{ij}+\sum_{i=0}^{2^m-2} V_i\alpha^{ij},\ j=0,\ 1\ \ldots\ (2e-1)$$

From Equations 4 and 6, (7) $$S_j\sum_{i=0}^{2^m-2} V_i\alpha^{ij}\ j=0,\ 1\ \ldots\ (2e-1)$$

If no errors have occurred, all of the symbols $Vi$ will be zero and the syndromes $Si$ will also be zero. If $t$ symbol errors have occurred (up to $m$ $t$-bit errors occurring in not more than $t$ symbols), $t\leq e$, then from the calculated values (5) and Equations 7, the error correcting symbols $Vi$ can be calculated. The calculations are carried out by the apparatus of our invention in a manner that can be explained upon the following principles.

Consider the set of $t$ simultaneous equations in the $t$ unknown $x_1\ \ldots\ x_t$ and the syndromes $Si$ represented in matrix form as (8) $$\begin{vmatrix} S_0 & S_1 \ldots & S_{t-1} \\ S_1 & S_2 \ldots & S_t \\ \cdot & \cdot & \cdot \\ \cdot & \cdot & \cdot \\ \cdot & \cdot & \cdot \\ S_{t-1} & S_t & S_{2t-1} \end{vmatrix} \begin{vmatrix} x_t \\ x_{t-1} \\ x_{t-2} \\ \cdot \\ \cdot \\ x_1 \end{vmatrix} = \begin{vmatrix} S_t \\ S_{t+1} \\ S_{t+2} \\ \cdot \\ \cdot \\ S_{2t-1} \end{vmatrix}$$

It can be shown that for $t\leq e$, there is a unique solution $x_1\ \ldots\ x_t$ for Equations 8. By simultaneous solution of these equations, the values $t$ and $x_1\ \ldots\ x_t$ can be found. Next, it can be shown that if $t\leq e$, there are exactly $t$ distinct solutions of the form $\alpha^i$, $0\leq i<2^n-1$ for the equation (9) $$h(y)=y^t+x_1y^{t-1}+x_2y^{t\ 2}\ \ldots\ +x_t$$

If the exponents $i$ of these solutions $\alpha^i$ are denoted by $i_1, i_2\ \ldots\ i_t$, then the data symbols in error are $Bi_1$, $Bi_2$, $\ldots$ $Bi_t$.

Having located the symbols in error, $t$ simultaneous equations in the error correcting symbols $Vi_1$, $Vi_2\ \ldots$ $Vi_t$ can be formed from Equations 7. These equations, rewritten in matrix form with $\alpha^{ij}=e_j$ (read $\alpha$ to the $i$ sub $j$ power equals $e$ sub $j$), are as follows:

(10) $$\begin{vmatrix} 1 & 1 & 1 \ldots 1 \\ e_1 & e_2 & e_3 \ldots e_t \\ e_1^2 & e_2^2 & e_3^2 \quad e_t^2 \\ \cdot & \cdot & \cdot \quad \cdot \\ e_1^{t-1} & e_2^{t-1} & \cdot \quad e_t^{t-1} \end{vmatrix} \begin{vmatrix} V_1 \\ V_2 \\ \cdot \\ \cdot \\ V_b \end{vmatrix} = \begin{vmatrix} S_0 \\ S_1 \\ \cdot \\ \cdot \\ S_{t-1} \end{vmatrix}$$

Using the values of the symbols $Vi$ computed from Equations 10, the syndromes given by Equations 6 are computed. If the value of each of these syndromes is zero, the fact that $e$ or fewer errors occurred is confirmed. If the values of any of the syndromes is not zero, more than $e$ errors occurred and the message is uncorrectable. As an example of the power of the error detection capability afforded by the apparatus of our invention, in the particular embodiment to be described with $m=8$ and $e=32$, the probability that an uncorrectable message would not be detected is less than 1 in $10^{30}$.

When the values of the error symbols have been computed and the number of errors has been confirmed, if $t\leq e$ the data is corrected and sent to the data sink. If $t>e$, an indication that the message is uncorrectable is produced so that appropriate action can be taken.

Having generally outlined the theory underlying the coding and decoding operations performed by the apparatus of our invention, we will next describe the structure of the coding and decoding apparatus. Following that description, a description of the use and mode of operation of the apparatus to perform the actual coding and decoding functions will be given.

Referring first to FIG. 1, we have shown the general organization of the apparatus in accordance with our invention for use in either coding or decoding information in an error correcting code of the kind described above. The apparatus may be used in combination with a data source-sink 1 that may be any suitable source and sink for digital signals representing message characters, such as a radio receiver and transmitter, a magnetic tape unit, or a teletypewriter or the like. Data signals are exchanged with the source-sink 1 by a buffer 3 of any conventional construction, adapted to register the signals until they can be transferred, by a squenching means 5, into storage in a conventional read-write memory 7. The coding and decoding operation is performed by a programmed exchange of information between the read-write memory 7 and a finite field arithmetic unit 9 under the control of the sequencing means 5. Upon completion of the process, the processed information is restored to the memory 7 until it can be transferred to a suitable data source-sink 11, or to the source-sink 1 through the buffer 3, under the control of the sequencing means 5. The data source-sink 11 may be a teletypewriter, high speed printer, magnetic tape, a suitably buffered radio transceiver, or the like.

While it will appear that the apparatus of our invention can take various structural forms, in one practical embodiment of the invention which we have built and tested, the apparatus comprised a finite field arithmetic unit connected to the input-output bus of a conventional internally programmed single address digital computer. Referrings to FIG. 2, the conventional computer was used to provide both the sequencing means 5 and the read-write memory 7. While other types of conventional digital computer could be employed, the particular embodiment to be described made use of the PDP–8 computer produced and sold by the Digital Equipment Corporation of Maynard, Mass.

The PDP–8 computer is a small general purpose computer of the one address, fixed word length, serial-by-word type accepting 12 bit words in parallel. It includes a 4096-word random access magnetic-core memory with a cycle time of 1.5 microseconds, facilities for indirect addressing, instruction skipping, program interruption and arithmetic operation in 12 bit, two's complement arithmetic. Exchanges of control and information between the computer and external devices such as the finite field arithmetic unit 9 are made by connections to the input-output bus 11. This bus comprises a set of leads to be described in more detail below, by means of which circuit interconnections are made under program control. The computer includes a conventional accumulator register AC, a manually controlled switch register SWR, a program counter PC, an instruction register IR, a memory buffer register MB, a memory address register MA, and a core plane memory having a capacity of 4096 12-bit words.

The memory buffer register MB comprises a 12-bit register formed by 12 conventional flip-flops and associated gates and timing circuits that perform a first function of transferring to or taking from memory a 12-bit word at the address specified by the memory access register MA. The register MB can supply an address to the memory access register MA, and can exchange information with the accumulator register AC. The buffer register MB may also be used to load the program counter PC and the 3-bit instruction register IR. The register MB also supplies data to conventional control and timing circuits indicated at 13.

The memory address register MA is a 12-bit register used to supply address signals to the memory. The memory address register MA can be loaded from the memory buffer register MB, from the program counter PC, or by means of a 12 lead address bus 15 forming a part of I/O but 11.

The program counter PC is a 12-bit register that can be directly loaded from the register MB, and is normally incremented by 1 each time it is used. The register PC can also be loaded from the switch register SWR, when a "LOAD ADDRESS" key on the operator's console is depressed. This permits any selected address to be manually loaded into the program counter.

The accumulator AC comprises a 12-bit register and various gate and control circuits for performing logical and arithmetic operations. Specifically, under program control it can be cleared or complemented. It is associated with a 1-bit link register L comprising a single flip-flop used for the carry in arithmetic operations. The contents of the register A can be rotated right or left with the link. The contents of the register MB can be added to the contents of the register AC and the result left in the register AC. The logical AND function between the contents of the register MB and the contents of the register AC can be registered in the register AC. The register AC can be loaded from the register MB, over a 12 lead input bus 17, or from the switch register when a "DEPOSIT" key on the operator's console is depressed. The register AC can transfer its contents to the register MB, or to the I/O bus 11 by means of a 12 lead AC output bus 19.

The instruction register IR is a 3-bit register adapted to receive the contents of bits 0, 1 and 2 of the instructions stored in the memory buffer register. The contents of the register IR control a major state generator 21. The latter determines the mode of operation of the computer in a manner to be described in somewhat more detail below.

The PDP–8 computer is provided with a break control 23 that operates in response to a "break request" signal BRQ supplied to it over a lead of the bus 11 to set the digital computer to its BREAK state. The use of the break control 23 will be made clear below. In practicing our invention, we modified the break control 23 of the conventional PDP–8 computer, in a manner to be described, to cause a pulse 6004P to be produced under program control and thereby cause the finite field arithmetic unit 9 to produce the signal BRQ that sets the BREAK state.

FIG. 2 shows the finite field arithmetic unit 9 in somewhat more detail. The arithmetic unit 9 includes control circuits 25, here shown in block diagram form and to be described in detail below. Also included in the unit 9 are a cycle counter C, a first address register R1, a second address register R2, and a register B.

The register B is an 8-bit register that can be loaded by the output signal from a finite field adder FFA. The contents of the register B can be transferred to the computer over the AC input bus and deposited as the last 8 bits of the register AC. The outputs of the register B are also connected to a finite field multiplier FFM.

The finite field multiplier forms the finite field product of the number stored in the B register and a number supplied by the register AC over the AC output bus. This product is supplied as an input to the finite field adder FFA.

The adder FFA sums the contents of the last 8 bits of the MB register and the output of the multiplier FFM to produce an 8-bit output signal equal to the finite field sum of the inputs. This sum is transferred to the register B.

The number of operations performed by the arithmetic unit 9 in response to one 6004P pulse supplied to the control circuits 13 is determined by the contents of the cycle counter C when the pulse is received. The cycle counter C is loaded under program control from the AC output bus. The counter C is a 6-bit counter arranged to be successively decremented after each cycle of operation of the arithmetic unit.

The register R1 is a 12-bit register that has control circuits from incrementing it by either 1 or by 32. The register R2 is a simple 12-bit storage register. One of the registers R1 or R2 is used to supply an address to the memory address register MA over the address bus 15 as determined by selecting gates 27. A number of modes of operation of the arithmetic unit are made possible by this arrangement, as will appear.

The control circuits for the memory address register MA provide an "address accepted" pulse AAP after on address has been strobed into the register MA. The function of this pulse in the apparatus of our invention will be described below.

Figure 3:
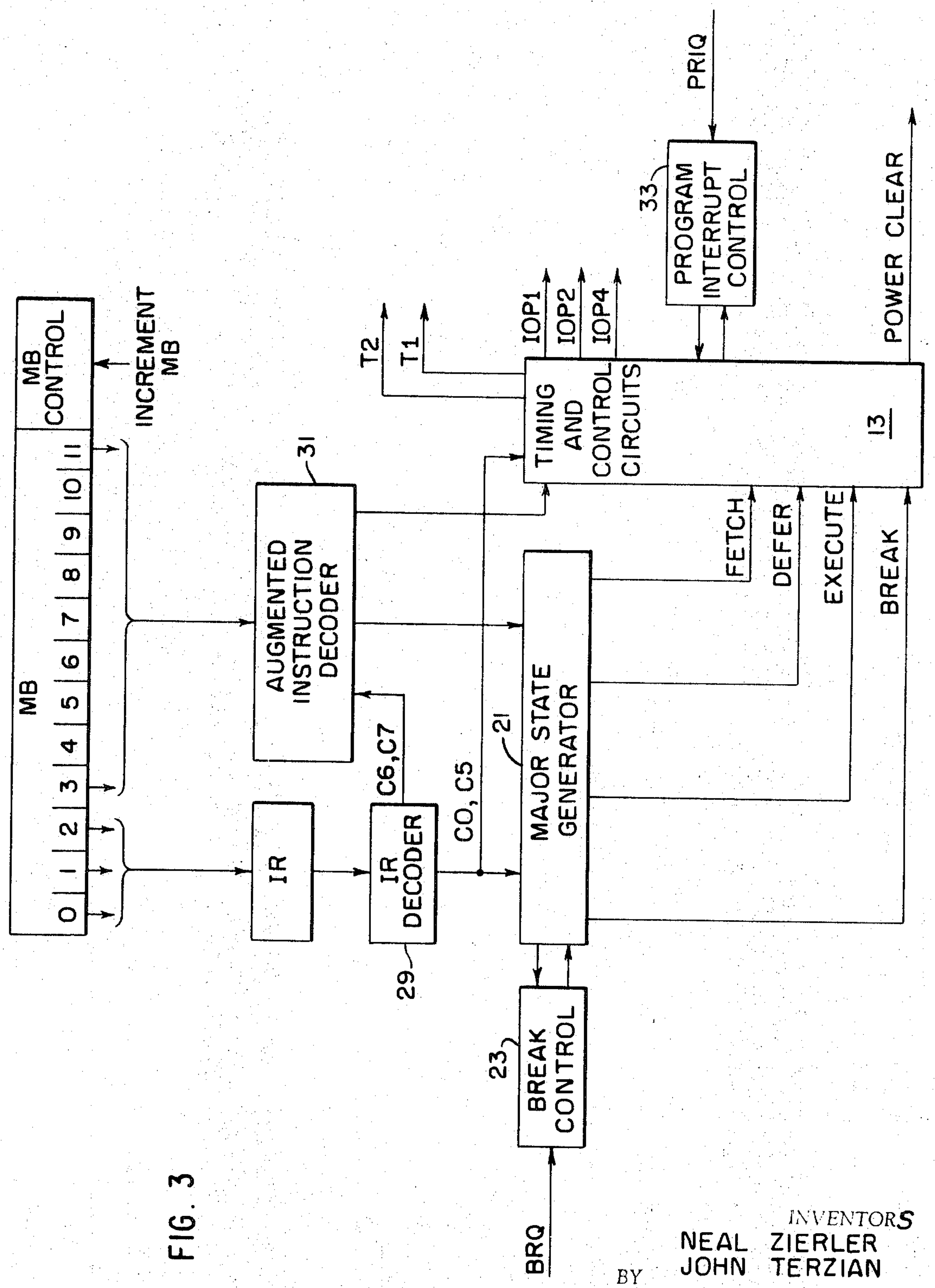
FIG. 3 is a block diagram of a portion of a conventional digital computer used to form a part of the apparatus of FIGS. 1 and 2 in accordance with the particular embodiment of our invention to be described.

FIG. 3 shows a portion of the apparatus of the PDP–8 computer in somewhat more detail. Specifically, the register MB is provided with an MB control to which a signal "increment MB" can be applied to advance the contents of the register MB by 1. As described above, the instruction register IR receives the first 3 bits of the MB register contents. These bits are strobed into the register IR under conditions to be described.

Between the register IR and the major state generator 21 is an IR decoder 29, comprising a set of gates for producing one of eight possible command signals, to be referred to as C0 and C1 through C7, as determined by the contents of the instruction register.

The commands C0–C5 are supplied to the major state generator 21 to determine the mode of operation of the computer in conjunction with its current state. The four possible major states of operation of the computer are FETCH, DEFER, EXECUTE, and BREAK. The BREAK state is produced in conjunction with the break control 23. The output of the major state generator 21, and the current command, control the timing and control circuits 13.

The instructions C6 and C7 are special instructions used in conjunction with the rest of the contents of the register MB as augmented instructions. These instructions are decoded by an augmented instruction decoder 31 that also receives bits 3–11 of the MB register. The actual instructions that are used will be described in more detail below.

The PDP–8 computer includes a program interrupt control 33 responsive to program interrupt request signals PRQ to effect interruption of the computer program, at the request of an external device, when enabled by an appropriate signal from the timing control circuits 13. A program interruption causes the computer to enter a sub-routine that determines, on the basis of assigned priorities, which of several possible external devices requested the interruption and what service is requested, carries out the requested service, and then returns to the main program.

At various times during the operation of the computer, the circuits 13 produces pulses labelled T1, T2, IOP1, IOP2 and IOP4. The relative timing of these pulses and their functions will be discussed in more detail below. The circuits also produce a "power clear" pulse PWR-CLR when the computer is first turned on. Its use in the apparatus of our invention will also be described below.

Figure 4:
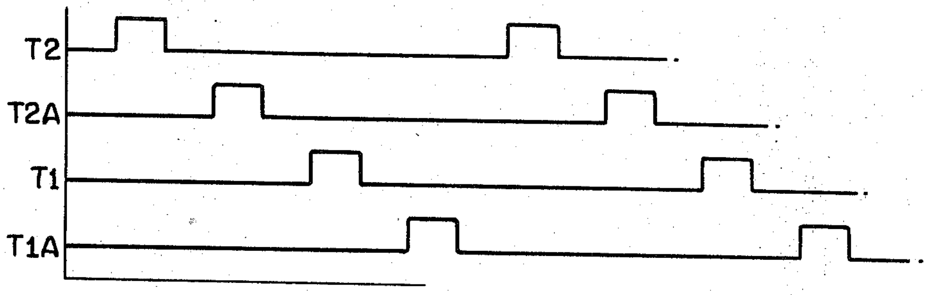
FIG. 4 is a timing diagram showing basic timing pulses occurring in the operation of the apparatus of FIGS. 1 and 2 in the embodiment incorporating the computer of FIG. 3.

FIG. 4 illustrates timing pulses, some of which are generated by the control and timing circuits 13 of FIG. 3, others being introduced for expository purposes. Thus, the pulse streams T1 and T2 are produced by the circuits 13 on two separate leads. Pulses T2 are each 1.5 microseconds apart, and the pulses T1 are 180 degrees out of phase with the pulses T2 and are also 1.5 microseconds apart. Each machine cycle of the computer starts on a pulse T2, includes the pulse T1, and is concluded at the leading edge of the next pulse T2. Pulses T2A and T2B are introduced for the purpose of simplfying the description of certain conventional functions of the computer. Their function may be produced by a variety of pulses generated within the computer timing circuits, or by the trailing edge of a preceding actual pulse.

Figure 5:
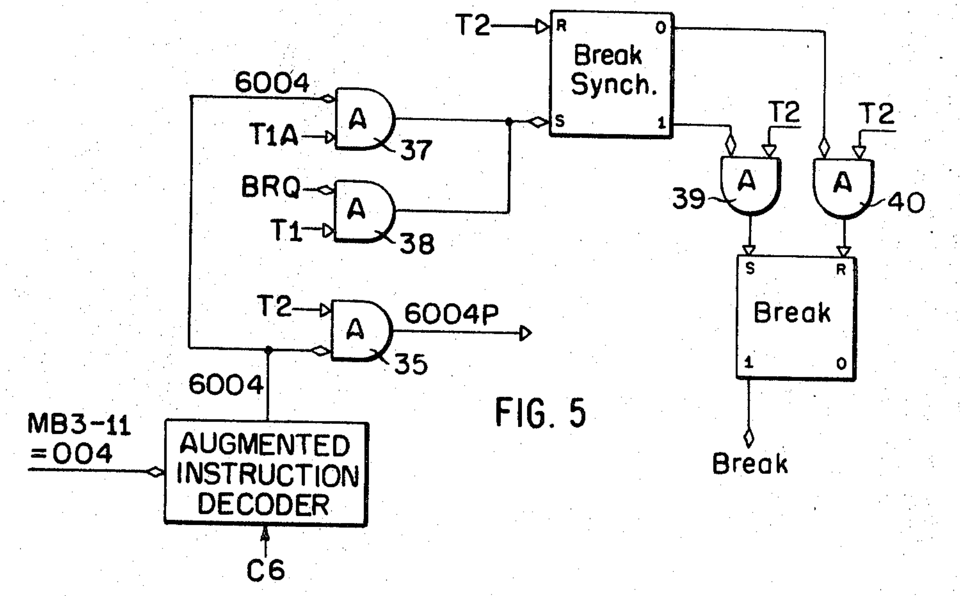
FIG. 5 is a schematic wiring diagram illustrating certain modifications of the computer of FIG. 3 made in order to adapt it for use in the coding and decoding apparatus of our invention.

FIG. 5 illustrates certain modifications of the conventional computer for use in the apparatus of our invention.

The modification affects the break control circuits 23 in FIG. 3, and is adopted to make the BREAK state available directly, under program control, and without certain delays that would occur in the operation of the standard break control facilities. Basically, in constructing the apparatus of our invention, the finite field arithmetic unit 9 is used in place of an analog-to-digital converter supplied as an accessory to the PDP–8 computer and for which a special input-output instruction is assigned. This instruction (in octal code) is 6004, and is associated with the command C6 produced by the IR decoder 29. Normally the command 6004 produces a pulse that clears the register AC at the beginning of the instruction. The lead supplying this signal to the register AC is disconnected, and instead is used as the pulse 6004P. This pulse is produced by a conventional AND gate 35, shown in FIG. 5, in response to a timing pulse T2 when the augmented instruction decoder 31 produces the signal 6004 in response to the command 6004 in the register MB and in the register IR. (In FIG. 5, and in later figures to be described, a pulse is indicated by a small triangle, and a level is indicated by a diamond. In general, the circuits are of the conventional variety that require the levels to be present for a predetermined time before a pulse applied to the same circuit will be effective, except in certain instances to be described in which the transition from one level to another is the effective signal.)

An AND gate 37 receives the signal 6004 and a timing pulse T1A. When all these signals are present, a "BREAK SYNCH" flip-flop is set. This flip-flop is part of the complement of the PDP–8 computer. The normal operation would be to set a "PAUSE" flip-flop forming a part of the computer at the beginning of the 6004 instruction, that would interrupt the normal timing of the computer. This connection to the PAUSE flip-flop is removed.

When the BREAK SYNCH flip-flop is set, a break state register here shown schematically as a BREAK flip-flop is set at the next occurring pulse T2 by means of an AND gate 39 shown in FIG. 5 Each T2 pulse also resets the BREAK SYNCH flip-flop.

As will appear, the apparatus of our invention produces a level BRQ when the pulse 6004P is produced, for the length of time required to carry out the break operation requested. This signal BRQ is applied to one input terminal of an AND gate 38 having a second input terminal that receives the pulse T1. Thus, after the pulse 6004P has been produced to produce the level BRQ, the BREAK SYNCH flip-flop will be set at each T1 time if the level BRQ is still present.

An AND gate 40 has an output terminal connected to the reset input terminal of the BREAK flip-flop. The gate 40 has one input terminal connected to the 0 output terminal of the BREAK SYNCH flip-flop, and one input terminal receiving the pulse T2. Thus, the BREAK flip-flop is reset by the pulse T2 occurring after that pulse T2 which last reset the BREAK SYNCH flip-flop if the BREAK SYNCH flip-flop was not set at the intervening T1 pulse by the gate 38.

Two other modifications of the conventional PDP–8 computer are made. These comprise grounding two unused signal inputs on the pulse amplifier package which contains the "0 to AC" pulse amplifier. One of these circuits is normally used to shift the contents of the register MB during the use of an accessory analog-to-digital converter, and the other is used to start the normal computer timing that would have been interrupted by the setting of the PAUSE flip-flop described above.

The basic steps carried out in the operation of the computer in the various major states of the computer will next be described in terms of the pulses shown in FIG. 4. As described above, each machine cycle begins on a T2 pulse. Before a T2 pulse, the next major state has been selected, and it is set into the computer by the leading edge of the T2 pulse. When the computer is set in this manner to the FETCH state, on the first T2 pulse the contents of the program counter PC are strobed into the memory address register MA, and the memory buffer register MB is cleared. At T2A, the contents of the address now stored in the memory address register are strobed into the buffer register MB. At the next following T1 pulse, the contents of bits 0, 1 and 2 of the buffer register MB are strobed into the instruction register, where they are decoded and the next major state is selected. Depending on the command in the instruction register, other functions can be performed during the same T1 pulse. At T1A, the contents of the program counter PC are incremented by 1, and the BREAK SYNCH flip-flop will be set if the command 6004 is in the register MB.

The next major state can be FETCH, EXECUTE, DEFER or BREAK. If the command brought out of memory was the command 6004, referring to FIG. 5, the next major state would be BREAK. At the T1A pulse in the FETCH cycle in which the command 6004 is brought into the register MB, the BREAK SYNCH flip-flop wil be set. The major state would then be set to BREAK by the next pulse T2 setting the BREAK flip-flop to 1. Operations during the BREAK state will be discussed in more detail below.

When the EXECUTE state is set by a T2 pulse, what follows depends on the command in the IR register. For commands C0, C1 and C2, the pulse T2 that sets to EXECUTE state strobes the contents of bits 4–11 of the register MB into the memory address register MA. At T2A, the contents of the address now in the memory address register are strobed into the register MB. At T1, the operation specified by the particular operation that included the execute state is carried out, the next major state is set to FETCH, and the following operations will be as described above in the description of the FETCH state. Operations carried out during the EXECUTE state with other commands will be described below.

During a DEFER cycle, at the first pulse T2 that sets the DEFER state the contents of bits 4–11 of the register MB are strobed into the memory address register MA as in an EXECUTE state. At T2A, the contents of the address specified are copied into the register MB. At the next T1, the contents of the entire twelve stages of the register MB are copied into the memory address register. At T1A, the contents of the address now specified by the memory address register are copied into a register specified by the current command and the next major state is set to either FETCH or EXECUTE.

The utility of the above modes of operation will be discussed following a description of the various types of instructions used in the computer.

Figure 6:
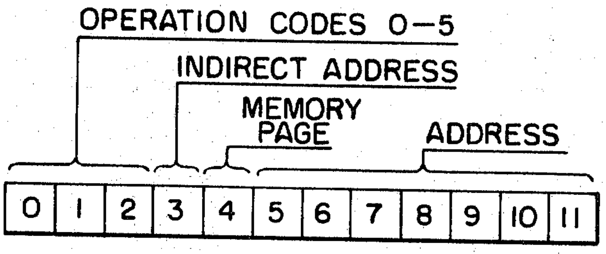
FIG. 6 is a schematic diagram illustrating the significance of various bit locations in an eleven-bit memory reference instruction used in the operation of the computer of FIG. 3.

FIG. 6 shows a memory reference form of instruction in which the operation code is C0, C1, C2, C3, C4 or C5. For such an instruction, bits 0, 1 and 2 contain the operation code. Bit 3 is 1 if indirect addressing is to be used. Bit 4 specifies the "memory page." Bits 5–11 specify the "page address."

In the PDP–8 computer, a "page" in memory is a block of 128 sequential memory locations. There are 32 such pages. On any given page, the particular memory location is specified by the 7 bit page address code. If bit 4 is a 0, the memory page is page 0. If bit 4 is a 1, the memory page is the current page from which the instruction being executed was taken.

If the indirect address bit is 0, only the current page or page 0 can be referred to. However, if the indirect address bit is a 1, any location in memory can be reached from any other address by an indirect operation. When the indirect address bit is a 1, access is first had to the page address specified by the 7 bit location code address in the bits 5–11, on either the current page or page 0 as specified by the memory page bit. In that address is stored the full 12 bit address of the desired location. That address is placed in the memory buffer register MB during a DEFER cycle of operation, whence it is transferred either to the memory address register or to the program counter in dependence on the current command. In the following paragraphs, the memory reference instructions used in the operation of the apparatus of our invention are given, and the sequence of operation that occurs during the execution of each of them is explained.

Typical memory reference instructions will be described in terms of their octal operation codes, assigned mnemonic symbols, major states entered, and the sequence of operations performed. A logical summary of the operations performed during each of the memory response instructions will then be given. In the following table, brackets around a register symbol mean the contents of the address stored in that symbol; thus, MA0–3 means the contents of bits 0 through 3 of the register MA, and (MA) means the contents of the memory location having the address specified by the contents of the register MA. An "I" in a mnemonic symbol means that indirect addressing is used,

| OP Code | Mnemonic | Major State | Next Major State | Operation | Time |
|---|---|---|---|---|---|
| CO | AND Y | FETCH | | PC→MA | T2 |
| | | do | | (MA)→MB | T2A |
| | | do | | MB0-3→IR | T1 |
| | | do | EXECUTE | PC+1→PC | T1A |
| | | EXECUTE | | MB4-11→MA | TL |
| | | do | | (MA)→MB | T2A |
| | | do | | AC∧MB→AC | T1 |
| | | do | FETCH | | T1A |
| CO | AND I Y | FETCH | | PC→MA | T2 |
| | | do | | (MA)→MB | T2A |
| | | do | | MB0-3→IR | T1 |
| | | do | DEFER | PC+1→PC | T1A |
| | | DEFER | do | MB4-11→MA | T2 |
| | | do | do | (MA)→MB | T2A |
| | | do | do | MB0-11→MA | T1 |
| | | do | EXECUTE | (MA)→MB | T1A |
| | | EXECUTE | do | MB0-11→MA | T2 |
| | | do | do | (MA)→MB | T2A |
| | | do | do | AC∧MB→AC | T1 |
| | | do | FETCH | | T1A |
| C1 | TAD Y | FETCH | | PC→MA | T2 |
| | | do | | (MA)→MB | T2A |
| | | do | | MB0-3→IR | T1 |
| | | do | EXECUTE | PC+1→PC | T1A |
| | | EXECUTE | | MB4-11→MA | T2 |
| | | do | | (MA)→MB | T2A |
| | | do | | AC+MB→AC | T1 |
| | | do | FETCH | | T1A |
| C2 | ISZ Y | FETCH | | PC→MA | T2 |
| | | do | | (MA)→MB | T2A |
| | | do | | MB0-3→IR | T1 |
| | | do | EXECUTE | PC+1→PC | T1A |
| | | EXECUTE | | MB→MA | T2 |
| | | do | | (MA)→MB | T2A |
| | | do | | MB+1→MB | T1 |
| | | do | FETCH | If MB≠0, MB→Y | T1A |
| | | do | do | If MB=0, PC+1→PC | |
| C3 | DCA N | FETCH | | PC→MA | T2 |
| | | do | | (MA)→MB | T2A |
| | | do | | MB0-3→IR | T1 |
| | | do | EXECUTE | PC+1→PC | T1A |
| | | EXECUTE | | MB→MA | T2 |
| | | do | | | T2A |
| | | do | | AC→MB | T1 |
| | | do | FETCH | MB→(MA), CLR AC | T1A |
| C4 | JMS Y | FETCH | | PC→MA | T2 |
| | | do | | (MA)→MB | T2A |
| | | do | | MB0-3→IR | T1 |
| | | do | EXECUTE | PC+1→PC | T1A |
| | | EXECUTE | | MB4-11→MA | T2 |
| | | do | | | T2A |
| | | do | | PC→MB | T1 |
| | | do | FETCH | MB→(MA), PC+1→PC | T1A |
| C5 | JMP Y | FETCH | | PC→MA | T2 |
| | | do | | (MA)→MB | T2A |
| | | do | | MB0-3→IR | T1 |
| | | do | FETCH | MB4-11→PC | T1A |
| | | do | | PC→MA | T2 |
| | | do | | (MA)→MB | T2A |
| | | do | | MB0-3→IR | T1 |
| | | do | DEFER | PC+1→PC | T1A |
| | | DEFER | | MB4-11→MA | T2 |
| | | do | | (MA)→MB | T2A |
| | | do | | MB0-11 PC | T1 |
| | | do | FETCH | | T1A |
| | | FETCH | | PC→MA | T2 |
| | | | | (MA)→MB | T2A |
| | | | | MB0-3→IR | T1 |
| | | | FETCH | MB4-11→PC | T1A |

In the above table, the arrow signifies a transfer of the contents of one register to another, |+ means two's complement addition, and ∧ means logical AND performed between corresponding bits in two registers and defined by $$0\lambda 0\wedge 0\lambda 1\wedge 1\lambda 0\wedge 0,\ 1\lambda 1\wedge 1$$

The indirect addressing mode of operation may be used in the commands TAD I Y, ISZ I Y, DCA I Y and JMS I Y. When used, the operation is the same as that for the directly addressed command except that during the FETCH cycle the next major state is selected to be DEFER. During the DEFER cycle, the full address of the operand is selected and placed in the memory buffer register MB. The following EXECUTE operation transfers the full contents of MB to MA as the first step, all as illustrated for the command AND I Y above.

The AND Y operation is used to perform the AND function between the contents of memory location Y and the contents of the register AC. The original contents of AC is lost, the result is placed in AC, and the contents of Y are restored to Y.

The TADY instruction is used to add the contents of location Y to the contents of AC, leaving the result in AC, losing the original contents of AC, and restoring the original contents of Y. If there is a carry from AC(0), the contents of the link is complemented.

The ISZ Y instruction is used to increment the contents of location Y by 1, test the results and skip the next instruction if the new content is zero. If the new content is not zero, the program proceeds to the next instruction. The incremented content of Y is restored to Y.

The DCA Y instruction deposits the contents of AC in memory location Y and clears the AC. The original content of Y is lost.

The JMS Y instruction is used to jump to a subroutine. The contents of PC are stored at Y and the next instruction is taken from location $Y+1$ The JMPY instruction sets address Y into PC so that the next instruction is taken from location Y. The original content of PC is lost.

Figure 7:
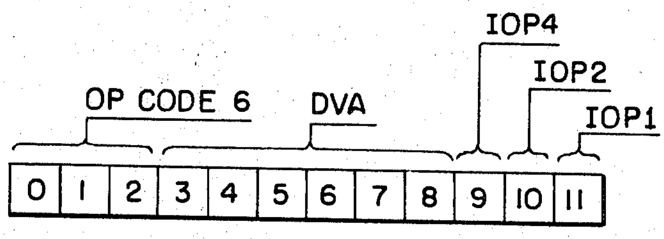
FIG. 7 is a schematic diagram illustrating the significance of the different bit locations in an eleven-bit augmented input-output transfer instruction usable in the apparatus of FIG. 3.
Figure 8:
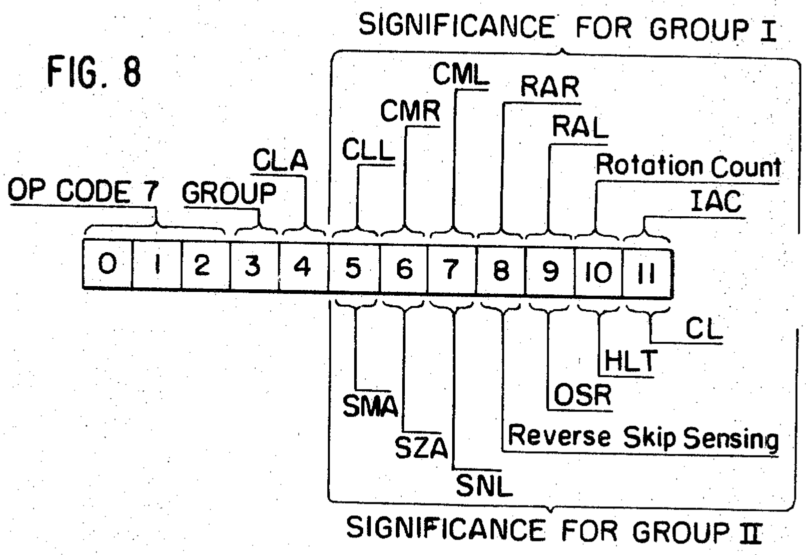
FIG. 8 is a schematic diagram illustrating the significance of memory bit locations in an eleven-bit augmented microcoded instruction used in the apparatus of FIG. 3.

FIG. 7 shows the significance of the various bit positions of an augmented instruction C6. Bits 0, 1 and 2 contain respectively 1, 1 and 0, corresponding to the initial octal digit 6 of the instruction. Bits 3–8 represent the binary address DVA of an external device. When a 1 is placed in any of the bit positions 9, 10 and 11, a pulse IOP1, IOP2 or IOP4 is produced. These pulses occur sequentially in the order IOP1, IOP2, IOP4 in a manner that will be illustrated below. They are used as auxiliary timing pulses in the execution of the operation required by the external device.

FIG. 7 shows the significance of the bit positions in an instruction C7. Bits 0, 1 and 2 contain the operation code 7, specified by a 1 in each of these bit positions. Bit 3 determines whether the instruction is one of two groups of available microinstructions. If the bit 3 is a 0, the instruction is a group 1 microinstruction, and if it is a 1 it is a group 2 microinstruction. Bits 5–11 have one significance for group 1 instructions, and another for group 2 instructions.

For group 1 instructions, if the 5th bit is set to 1, the command CLA is executed by clearing the register AC during the FETCH cycle in which the instruction is brought into the memory buffer register.

If the 6th bit is a 1, the command CMA is executed. That is done by complementing the contents of the accumulator register during the FETCH cycle in which the instruction is brought into the register MB.

If the 7th bit is a 1, the instruction CML is given. This instruction is executed by complementing the link register L during the FETCH cycle in which the instruction is brought into the register MB.

If bit 8 is a 1, the instruction RAR is executed. This is done by rotating the contents of the register AC one binary position to the right with the content of the link. That operation is accomplished during the FETCH cycle in which the instruction is brought into the memory buffer register.

If the bit 9 is a 1, the operation RAL is performed. That is executed by rotating the contents of the accumulator one binary position to the left with the content of the link. In other words, the content of bit 0 of the accumulator register is placed in the link, and the contents of the link are placed in the 11th bit position of the register AC. The contents of the other registers are each advanced one bit to the left.

A bit in the 10th position modifies the instructions RAR and RAL. If bit 10 is a 0, the operations are performed as described above. If it is a 1, the operation specified by bits 8 or 9 is a rotation in the direction specified by the bit 8 or bit 9 that is a 1, but is 2 bit positions instead of 1 bit position.

If there is a 1 in position 10 of the instruction, the command IAC is specified. This instruction is executed by incrementing the content of the register AC by 1 in 2's complement arithmetic during the FETCH cycle in which the instruction is brought into the register MB.

Group 2 microinstructions will next be described. If bit 5 is a 1 in a group 2 microinstruction, the command SMA is specified. This command is executed during the FETCH cycle in which the instruction is brought into the register MB. It is carried out by sampling the content of the most significant bit of the register AC, and if it contains a 1, indicating the register AC contains a negative 2's complement number, the content of the register PC is incremented by 1 so that the next sequential instruction is skipped. If the register AC contains a positive number, no operation occurs, and program control advances to the next sequential instruction.

If bit 6 is a 1 in a group 2 instruction, the command SZA is specified. This command is executed during the FETCH cycle in which the instruction is brought into the memory buffer register. It is carried out by sampling each bit of the register AC, and if all are 0 the content of the register PC is incremented by 1 so that the next sequential instruction is skipped. If any bit of the AC register contains a 1, no operation occurs and the next sequential instruction is initiated.

If bit 7 in a group microinstruction is 1, the command SNL is specified. This instruction is executed during the FETCH cycle in which it is brought out of memory by sampling the content of the link register L, and, if it contains a 1, incrementing the content of the program counter PC by 1 to skip the next sequential instruction. If the register L contains a 0, no operation occurs and the next sequential instruction is initiated.

If bit 8 is a 1 in a group 2 instruction, the sense of the test determining whether or not the next instruction is skipped, as specified by a 1 in bits 5, 6 or 7, is reversed. In other words, instruction SMA if modified by 1 in bit 8 becomes SPA, executed in the manner of the instruction SMA except that the next instruction is skipped if the most significant bit of the register AC contains a 0, and no operation occurs if it contains a 1 to specify a negative 2's complement number. If there is a 1 in bit 6, and in bit 8, instead of SZA the command becomes SNA, executed as for SZA except the skip occurs if there is a 1 in any bit of the register AC. Similarly, if there are 1's in bits 7 and 8, command SNL becomes SZL, carried out as for the command SNL except that the skip occurs if the link register L contains a 0. If bit 9 is a 1 for a group 2 instruction, the command OSR is specified. This operation is executed during the FETCH cycle in which the instruction is brought out of memory by performing an inclusive OR operation between the content of the register AC and the content of the switch register SWR. The result is left in the register AC, the original content of the register AC is lost, and the content of the register SWR is unaffected by the command. When combined with the CLA command, a modified OSR operation is performed in which the content of the switch register SWR is transferred unchanged into the register AC. A 1 in bit 10 of the instruction of group 2 specifies the command HLT. This command clears a RUN flip-flop forming a part of the PDP–8 computer and causes the program to stop at the conclusion of the current machine cycle. This command can be combined with others in the group 2 set of microinstructions that are executed during event time 1 (IOP1) or event time 2 (IOP2) and so are performed before the program is stopped.

Figure 9:
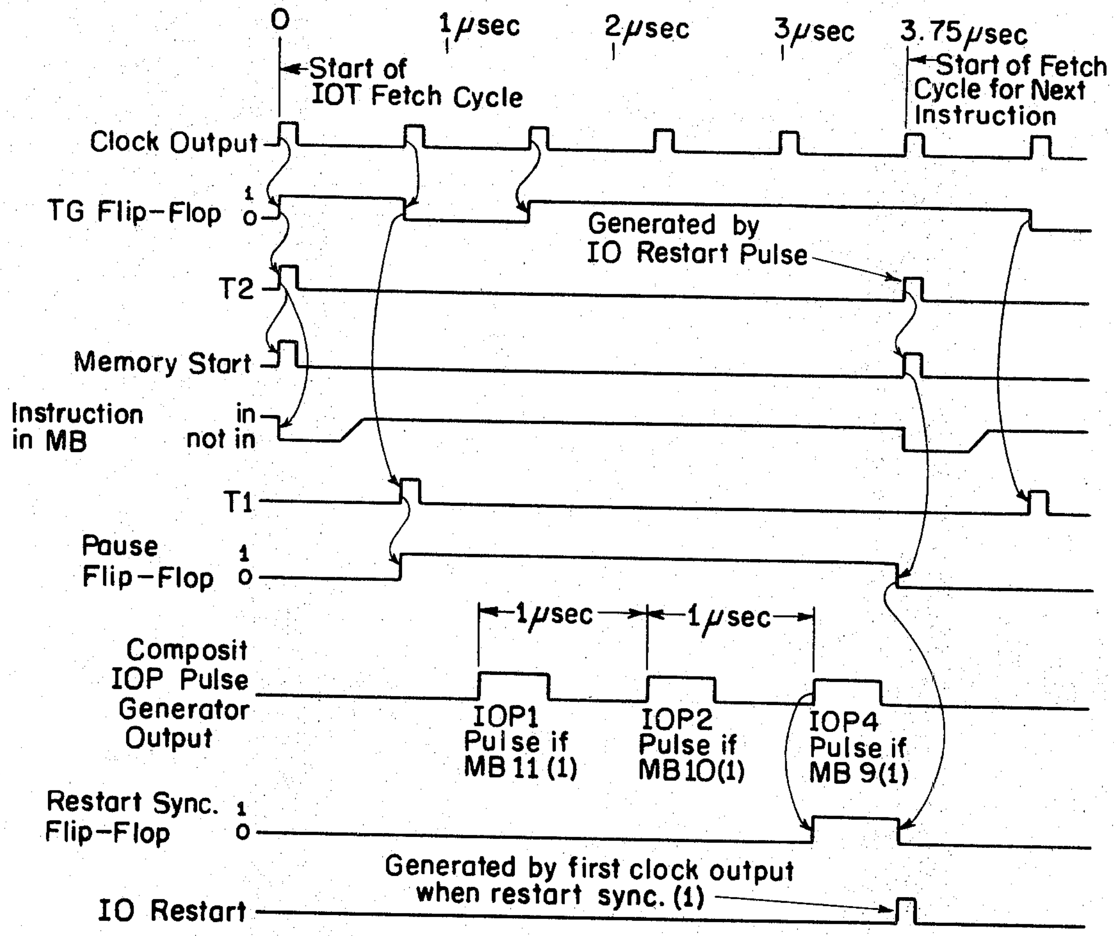
FIG. 9 is a timing diagram illustrating the operation of the computer of FIG. 3 in response to an input-output instruction.

FIG. 9 illustrates the sequence of operations performed in the conventional portion of the computer when a C6 type instruction is brought out of memory to cause an exchange of data between the computer and an external device connected to its input-output bus. During normal operation of the computer, the successive clock output pulses cause a flip-flop TG in the computer to be complemented at each clock pulse. When the flip-flop TG is set, a T2 pulse is produced, and when it is reset, a T1 pulse is produced. The PAUSE flip-flop referred to above, when set to the 1 state, inhibits the clearing of the TG flip-flop and interrupts the production of the normal computer timing pulses. This flip-flop is set when the instruction having the operation code C6 is in the memory buffer register and the operation code portion is in the instruction register IR.

Three pulses IOP1, IOP2 and IOP3 are generated during the execution of the C6 command, if specified by a 1 in a corresponding location in the memory buffer register, as indicated in FIG. 7. These three pulses are used in a manner to be described below to control operations required for execution by the command. As indicated, the normal computer timing is re-started by setting a RESTART SYNCH flip-flop at the leading edge of the last of the IOP pulses to be generated by the particular instruction. Instructions of the C6 type are used to set up the initial conditions desired in the registers of the finite field arithmetic unit 9.

Figure 10:
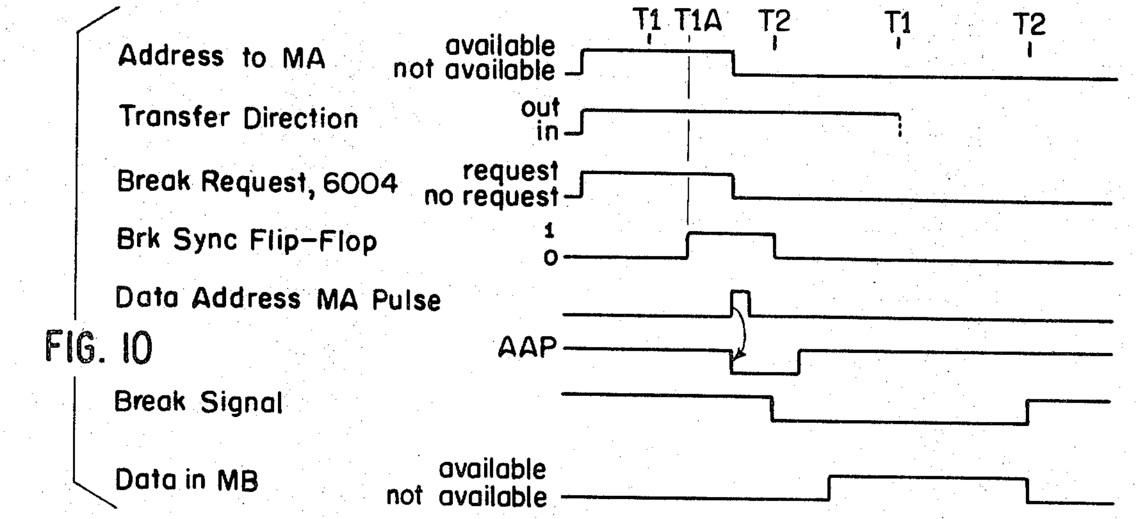
FIG. 10 is a timing diagram illustrating the operation of the apparatus of FIG. 3 during data break output operation.

FIG. 10 illustrates the operation of the computer portion of the apparatus in the BREAK state when it is desired to transfer information out of the computer. There is a direction control provided in the computer, but this line is grounded in the construction of the apparatus of our invention so that data is always taken out of the computer and into the finite field arithmetic unit when the BREAK state is set.

When the command 6004 is brought into the register MB to request the break, an address signal input to the register MA must be provided. As will appear, that is done under program control before the command 6004 is reached in the program. The BREAK SYNCH flip-flop is then set at T1A time, and the memory strobes the data address into the register MA between T1 and T2. The address accepted pulse AAP is produced at the leading edge of the pulse strobing the data into the register MA. The data is then available in the register MB for use in the arithmetic unit 9 at the time indicated in FIG. 10.

Figure 11:
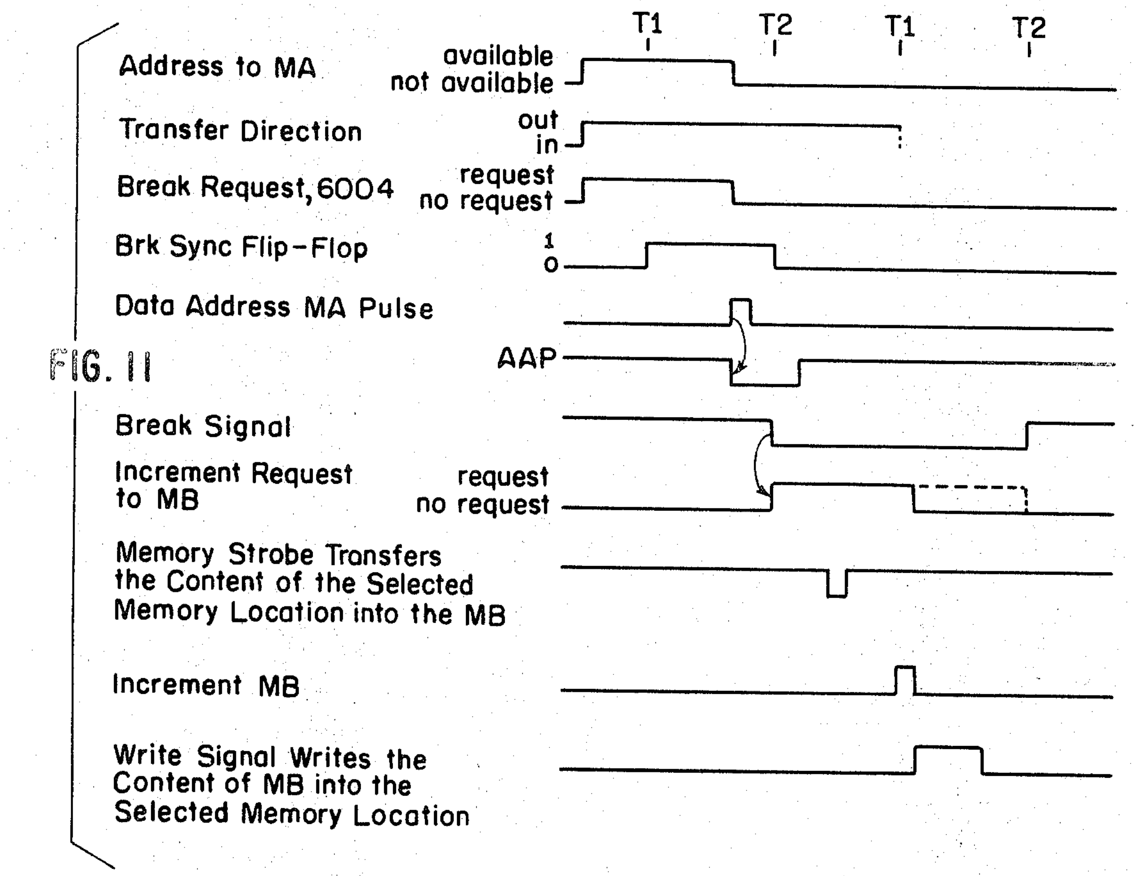
FIG. 11 is a timing diagram showing operation of the apparatus of FIG. 3 during data break memory increment operation.

A second operation carried out in the BREAK state is illustrated in FIG. 11. By this operation, an external device may get from the computer the contents of a particular memory location specified by the address signal input to the register MA, and, with this data in the register MB, if the external device produces an "increment request" signal, the contents of the register MB will be incremented by 1 and restored to the original address.

Having described the general features and mode of operation of a conventional single address computer usable in the apparatus of our invention, we will next describe the details of the finite field arithmetic unit 9 which, with the computer, form an encoder and decoder.

FIG. 12 shows portions of the unit 9 in more detail. In FIG. 12 and other figures to be described, certain conventions have been employed to simplify the illustration of conventional elements. Flip-flops have been shown by block symbols, with set and reset terminals labelled S and R, logic 1 and 0 output terminals correspondingly labelled, and a clear terminal labelled C. When a labelled condition is logically true, or logic 1, corresponding leads and terminals may be considered to be at ground potential, and when it is not true, corresponding leads and terminals can be considered at a negative potential.

Logic 1 inputs to the set input terminal of a flip-flop causes the one output terminal to go to logic 1, whereas logic 1 inputs to the reset or clear input terminals causes the logic 0 output terminal to go to logic 1. AND gates are labelled A, and produce a logic 1 output signal when all input terminals are at logic 1.

In practice, it is often convenient to depart from the above conventions and to use a mixture of polarities and logical conventions. Thus, some of the flip-flops shown, as actually made, produced a negative potential at the "logic 1" output terminal when set by a gate in response to a positive pulse and a negative level. However, choice in these matters is obviously a matter of routine design and not material to the understanding or practice of our invention, and the conventions noted above are used herein consistently for clarity.

As indicated in FIG. 12, the register R1 has its output terminals connected to the break address bus 15 through twelve AND gates 27*a* enabled by a flip-flop ADC2F in its reset state. The register R2 is connected to the bus 15 through twelve AND gates 27*b*, enabled when the flip-flop ADC2F is in its set state. Thus, the flip-flop ADC2F determines which of the registers R1 and R2 is used to supply a memory address to the computer during the operation of the unit 9. The flip-flop ADC2F is cleared when a flip-flop LDACF is in the set state, producing the level LDAC, and the T1 pulse is produced. This operation is performed by an AND gate 41.

At times during the operation of the unit 9 it is desired to alternately supply an address to the computer from the register R1 and then from the register R2. This operation is performed by the AAP pulse from the computer when a flip-flop ADC1F is set. For this purpose, the one output terminal of the flip-flop ADC1F is connected to input terminals of two AND gates 43 and 45, connected respectively to the set and reset input terminals of the flip-flop ADC2F. The pulse AAP is supplied to both of the AND gates 43 and 45. When the flip-flop ADC1F is set, the register ADC2F is accordingly complemented by each AAP pulse.

For some purposes it is desired to increment the register R1 by 1 after each use, and for other purposes it is desired to increment it by 32 after each use. These functions are accomplished by two AND gates 47 and 49 under the control of a flip-flop ADC0F. When the register R1 is selected for use by the level $\overline{\text{ADC2}}$, and the pulse AAP is produced, the register R1 is incremented by 1 by the gate 47 if the flip-flop ADC0F is in its reset state, and it is incremented by 32 if the flip-flop ADC0F is in its set state.

The flip-flops ADC0F and ADC1F form part of a group of equipment assigned the octal address 40. Referring to FIG. 7, if an operation code 6 is specified by 110 in bits 0, 1 and 2 of the instruction and the device address is octal 40 as specified by a bit in position 3 and 0's in positions 4, 5, 6, 7, and 8 of the instruction, this group of elements is selected for an operation that can be carried out at the pulse time or times specified by bits 9–11.

Returning to FIG. 12, at the time the pulse IOP2 is produced when the device address is 40, a signal AC→C is produced that enables a pair of AND gates 51 and 53. When there is a bit in position 0 of the register AC, the gate 51 sets the flip-flop ADC0F. When there is a bit in position 1 of the register AC, the gate 53 sets the flip-flop ADC1F.

The B register is connected to the AC input bus 17 through eight AND gates 55 that are enabled by a pulse B→AC produced by an AND gate 57 in response to the T1 pulse and the level LDAC from the flip-flop LDACF. The register B is cleared by a pulse O→B, produced by an AND gate 59 when a flip-flop CLBF is set and a pulse TF is produced in a manner to be described below.

The flip-flop CLBF forms part of the group of devices having address 40. It is set when the signal AC→C is produced by the pulse IOP2 when the device address is 40 and there is a 1 in bit position 2 of the register AC. The flip-flops ADC0F, ADC1F and CLBF are all cleared by a pulse O→C produced in a manner described below in connection with FIG. 15.

The B register is loaded through sixteen AND gates 63. These gates each have one input terminal connected to corresponding output terminals of the finite field arithmetic unit FFA, and a second input terminal connected to an AND gate 65 that produces an output signal S→B when pulse T2 is produced and a flip-flop BRF, to be described, is set.

The finite field arithmetic unit FFA produces the finite field sum S of a first number represented by the contents of bits 4–11 of the register MB, and a second number comprising the output product $B \cdot AC$ of the finite field multiplier FFM. The finite field multiplier FFM produces the finite field product of the contents of the B register and the contents of bits 4–11 of the AC register.

The cycle counter C has its output terminals connected to a decoder 67 that produces one of two output signals $C=0$ or $C\neq 0$ in dependence on the contents of the register. The counter C may be set to contain the count 1 by a pulse TF. The contents of the counter C may be decremented by 1 by an AND gate 69. This AND gate produces a pulse when the pulse T2 is produced and the levels $C\neq 0$ and BRF are present.

A flip-flop BRF is provided that is set by the pulse 6004P produced as described above. When this flip-flop is set, the level BRF is produced. With this level present and the level $C\neq 0$ present, an AND gate 71 is enabled to produce the level BRQ, to hold the computer in the BREAK state.

As will appear, the counter C is normally set to 1 at the end of each sequence of operations of the unit 9, so that when the pulse 6004P is initially produced, the level BRQ will automatically be produced. It will be held on until the contents of the counter C are reduced to 0. In this manner, the number of BREAK cycles of operation can be determined by the content of the C register.

When the counter C is empty, the levels $C=0$ and BRF, and the pulse T2, will cause AND gate 73 to produce an output pulse. This pulse resets the flip-flop BRF, provides a pulse to the "clear AC" bus, to clear the accumulator register AC, and sets the flip-flop LDACF. The AC register is cleared by this pulse. The next following T1 pulse is applied to a conventional delay circuit 75, producing a one-tenth microsecond delay, to produce an output pulse T1D.

The T1 pulse applied to the delay line 75 is also applied to the gates 57. Thus, the T2 pulse prior to the T1 pulse cleared the AC, the T1 pulse enables the gate 57 to strobe the contents of the B register into the register AC, and the delayed pulse T1D produced with the flip-flop LDACF in its set state, causes the gate 77 to produce the pulse TF. The pulse TF sets the cycle counter C to 1, resets the flip-flop LDACF, and clears the B register through the gate 59, if the flip-flop CLBF is set.

FIG. 13 shows the details of the register R1. The register basically comprises twelve flip-flops labelled R1F0 through R1F11, and certain gates and control circuits to be described. This register is assigned the device address octal 36 as determined by certain leads of the MB output bus 18. This bus 18 comprises twelve leads, two for each bit of the contents of bits 3–8 of the memory buffer register MB. Of these leads, the leads labelled $\overline{\text{MB3}}$, MB4, MB5, MB6, MB7 and $\overline{\text{MB8}}$ are connected to the input terminals of an AND gate 79. This gate produces the output signal DVA=36 when the bits 3–8 of the memory buffer register read 011110, or octal 36.

During the execution of a command C6 in which the device address 36 is specified, an AND gate 81 produces a pulse at pulse time IOP1 to clear the register R1. For this purpose, the output terminal of the gate 81 is connected to the clear input terminals of each of the flip-flops R1F0 through R1F11.

During the same instruction, the register R1 can be loaded from the AC output bus 19. With the signal $DVA=36$ present, and the pulse IOP4 produced, an AND gate 83 produces a pulse to enable a set of twelve AND gates 85. Each of the AND gates 85 has one input terminal connected to the output terminal of the gate 83. Each of the gates 85 has another input terminal connected to a corresponding different one of the bits AC0–AC11 of the AC output bus 19. Each of the gates 85 has an output terminal connected directly to the set input terminal of the corresponding flip-flop R1F0–R1F11.

The register R1 is adapted to be incremented by 1 as described above (when the flip-flop ADC0 is in its reset state and the flip-flop ADC2 is in its reset state) by each successive address accepted pulse AAP from the memory address register control circuits. For this purpose, an AND gate 87 is provided having a first input terminal receiving the level $\overline{\text{ACD0}}$ and a second input terminal receiving an input level $\overline{\text{ACD2}}$. When both of these signals are present, the gate 87 enables a pair of AND gates 89 and 91. Each of these gates has a second input terminal connected to receive the pulse AAP. When this pulse is produced, and the gates 89 and 91 are enabled, the content of the flip-flop R1F11 will be complemented.

For convenience in memory accessing, the bit stored in the flip-flop R1F11 is the lowest ordered bit, and the bit stored in the flip-flop R1F0 is the highest ordered bit. For incrementing by 1, it is necessary that as each lower ordered stage changes from 1 to 0 the next higher ordered stage should be complemented. For this purpose, a connection is made between the logic 0 output terminal of the flip-flop R1F11 to input terminals of two AND gates 93 and 95. AND gate 93 has an output terminal connected to the reset terminal of the flip-flop R1F10, and the AND gate 95 has an output terminal connected directly to the set input terminal of the flip-flop R1F10. It will be seen that AND gates similar to the gates 93 and 95 are connected to the set and reset input terminals of the flip-flops R1F7, R1F8 and R1F9. Each of these gates receives a signal from the logic 0 output terminal of the next preceding flip-flop. Each of these gates such as 93 and 95 also has another input terminal connected to ground. With these connections, it will be apparent that each time the contents of the flip-flop R1F11 is complemented, the flip-flop R1F10 will be complemented if the transition in R1F11 was from 1 to 0. Similarly, the flip-flop R1F9 will be complemented if the contents of the flip-flop R1F10 are complemented from 1 to 0. The stages R1F11 through R1F7 are thus connected as an incrementing counter.

The stages R1F0 through R1F6 are also connected as an incrementing counter, but with modifications that make it possible to increment the register R1 by 32 or by 1 in dependence on the desired result. For that purpose, the flip-flop R1F6 is provided with an AND gate 97 having its output terminal connected to the set input terminal of the flip-flop, and an AND gate 99 having its output terminal connected to the reset input terminal of the flip-flop. Both the gates 97 and 99 receive the pulse AAP. Both gates 97 and 99 also have a second input terminal connected to the output terminal of an OR gate 101.

When it is desired to increment the higher ordered stages of the register R1 by 1, the flip-flops ADC0 and ACD2 are reset. The corresponding signals $\overline{\text{ADC0}}$ and $\overline{\text{ADC2}}$ are connected as inputs to an AND gate 103. Additional input terminals of the gate 103 are connected to the logic 1 output terminals of the flip-flops R1F11, R1F10, R1F9, R1F8 and R1F7.

Incrementing by one would normally occur in an incrementing counter when all of the lower ordered stages were logic 1 and the next pulse was produced. It will be seen that this condition will be fulfilled for the flip-flop R1F6 when all of the lower ordered flip-flops R1F7 through R1F11 are 1. At this time, the gate 103 produces a pulse to the OR gate 101, causing the flip-flop R1F6 to be complemented. Once that action has taken place, the remaining higher ordered stages can be incremented by 1 automatically. For that purpose, the logic 0 input terminal of the flip-flop R1F6 is connected to input terminals of the AND gates 105 and 107. The gate 105 is connected to the reset input terminal of the flip-flop R1F5, and the gate 107 is connected to the set input terminal of the flip-flop R1F5. Gates similar to the gates 105 and 107 are connected to each of the flip-flops R1F0 through R1F4. Each of the gates such as 105 and 107 have a second input terminal connected to ground. Thus, each stage will be complemented if the next lower ordered stage is complemented from 1 to 0 in the same manner as described for the lower ordered states.

When it is desired to increment the register R1 by 32, the flip-flop ADC0F is set and the flip-flop ADC2F is reset. Under these conditions, an AND gate 109 produces a level "+32" to cause the OR gate 101 to enable the gates 97 and 99 for the next AAP pulse. Under these conditions, each succeeding AAP pulse effectively adds 32 to the contents of the register R1.

Each of the logic 1 output terminals of the flip-flops R1F0 through R1F11 is connected to the input terminal of a different one of a set of AND gates 111. These gates 111 collectively comprise the set 27*a* shown in FIG. 12. Each of the gates 111 has another input terminal connected to the logic 0 output terminal of the flip-flop ADC2F. When the flip-flop is in its reset state, the contents of the register R1 are gated to the memory address input bus 15. They are then strobed into the memory address register MA by the data address pulse shown in FIG. 10, whereupon the address accepted pulse AAP is produced to advance the register R1 if it is to be the next register used to supply an address.

The OR gate 113 receives the signal AC to R1 produced by the gate 83 when the register R1 is loaded. The gate 13 supplies a pulse to the clear AC bus, thereby clearing the register AC, at the conclusion of the transfer of data from the register AC to the register R1. The gate 113 receives a second input signal labelled AC→R2, produced when the contents of the register AC are transferred to the register R2 in a manner that will next be described in connection with FIG. 16.

FIG. 14 shows the register R2 and its controls. The register basically comprises twelve flip-flops labelled R2F0 through R2F11, the first two and the last one of which have been shown in FIG. 16. It will be understood that the others are similarly connected.

The register R2 is assigned the device address octal 37. The signal $DVA=37$ is produced by an AND gate 115 when the contents of the bits 3–8 of the register MB are set to 011111 in order from bit 3 to bit 8, representing octal 37 in binary code. For that purpose, the gate 115 receives the signals $\overline{\text{MB3}}$, MB4, MB5, MB6, MB7, and MB8 from the MB output bus 18.

During an input-output transfer cycle when the pulse IOP1 is produced, the register R2 is cleared in preparation for the receipt of a new input. That function is accomplished by an AND gate 117 which has one input terminal connected to receive the pulse IOP1 and a second input terminal connected to receive the signal $DVA=37$ from the gate 115. The output terminal of the gate 117 is connected to the clear input terminals of each of the flip-flops R2F0 through R2F11.

During an input-output transfer cycle in which data is to be transferred to the register R2, and after the register has been cleared by the pulse IOP1, data is transferred into the register from the AC register when the pulse IOP4 is produced. For this purpose, an AND gate 119 is provided which has one input terminal connected to receive the pulse IOP4 and a second input terminal connected to the output terminal of the gate 115. An output pulse from the gate 119, labelled AC→R2, supplies the second input to the OR gate 113 in FIG. 13, and also enables a set of AND gates 121 in FIG. 16. Each of the gates 121 has an output terminal connected to a different one of the set input terminals of the flip-flops R2F0 through R2F11. Each of the gates 121 has a second input terminal connected to a corresponding output terminal of the AC output bus 19.

When the flip-flop ADC2F is set, producing the signal ACD2, the contents of the register R2 are transferred to the memory address input bus 15. For this purpose, a set of AND gates 123, collectively comprising the gates 27*b* in FIG. 12, is provided. Each of the gates 123 has one input terminal connected to the logic 1 output terminal of the flip-flop ADC2F, and a second input terminal connected to the different one of the logic 1 output terminals of the flip-flops R2F0 through R2F11. Each gate 123 has its output terminal connected to a corresponding lead of the twelve lead memory address input bus 15.

FIG. 15 shows the cycle counter C and its control circuits. This counter comprises six flip-flops C0F through through C5F. The flip-flops C2F and C3F are not shown, as they are wired and constructed in the same manner as the flip-flop C4F. The device address assigned to the counter C is octal 40. When that address is present in an input-output transfer instruction of the class C6 the contents of the bits 6–11 of the AC register are copied into the C register by the IOP2 pulse occurring during the input-output transfer cycle. The signal $DVA=40$ is produced by an AND gate 129 connected to the six leads of the MB output bus 15 that are energized when the contents of the bits 3–8 of the register MB are 100000, or octal 40. The counter C is arranged to be loaded from the AC output bus 19 through a set of AND gates 125. Each gate 125 has one input terminal connected to a different one of the six leads AC6 through AC11 in the AC output bus. Each gate has a second input terminal connected to the output terminal of an AND gate 127. The gate 127 receives the pulse IOP2 and the level $DVA=40$.

The pulse lebelled AC→C, produced to transfer the contents of the AC register to the C register, is also applied to apparatus previously shown and described in connection with FIG. 12 and to the clear AC bus to clear the AC register after the transfer has occurred.

The level $DVA=40$ also causes the C register to be cleared prior to the receipt of new information from the register AC. For that purpose, the output terminal of the gate 129 is connected to one input terminal of an AND gate 131. This gate has a second input terminal connected to the lead on which the pulse IOP1 is produced, producing the signal pulse O→C prior to the time that the new information is copied into the register by the pulse IOP2.

The pulse O→C is applied to one input terminal of an OR gate 133. The second input terminal of the gate 133 is connected to the power clear bus and is pulsed when the computer is first turned on. The output of the gate 133 is connected to the clear input terminals C of each of the flip-flops C0F through C5F.

Each of the stages of the C register is provided with a pair of AND gates 135 and 137 that serve at times to connect the stages of the counter as a decrementing counter. All of these AND gates 135 and 137 have one input terminal connected to a DECREMENT ENABLE line that is enabled when a $DVA=40$ level is not stored in the memory buffer register MB. The signal $DVA \neq 40$ is produced by an inverter 139 having an input terminal connected to the output terminal of the gate 129. The level $DVA \neq 40$ is applied to one input terminal of an AND gate 141. The gate 141 has a second input terminal connected to the output terminal of the inverter 67*b* to receive the level $C \neq 0$. The output terminal of the gate 141 provides the decrement enable level. The purpose of the inverter 139 and gate 141 is to prevent the counter from decrementing when it is being loaded with new information from the register AC, or when a 1 is set into C5F.

Each of the gates 135 has its output terminal connected to the reset input terminal of the associated flip-flop, and each of the gates 137 has its output terminal connected to the set input terminal of the corresponding flip-flop. The gates 135 and 137 for the flip-flop C5F have a second input terminal connected to receive the signal C–1→C from the gates 69 shown in FIG. 12. This signal will cause the contents of the flip-flop C5F to be complemented on each such pulse produced.

The logic 1 output terminal of the flip-flop C5F is connected to input terminals of the gates 135 and 137 for the flip-flop C4F. When the flip-flop C5F is complemented from 0 to 1, a positive transition is produced on this output terminal which enables the gates 135 and 137 to complement the contents of the flip-flop C4F when the decrement enable signal is present. Similarly, the logic 1 output terminal of the flip-flop C4F is connected to the gates 135 and 137, not shown, for the flip-flop C3F. The flip-flop C2F is similarly connected, and its logic 1 output terminal is connected to the input terminals of the gates 135 and 137 for the flip-flop C1F. Similarly, the logic 1 output terminal of the flip-flop C1F is connected to the input terminals of the gates 135 and 137 for the flip-flop C0F. As an example of the operation of this portion of the register, if the device address is not 40 and a C–1→C pulse is produced with a 1 stored in each of the registers C0F through C5F, the state of the flip-flop C5F would go from 1 to 0, and the other flip-flops would remain the same. At the next C–1→C pulse, the contents of the C register C5F would change from 0 to 1, and the contents of the flip-flop C4F would change from 1 to 0. This action would be continued as each C–1→C pulse was produced until the contents of the C register became 000000. At that point, referring now to FIG. 12, the $C\neq0$ level applied to the gate 69 would be removed and no further decrement pulse would be produced. Thereafter, the 1→C pulse produced as shown in FIG. 12 would be applied to the logic 0 output terminal of the flip-flop C5F in FIG. 15, forcing the flip-flop C5F to the 1 state.

The application of the 1→C pulse to the flip-flop C5F does not cause the complementing of the flip-flop C4F because the "decrement enable" signal is not present at this time.

The logic 0 output terminals of each of the flip-flops C0F through C5F are connected to a different one of the six input terminals of an AND gate 67*a* forming a part of the decoder 67 described in connection with FIG. 12. The output terminal of this gate 67*a* produces the level $C=0$. This level is applied to an inverter 67*b* which forms the level $C\neq0$.

FIG. 16 shows the B register and its controls, the finite field adder FFA, and a somewhat more specific block diagram of the finite field multiplier FFM. The B register comprises eight flip-flops labelled B0F through B7F, only the first and last of which are shown in FIG. 16.

The contents of the B register are at times entered into bits 4–11 of the register AC over the AC input bus 17 under the control of a set of AND gates 55*a* through 55*h*, collectively comprising the AND gates 55 shown schematically in FIG. 12. Each of the gates 55*a* through 55*h* is connected to a different one of the logic 1 output terminals of the flip-flops B0F through B7F. Each of the AND gates has a second input terminal connected to the output terminal of an AND gate 143 that produces a pulse B→AC at the pulse time T1 when the flip-flop LDACF is set to produce the level LDAC.

The B register is cleared when a pulse O→B is applied over a lead connected to each of the clear input terminals C of the flip-flops B0F through B7F. During the preparation of the unit 9 for operation, an AND gate 145 produces an O→B pulse when the device address equals 40 and the IOP4 pulse is produced. The $DVA=40$ signal is produced by the gate 129 in FIG. 15, described above.

If the flip-flop CLB has been set, the B register is also cleared at the end of a sequence of operations of the unit 9. This operation is performed by an AND gate 147 in response to the levels CLB and TF (see FIG. 12).

The flip-flops B0F through B7F are at times loaded with the output signals from the finite field adding unit FFA. This operation is controlled by a set of sixteen AND gates functionally distinguished as eight gates 63*a* and eight gates 63*b* and collectively comprising the gates shown schematically at 63 in FIG. 12. All of these gates have one input terminal connected to receive the pulse S→B produced by the gate 65 in FIG. 12.

Returning to FIG. 16, the gates 63*b* have a second input terminal receiving a different one of the output signals S7 through S0 of the finite field adder FFA, S7 being loaded into the flip-flop B0F, S6 being loaded into the flip-flop B1F, and so on until the signal S0 is loaded into the flip-flop B7F. The complements of the signals S7 through S0 are applied to the input terminals of the AND gates 63*a*, with $\overline{S7}$ being entered into the flip-flop B0F and the $\overline{S0}$ being entered into the flip-flop B7F. This order is selected because the flip-flop B7F is copied into the bit 11 stage of the register AC, and corresponds to the lowest ordered bit.

The finite field adder FFA comprises eight exclusive OR gates labelled from the left to the right XR7 through XR0 in FIG. 16. Only the gates XR7 and XR0 are shown, as the construction and wiring of the other gates is the same and will be apparent from the description given.

The output of the exclusive OR gates XR7 through XR0 forms the signals S7 through S0, respectively. Associated with each exclusive OR gate is an inverter 149 having its input terminal connected to the output terminal of the exclusive OR gate and its output terminal connected to supply the corresponding complement signal to the gates of the B register. The construction of the exclusive OR gates may be any of a number of known constructions, but FIG. 17 shows one construction sufficient to illustrate the logic performed. As shown in FIG. 17, two input signals A and B are applied to an exclusive OR gate XR which comprises a pair of inverters 151 for forming the complements of the input signals and a pair of AND gates 153 each receiving one of the input signals and the complement of the other. The logical output signal $\overline{A}B+A\overline{B}$ represents the logical exclusive OR function of the inputs, and also the finite field sum of the inputs (here + means "OR").

The finite field adder FFA forms the finite field sum of an 8 bit number stored in bits 4–11 of the register MB and another 8 bit number supplied on eight lines labelled P7 through P0, of which only P7 and P0 are shown in FIG. 16. The signals P7 through P0 comprise the output of the finite field multiplier FFM and constitute the 8 bit finite field product of two 8 bit binary numbers, one supplied from bits 4–11 of the register AC, and the other from the eight flip-flops of the B register. It will be seen that bit MB4 is added to the signal P7 and bit MB11 is added to the bit B0. Similarly, the intermediate gates form the finite field sums P6 plus MB5, P5 plus MB6, P4 plus MB7, P3 plus MB8, P2 plus MB9, and P1 plus MB10.

The finite field multiplier FFM comprises three sections FFM1, FFM2, and FFM3. The first section FFM1 receives the contents of the register AC in bits 4–11 from the AC output bus 19. Also received by the section FFM1 are the contents of the B register. To provide power gain, the signals B0 through B7 are supplied from the logic 0 output terminals of the corresponding flip-flops B0F through B7F through inverters 155.

The output of the first section FFM1 is supplied on sixty-four lines labelled $a_0b_0$ through $a_7b_7$ to the second section FFM2 of the finite field multiplier. This section produces an output on fifteen lines labelled $t_0$ through $t_{14}$ which are connected to the input of the last section FFM3.

The final output on the eight lines P7 through P0 comprise the output of the third section FFM3. The details of the finite field multiplier are shown in FIGS. 18, 19 and 20. Before describing the construction of this multiplier, the principles on which it is constructed will be considered.

As coding, and more particularly decoding, of information in the error correcting codes with which our invention is concerned requires a very large number of multiplications, the speed of the multiplier in carrying out a single multiplication is critical. Thus, the conventional technique used in many digital computers, involving iterative multiplying, adding and shifting operations, would be far too slow and unwieldy for use in the apparatus of our invention. In order to reduce the time required for a multiplication, we have devised a network of gates whose eight output levels directly provide the finite field product of the two eight bit numbers of the input. The only delay time is the settling time of the gate network, and no iterative operations are required.

To develop the principles on which the bits of the product are formed by the multiplier FFM, first consider the multiplication of two numbers in a 3-bit finite field. If the numbers to be multiplied are A and B, where $$A=a_2\alpha^2+a_1\alpha^1+a_0$$

and $$B=b_2\alpha^2+b_1\alpha^1+b_0$$

The product A·B may be found by ordinary multiplication, and finite field addition, as follows:

$$\begin{array}{r} b_2b_1b_0 \\ \times\, a_2a_1a_0 \\ \hline a_0b_2+a_0b_1+a_0b_0 \\ a_1b_2+a_1b_1a_1b_0 \\ a_2b_2+a_2b_1+a_2b_0 \\ \hline t_4+t_3+t_2+t_1+t_0 \end{array}$$

In terms of the product digits $t_i$ so found, the product A·B is then $$A\cdot B=t_4\alpha^2+t_3\alpha^3+t_2\alpha^2+t_1\alpha+t_0$$

The three lowest ordered bits $t_2$, $t_1$ and $t_0$ of the product are defined by the expression $$t_i=\sum_{j=0}^{i}a_jb_{(i-j)},\ \text{where } i=0,\ 1,\ 2$$

Similarly, the two highest ordered bits $t_3$ and $t_4$ are given by $$t_i=\sum_{j=i-z}^{2}a_jb_{(i-j)},\ \text{where } i=3,\ 4$$

The above expressions can be generalized for the case of $m$-bit numbers to

(11) $$t_i=\sum_{j=0}^{i}a_jb_{(i-j)},\ i=0,\ 1,\ 2,\ \ldots\ (m-2),\ (m-1)$$

and

(12) $$t_i=\sum_{j=i-m}^{m-i}a_jb_{(i-j)},\ i=m,\ (m+1),\ldots\ (2m-2),\ (2m-2)$$

From (11) and (12), the expressions can be written for the digits $t_0$ through $t_{14}$ of the product of two eight bit numbers A and B, where $$A=\sum_{i=0}^{8}a_i\alpha^i \text{ and } B=\sum_{i=0}^{8}b_i\alpha^i$$

These expressions are as follows:

$t_0=a_0b_0$
$t_1=a_0b_1+a_1b_0$
$t_2=a_0b_2+a_1b_1+a_2b_0$
$t_3=a_0b_3+a_1b_2+a_2b_1+a_3b_0$
$t_4=a_0b_4+a_1b_3+a_2b_2+a_3b_1+a_4b_0$
$t_5=a_0b_5+a_1b_4+a_2b_3+a_3b_2+a_4b_1+a_5b_0$
$t_6=a_0b_6+a_1b_5+a_2b_4+a_3b_3+a_4b_2+a_5b_1+a_6b_0$
$t_7=a_0b_7+a_1b_6+a_2b_5+a_3b_4+a_4b_3+a_5b_2+a_6b_1+a_7b_0$
$t_8=a_1b_7+a_2b_6+a_3b_5+a_4b_4+a_5b_3+a_6b_2+a_7b_1$
$t_9=a_2b_7+a_3b_6+a_4b_5+a_5b_4+a_6b_3+a_7b_2$
$t_{10}=a_3b_7+a_4b_6+a_5b_5+a_6b_4+a_7b_3$
$t_{11}=a_4b_7+a_5b_6+a_6b_5+a_7b_4$
$t_{12}=a_5b_7+a_6b_6+a_7b_5$
$t_{13}=a_6b_7+a_7b_6$
$t_{14}=a_7b_7$

In order to evaluate the $t$'s, it is necessary to form each term of $$\sum_{j=0}^{7}\sum_{i=0}^{7}a_ib_j$$

This function is performed by the first section FFM1 of the finite field multiplier unit FFM. Referring to FIG. 18, the multiplier section FFM1 comprises sixty-four AND gates such as the AND gates 157 each receiving a different pair of signals, one from the AC output bus 19 and the other from the B register. The bits $a_0$ through $a_7$ are taken from bits 11 through 4 of the register AC, respectively. Bits $b_0$ through $b_7$ are taken from the bits B7 through B0 of the B register, respectively. Each $b$ bit from the B register is supplied to one of the AND gates 157 and to the same AND gate is applied a different one of the $a$ bits. Since the output of an AND gate is the logical equivalent of the binary multiplication of a pair of bits, the outputs of the sixty-four AND gates 157 form all of the possible products of the $a$ and $b$ digits.

The outputs of the finite field multiplier section FFM1 must be added in the combinations defined above to produce the fifteen signals $t_0$ through $t_{14}$. This operation is performed by the second section FFM2 of the finite field multiplying unit. This apparatus is shown in FIG. 19. As shown in FIG. 19, the unit FFM2 has sixty-four input terminals connected to the sixty-four output terminals of the first section FFM1 and receiving the signals $a_0b_0$ through $a_7b_7$.

The signal $t_0$ is formed by a simple line connecting the $t_0$ lead to the $a_0b_0$ lead. The signals $t_1$ through $t_{13}$ are formed by combinations of exclusive OR gates XR. Where the same combination of exclusive OR gates is repeated, it is shown in block form with the reference numeral of the previously described, identical group of gates.

The signal $t_1$ is formed by a single exclusive OR gate 161 receiving the signals $a_0b_1$ and $a_1b_0$. The signal $t_2$ is formed by a gate set 167 comprising a pair of exclusive OR gates 163 and 165. The gate 163 has input terminals connected to the leads $a_0b_2$ and $a_1b_1$ from the first stage. The output terminal of the gate 163 is connected to one input terminal of the gate 165. The other input terminal of the gate 165 is connected to the lead $a_2b_0$. The output terminal of the gate 165 forms the signal $t_2$. This group of gates 167 forms the modulo 2 sum of 3 terms.

The signal $t_3$ is formed by a group 175 of three exclusive OR gates 169, 171 and 173. The four input terminals of the gates 169 and 171 are connected to the labelled leads as shown in the drawing, and the output terminals of these gates are connected to the input terminals of the gate 173. The output of this group of gates 179, appearing at the terminal $e$, is the finite field sum of the four applied input signals.

The same combination of gates is used as shown at 175 in the group of gates 179 forming the signal $t_4$. Thus, the gate set 175 produces at its output terminal $e$ the finite field sum of the four terms applied to its input terminals, and that sum is applied as one input to a gate 177 that receives the fifth input signal to the group 179.

The signal $t_5$ is formed as the sum of six input signals. As shown, it may comprise a group of gates 179 for forming the sum of five terms and an additional exclusive OR gate 181 for combining two additional terms to form the fifth input signal to the gate set 179.

The signal $t_6$ requires the summation of seven terms. This may be formed by a six term summing circuit 183, with the addition of a gate 185 to combine the seventh and eighth input terms to form the sixth input to the gates 183.

The signal $t_7$ requires the summation of eight terms. As shown, it may comprise a gate set 179 having its input terminal $e$ connected to the output terminal $e$ of a gate set 175.

The signal $t_8$ requires the summation of seven input terms, and may comprise a set of gates 187.

Similarly, the signal $t_9$ is formed by a six input summing circuit 183, the signal $t_{10}$ is formed by a five input gate set 179, the signal $t_{11}$ is formed by a four input gate set 175, the signal $t_{12}$ is formed by a three input gate set 167, and the signal $t_{13}$ is formed by a single gate 189. The term $t_{14}$ is simply the signal $a_7b_7$, as represented by the lead 191 connecting the two labelled leads in FIG. 19.

The fifteen intermediate product signals $t_0$–$t_{14}$ are reduced to an eight-bit finite field product signal by the apparatus shown in FIG. 20, comprising the third section FFM3 of the finite field multiplier. The eight bits P0 through P7 of the product, representing the binary coefficients of $\alpha^0$ through $\alpha^2$, respectively, are related to the fifteen bits $t_0$–$t_{14}$ by Equation 3 above; in particular, $t_0$ through $t_7$ equal $\alpha^0$ through $\alpha^7$, or 00000001 through through 10000000, respectively. Further, $$t_8=\alpha^8=\alpha^4+\alpha^3+\alpha^2+\alpha^0$$
$$t_9+\alpha^9=\alpha^5+\alpha^4+\alpha^3+\alpha^1$$
$$t_{10}=\alpha^{10}=\alpha^6+\alpha^5+\alpha^4+\alpha^2$$
$$t_{11}=a^{11}=\alpha^7+\alpha^6+\alpha^5+\alpha^3$$
$$t_{12}=\alpha^{12}=\alpha^4+\alpha^3+\alpha^2+1+\alpha^7+\alpha^6+\alpha^4$$
$$t_{12}=\alpha^7+\alpha^6+\alpha^3+{}^2\alpha+1$$
$$t_{13}=\alpha^9=\alpha^8+\alpha^7+\alpha^5=\alpha^7+\alpha^2+\alpha^1+\alpha^0$$
$$t_{14}=\alpha^4+\alpha^1+\alpha^0$$

When a single $t_i$ is 1, it is represented by 1's in the $P_i$'s corresponding to the powers of $\alpha^i$ given above. Thus, $t_{13}=P7+P2+P1+P0$, or 10000111, where P7 is the highest ordered and P0 the lowest ordered bit. However, if more than one of the $t_i$ is 1, the set of P's that are 1 is found by adding the above relation for those $t$'s. For example, if $t_8=t_{13}=1$, and the other $t_i$ are 0, $$\begin{aligned} t_8+t_{13}&=\alpha^4+\alpha^3+\alpha^2+\alpha^0+\alpha^7+\alpha^2+\alpha^1+\alpha^0 \\ &=\alpha^7+\alpha^4+\alpha^3+\alpha^1 \end{aligned}$$

Thus, $P1=P3=P4=P7=1$, and $P0=P2=P5=P6=0$. The circuits of FIG. 20 are are arranged to produce the correct P sequence for any applied $t$ sequence in a manner that will next be described.

The term P0 is produced by a set of gates 193 comprising an exclusive OR gate 195 having an output terminal producing a signal P0. Two input terminals of the gate 195 are connected to the output terminals of two exclusive OR gates 197 and 199. The gate 197 has one input terminal connected to the output terminal of an exclusive OR gate 201. The gate 201 has two input terminals connected to the leads on which the signals $t_0$ and $t_{14}$ appear. The second input terminal of the gate 197 has applied to it the signal $t_{13}$. The two input terminals to the gate 199 are connected to receive the signals $t_8$ and $t_{12}$.

The signal P1 is formed by three exclusive OR gates 203, 205 and 207. The gate 203 receives the signals $t_{13}$ and $t_{14}$ and has its output terminal connected to one input terminal of the gate 205. A second input terminal of the gate 205 receives the signal $t_1$. The output terminal of the gate 205 is connected to one input terminal of the gate 207, which has the second input terminal connected to the signal lead $t_9$.

The signals P2, P3 and P4 are each formed by a set of gates 193 in the same manner as the signal P0. The five inputs of each of these gates are connected to the terminals indicated in FIG. 20.

The signal P5 is formed by a set of gates 209. The signals P6 and P7 are also formed by similar gates receiving the signals indicated. As shown for the signal P5, the gates 209 comprise three exclusive OR gates 211, 213 and 215. Gate 211 produces the signal P5 in response to the output signals from the gates 213 and 215. Each of the latter gates receives a different one of the signals $t_5$, $t_{10}$, $t_9$ and $t_{11}$.

FIGS. 21 and 22 show the details of a suitable buffer for use as the buffer 3 in FIG. 1. This apparatus serves to synchronize serially presented coded data from an external source such as a radio receiver or the like, convert it into parallel form and supply to the apparatus of our invention for decoding. It also serves to take coded message signals from the memory through the accumulator register AC and transmit them in serial form to an external device such as a transmitter.

Referring to FIG. 21, the apparatus includes an 8 bit storage register comprising eight flip-flops labelled M0F through M7F, of which only the flip-flops M0F, M6F and M7F are shown. The wiring of the intermediate flip-flops M1F through M5F is the same as for the flip-flop M6F.

This register and its controls are assigned the device address 50. As shown, an AND gate 217 produces the output signal $DVA=50$ when the six input terminals MB3, MB4, MB5, $\overline{\text{MB6}}$, $\overline{\text{MB7}}$ and $\overline{\text{MB8}}$ indicate that contents of bits 3 through 8 of the memory buffer register are 101000, representing octal 50. This signal is applied to an AND gate 219 together with the pulse IOP2.

When the IOP2 pulse is produced and the device address equals 50, the gate 219 strobes the contents of bits 4 through 11 of the register AC into the eight flip-flops M0F through M7F. This operation is performed by a set of eight AND gates 221, each having an output terminal connected to the set input terminal of a different one of the flip-flops M0F through M7F. Each of the gates 221 has a second input terminal connected to a different one of lines AC4 through AC11 of the AC output bus 19.

The AC→M pulse from the gate 219 also causes the register AC to be cleared, after the transfer, through an OR gate 223. The gate 223 has an output terminal connected at the clear AC bus, and a second input terminal connected to receive the pulse AC→SC, will be described in connection with FIG. 22.

The level $DVA=50$ is also applied to an AND gate 225. The gate 225 has a second input terminal connected to the lead on which the pulse IOP4 is produced, and when both signals are present a pulse M→AC is produced that strobes the contents of the eight flip-flops M0F through M7F into the last eight registers AC4 through AC11 of the AC register. This operation is performed by eight AND gates 227, each having one input terminal connected to the output terminal of the gate 225 and a second input terminal connected to a different one of the logic 1 output terminals of the flip-flops M0F through M7F.

Associated with the flip-flops M0F through M7F is a data transmitting flip-flop TDBF. Each of these flip-flops is provided with a pair of gates 229 and 231. The gates 229 each have an output terminal connected to the reset input terminal of the associated flip-flop TDBF, M0F and M1F through M7F. The gates 231 each have an output terminal connected to the set input terminal of the corresponding flip-flop. The gates 229 and 231 interconnect the flip-flops as a shift register.

The shift register comprising the flip-flops TDBF and M0F–M7F can operate in two modes, depending on whether it is desired to receive data from an external source or to transmit it to an external source. In the RECEIVE state, the level RCV, produced in a manner to be described in connection with FIG. 22, enables an AND gate 233. The gate 233 has a second input terminal connected through a level converter LC2 to receive external data pulses XD. The level converter may be any conventional amplifier for performing any level conversion necessary between the signal produced by the external source and that required by the gate 233.

The output terminal of the gate 233 is connected directly to one input terminal of the gate 231 for the flip-flop M7F, and through an inverter 235 to one input terminal of the gate 229 for the flip-flop M7F. Each of the gates 229 and 231 in FIG. 21 is enabled by an external clock pulse supplied through a conventional level converter LC3 from the external device.

The logic 1 output terminal of the flip-flop M7F is connected as the second input signal to the gate 231 for the register M6F. The logic 0 output terminal of the flip-flop M7F is connected to the gate 229 for the flip-flop M6F. Similar connections are made from the flip-flop M6F to the flip-flop M5F, and so on. Thus, the logic 1 output terminal of the flip-flop M1F is connected to the gate 231 for the flip-flop M0F, and the signal $\overline{M1}$ is supplied to the gate 229 from the logic 0 output terminal of the flip-flop M1F. The logic 1 output terminal of the flip-flop M0F is connected to the second input terminal of the gate 231 for the flip-flop TDBF, and the logic 0 output terminal of the flip-flop M0F is connected to the second input terminal of the gate 229 for the flip-flop TDBF.

When the gate 233 is enabled by the RCV level, a data bit level XD is applied to the other input terminal of the gate 233, and an external clock pulse XC is produced, a logic 1 or a logic 0 is copied into the register M7F through the gates 229 and 231, depending on the truth value of the external data pulse XD. At the same time, the original contents of the flip-flop M7F is copied into the flip-flop M6F through its gates 229 and 231. A similar one bit shift to the left occurs in each of the flip-flops M0F and M7F, with the original contents of the flip-flop M0F being copied into the flip-flop TDBF, and the contents of the flip-flop TDBF being lost. Succeeding external data bits can be entered into the shift register through the flip-flop M7F in the same manner. In the RECEIVE mode of operation, this shifting operation is terminated when the first external data bit is stored in the register M0F, and the contents of the M flip-flops are then copied into the AC register.

In the TRANSMIT mode of operation of the apparatus, a level XMT is produced by apparatus to be described in connection with FIG. 22 and enables an AND gate 237 in FIG. 21. The second input terminal of the gate 237 is connected to the logic 1 output terminal of the flip-flop TDBF. The output terminal of the gate 237 supplies external data levels TD through a conventional level converter LC1, which remains until the external device accepts the data and requests an additional data bit.

Each request for data from the external device is in the form of an external clock pulse XC. When the level XMT is present, the level RCV is absent and the gate 233 is disabled. In this state of the apparatus, at each pulse XC a 0 is copied into the flip-flop M7F and its original contents are moved to the left. Thus, each succeeding pulse XC causes a new bit of the 8 bits originally stored in the registers M0F to M7F to be copied into the register TDBF.

FIG. 22 shows apparatus for controlling the state of the buffer in FIG. 21 and for determining the status of data transfers to and from the buffer. The apparatus of FIG. 2 is assigned the device address 51. For this purpose, the AND gate 239 has six input terminals connected to the MB output bus 18 to receive the signals MB3, $\overline{MB4}$, MB5, $\overline{MB6}$, $\overline{MB7}$ and MB8. If each of these signals is logic 1, the gate 239 will produce the level DVA equals 51.

The level $DVA=51$ is applied to the input terminals of the three AND gates 241, 243 and 245. The second input terminal of the gate 241 is connected to the lead on which the pulse I0P1 appears when it is programmed. The second terminal of the gate 243 is connected to the lead which is pulsed when the I0P2 pulse is programmed. The gate 245 has a second input terminal on which the pulse I0P4 appears. The gates 241, 243 and 245 provide program control over two buffer state flip-flops XMTF and RCVF, and a bit counter comprising three flip-flops SC0F SC1F and SC2F.

The level XMT is produced when the flip-flop XMTF is set. This flip-flop is set by an AND gate 247 having one input terminal connected to the output terminal of the gate 243, and a second input terminal connected to the AC output bus lead on which the contents of the bit 0 of the register AC appear. When a command 651X is given, and there is a 1 in bit 10 of the instruction causing the pulse I0P2 to be produced, the flip-flop XMTF will be set if there is a one in bit 0 of the register AC.

The flip-flop RCVF produces a level RCV when it is set. This gate is controlled by an AND gate 249 having its output terminal connected to the set input terminal of the flip-flop RCVF. The gate 249 has one input terminal connected to the output terminal of the gate 243, and a second input terminal connected to receive bit 1 of the accumulator register AC. When that bit is a 1, and gate 243 produces a pulse, the flip-flop RCVF will be set.

The flip-flops XMTF and RCVF have their clear input terminal C connected to the output terminal of an OR gate 251. This gate has one input terminal connected to receive the "power clear" pulse, and the second input terminal connected to the output terminal of the gate 241. The flip-flops are accordingly cleared when operation of the apparatus is first started, and can be cleared under program control by the pulse I0P1 by command 651X including a 1 in bit 11.

The bit counter comprising the flip-flops SC0F, SC1F, and SC2F is employed to synchronize the apparatus of our invention with the incoming data stream so that the beginning of a block of characters can be identified. For this purpose, provision is made both for counting external clock pulses SC and for loading the registers from bits 9–11 of the accumulator register AC.

For the purposes of counting XC pulses, each of the flip-flops SCOF through SC2F is provided with a pair of AND gates 253 and 255. Each AND gate 253 has its output terminal connected to the reset input terminal of the corresponding flip-flop, and each AND gate 255 has its output terminal connected to the set input terminal of the corresponding flip-flop. Each of the gates 253 and 255 has one input terminal that is grounded so that the gates are continuously enabled. The gates 253 and 255 for the flip-flop SC2F both have an input terminal connected to the lead on which the external clock pulse XC is provided. The flip-flop SC2F acts as the lowest ordered stage of the counter and is complemented once for each XC pulse. The logic 0 output terminal of the flip-flop SC2F is connected to input terminals of the gates 253 and 255 for the flip-flop SC1F. The contents of the flip-flop SC1F are accordingly complemented each time the contents of the flip-flop SC2F goes from 1 to 0.

The logic 0 output terminal of the flip-flop SC1F is connected to the input terminals of the gates 253 and 255 for the flip-flop SC0F. This flip-flop is accordingly complemented when the flip-flop SC1F changes state from 1 to 0. The flip-flops SC0F through SC2F are loaded from bits AC(9) through AC(11) of the register AC, respectively, by three AND gates 257 under the control of the AND GATE 245. For this purpose, the output terminal of the gate 245 is connected to one input terminal of each of the gates 257, and the corresponding lead from the AC output bus is connected as the other input terminal to each of the gates 257. The output terminals of the gates 257 are each connected to the set input terminals of the corresponding flip-flop. The logic 1 output terminal of the flip-flop SC0F is connected to one input terminal of an AND gate 259. The other input terminal of the AND gate 259 is connected to the output terminal of an OR gate 261. The OR gate 261 has two input terminals, one connected to the logic 1 output terminal of the flip-flop XMTF and the other connected to the logic 1 output terminal of the flip-flop RCVF. Thus, the gate 259 is enabled by the gate 261 when the buffer 3 is either in its transmit or its receive state, and is disabled when the buffer is in neither state. The gate 259 has its output terminal connected to the set input terminal of a message flag flip-flop MF. It is desired to set this flip-flop to produce a message flag signal MP when the buffer is in either its RECEIVE or TRANSMIT state and a complete 8 bit message character has either been brought into the buffer or sent out of the buffer. At each 8 external clock pulse XC, the flip-flops SC0F through SC2F will be complemented from the state 111 to the state 000. When that occurs, and the flip-flop SC0F goes from 1 to 0, a pulse will be produced at its logic 1 output terminal that will set the flip-flop MF if the gate 216 has enabled the gate 259.

The flip-flop MF is reset by an OR gate 263 having three input terminals on which the signals power clear, AC→M and M→AC appear.

The signal MF is applied to the program interrupt bus of the computer, causing an interruption of the program when the program interrupt system is enabled. When the program interrupt request is acknowledged, the computer stores the contents of the program counter PC in location 0 of the memory and goes to location 1 in the memory to take out the next instruction. This instruction is normally a jump to a sub-routine that will service the device requesting the interruption, including the steps of identifying the device and going to an appropriate sub-routine. In the case of the buffer 3, in the RECEIVE state of the buffer that would involve transferring the contents of the flip-flops M0F through M7F to the accumulator register AC. In the TRANSMIT mode, a new character would be supplied to the M flip-flops from the AC register. The computer would then return to the program.

The signal MF is also applied to one input terminal of an AND gate 265. This gate also receives the level $DVA=50$ and the pulse IOP1. The output terminal of the gate 265 is connected to the skip bus of the computer. When pulsed, this bus causes the program counter contents to be advanced by 1 so that the next instruction is skipped. The instruction 6501, causing the gate 265 to produce a skip pulse if the flip-flop MF is set, is normally included in the program before an instruction that would require more time to execute than the buffer 3 could be allowed to wait if a message character was in it. That instruction is included so that the time-consuming instruction could be skipped and the next instruction comprising a transfer of a character in the buffer could be accessed.

In order to synchronize information coming into the buffer 3, both the first bit of each character and the first character of each message block must be correctly identified. In order to permit such synchronization, a known block of characters must be transmitted. Conveniently, an ascending binary sequence of characters is transmitted and the computer is programmed to take each character as it is received, compare it to the previous character, and store it for comparison with the next character. On each comparison, a counter is decremented by one if the comparison indicates that each character was not one more than the one before, and incremented by one if the comparison indicates that it is one more than the one before. In practice, the counter may simply be an assigned location in memory whose contents can be changed under program control.

Since errors can occur in a message transition, it is necessary to make a number of such comparisons. In practice, if 32 successful comparisons are made, the apparatus is considered to be in synchronization and the decoding operation can proceed. If the counter falls to −16, it is assumed that the apparatus is out of synchronization and the computer is programmed to place a 1 in flip-flop C2F so that the counter will overflow and set the register MF after only seven additional message bits have been received. By repetition of this process, registration is shifted until tests show that synchronization has been achieved.

Having described the apparatus of our invention, its use and mode of operation in coding and decoding information will next be described.

It will be assumed that 8 bit message symbols are available in 255 symbol blocks presented serially to the buffer 3 at the rate of 2,400 bits per second. The incoming messages are to be decoded and printed out by twenty-four 100 word per minute teletypewriters, as by connection through a conventional teletype time division demultiplexer. For that purpose, it is convenient to assign 1020 memory address locations for message storage. The last 1020 locations, having addresses octal 6004 through 7777, may conveniently be assigned for this purpose. The available storage block thus has a capacity for four message blocks. In this manner, one block can be assigned for a message then being read in, one for a message being decoded, one for a message being printed, and an extra one to allow for variations in timing of the three processes concurrently occurring. The buffer flag MF is assigned the highest priority, and the teleprinter flag is assigned the lowest priority. The computer is programmed to normally allow interruption by the program interrupt system except for periods of time that will not cause undue delay in the processing of incoming message signals. For that purpose, as will appear, operations of the finite field arithmetic unit 9 which would normally take more time than could be allowed are broken down into shorter cycles.

Four memory pages must be assigned for storing a table of $\alpha^i$, and a table of inverses of $\alpha^i$, for the 8-bit finite field. Any convenient contiguous block of addresses may be used. It may be noted that these addresses suffice to contain a complete 3-bit octal field from 000 to 777, or two complete 8-bit finite fields. Conveniently, at each address in the inverse table is loaded the inverse of the power of $\alpha$ corresponding to the field element equal to the address. By this arrangement, the inverse of any power of $\alpha$ may be found by taking the power of $\alpha$ as the address, and the contents as the inverse.

There are 255 non-zero elements in the eight bit finite field each corresponding to a different power of $\alpha$, the primitive element of the field. Any number N that is an element of the field can be expressed as $$N=\sum_{i=0}^{7} y_i\alpha^i$$

where the $y_i$ are 0 or 1. The first eight such elements are $\alpha^0=00000001$
$\alpha^1=00000010$
$\alpha^2=00000100$
$\alpha^3=00001000$
$\alpha^4=00010000$
$\alpha^5=00100000$
$\alpha^6=01000000$
$\alpha^7=10000000$ Higher ordered elements can be computed from these elements from the relationship previously described:

$$\alpha^{8+i}=\alpha^{4+i}+\alpha^{3+i}+\alpha^{2+i}+\alpha^i$$

Thus, $$\alpha^8=\alpha^4+\alpha^3+\alpha^2+1=00011101$$
$$\alpha^9=\alpha^5+\alpha^4+\alpha^3+\alpha^1=00111010$$

* * * * *

$$\alpha^{254}=\alpha^7+\alpha^3+\alpha^2+\alpha$$
$$\alpha^{255}=1=\alpha^0$$

The last element, $\alpha^{255}$ is not needed to describe a field element, as it is the same as $\alpha^0$. It is introduced to illustrate the field is periodic in $\alpha^i$ and to facilitate the definition of $\alpha^{-i}$. Since $$\alpha^{255}=1=\alpha^{254}\cdot\alpha^1$$
$$\alpha^{-1}=\alpha^{254}$$

multiplying by $\alpha^{-1}$ $$\alpha^{-2}=\alpha^{253}$$

* * * * *

$$\alpha^{-i}\ \alpha^{255-i}$$

* * * * *

$$\alpha^{-253}=\alpha^2$$
$$\alpha^{-254}=\alpha^1$$
$$\alpha^{-255}=\alpha^0$$

Thus, if the values of the inverses $\alpha^{-1}$ of each element $\alpha^i$ are each stored at the address $\alpha^i$, an element can be used as the address of its inverse. Thus,

| Address: | Contents |
|---|---|
| 00000001 | 00000001 |
| 00000010 | $\alpha^{254}$ |
| * * * * * | |
| $\alpha^{254}$ | 00000010 |

In practice, the computer is preferably programmed to generate a table of powers of the primitive field element $\alpha$, giving all non-zero elements of the finite field. These entries are then transferred into the inverse table by reading the first table forwards and backwards simultaneously. The entries, reading backwards, determine the inverse table of addresses into which are loaded the corresponding entries, reading forwards. Thus, for example, the fifth entry in the table of powers of $\alpha$ is $\alpha^5$, while the fifth entry from the end is its inverse, $\alpha^{-5}$. Suppose the finite field representation of $\alpha^{-5}$ is 0111. This corresponds to a binary 7. Hence, the fifth entry in the table of powers —$\alpha^5$— is stored in the 7th location in the inverse table.

The program must also include a routine for synchronizing the incoming messages in the manner described above. This can be programmed in any suitable conventional way, and a typical routine is included in a specific program example given below.

As described above, when an incoming messsage symbol is in the buffer register 3, the flip-flop MF is set to provide the level MF and request a program interrupt. The program interrupt circuits for the computer transfer control to a sub-routine that is stored in the memory to service interruptions. A specific example is given below. However, the general operations are as follows. First, the contents of the accumulator register AC and the link register L are stored in memory and a test is made to determine whether or not the level MF is present. If it is present, indicating that a complete message symbol is waiting in the buffer, it is read into the register AC and the flip-flop MF is cleared by the instruction 6504. The incoming word is then stored in its proper place. One memory register, preferably one of the auto indexing registers assigned octal addresses 0010 through 0017, is selected as the input address register and contains the address into which the symbol is stored. The auto indexing locations are automatically indexed by the computer each time they are accessed. Thus, the incoming message symbol is stored in the first available one of the 1020 memory locations reserved for message storage. If the input address register location reaches 0, the register just used to store an incoming signal must have address 7777, the last register in the memory. When that occurs, the input address location is reset to contain the initial address of the reserved message block. A comparison is next made between the contents of the input address register and the address from which the last character was sent to the teleprinter to be printed. If they are equal, the input has caught up with the slower output and drastic action is necessary. For example, the apparatus could flag the message currently being decoded as uncorrectable because of timing problems and a skip made to the next message. With the memory assignments for message storage given, and the data input and output rates assumed, this would not normally be necessary.

The interrupt routine ends by reloading the link register L and the accumulator register AC from the address in which the contents were stored, and the computer returns to the main program.

During a program interrupt routine in which the level MF is not found present, the teleprinter flag signal is tested. If it is 1, that indicates that the teleprinter has completed printing the last character sent and is ready for another. One of the auto indexing memory locations is used to store the address from which the last character was taken. It is automatically incremented as the next character is read from memory. To ensure that no attempt is made to print undesirable characters such as check symbols, a special character such as a —1 is placed after the last desired character in the block. As each word is read into the register AC for printing, a check is made on its sign. If the sign is (+), the character is sent to the printer, the link and the accumulator register AC are reset and control is returned to the main program. When a (—) sign is encountered, printing of data in that block is complete. The pointer to the first word of the message being printed is moved up 255 locations. If the result is 0, the last message printed was in the last message area of the I0 buffer block. The pointer is then set to the first register of the I0 buffer. The auto indexing register storing the address of the last character sent to the teleprinter is then set according to the pointer. The stage is set to begin printing from the next message block. A check is made to learn whether the next message has been completely decoded. This is accomplished by comparing the contents of the pointers to the initial word of the block being decoded. If they are unequal, printing can and does continue. However, if they are equal, the printer has caught up with the decoder and must wait. The teleprinter does not receive another character and hence will not cause another interrupt. When printing can recommence, the next symbol must be sent to the teleprinter by the main program. To remind the main program that such a step is necessary when the present block is decoded, a program teleprinter flag is cleared. (When the printer is running,, this flag is a 1). No character is actually printed, the link and the AC are reset, and control is returned to the main program.

An initialization sub-routine is provided which provides for setting up certain initial items needed in the program and prepares the apparatus to receive a message. A suitable routine is included in the program given below. In this routine, first the computer interrupt system is turned off with a C6 command 6002 referred to as IOF. This command disables the program interrupt synchronization element to prevent interruption of the current program. When it is desired to again permit the program interrupt to function, the instruction 6001, which enables the interrupt system, is given. Next, the RECEIVE flip-flop RCVF in FIG. 22 is set by the instruction 6513. The HALT command is given, to permit the operator to set in, by way of the switch register SWR, the number of check symbols per message to be received. The program is re-started and this number is stored in an assigned location. Another HALT command is given and the maximum number of errors to be corrected is set in. The program is again commenced and these and related numbers for use later in loop counts and address modification are stored. The routine then proceeds to construct a table of inverses of the finite field in the manner described above. The interrupt system is then enabled, and synchronization proceeds. When the apparatus is in synchronization, incoming message symbols are automatically stored in memory as described above.

When an incoming message has been stored in memory, the decoding routine can begin.

The first step in the decoding routine is to calculate the $c$ syndromes $$S_j=\sum_{i=0}^{n-1} B_i'\alpha^{ij} \quad j=0, 1, 2, \ldots (c-2)$$

where $c$ is the number of check symbols to be included, and $n$ is the number of symbols per coded block. Assume that $c=6$, allowing up to 32 errors to be corrected, and $n=255$. There are then 64 syndromes, computed by evaluating the polynominal $$\sum_{i=0}^{254} B_i' X^i$$

successively for $x=1, \alpha, \alpha^2 \ldots \alpha^{63}$

The received message symbols $B_i'$ are stored in the memory in reverse order; i.e., $$B'_{254}$$

is at the lowest address and $B'_0$ is at the highest address. Since the program interrupt system does not function during a break cycle, in which the finite field arithmetic unit 9 is operative, in order to maintain a reasonable available data transmission rate the entire process of evaluating the polynomial for a single value $x$ is not carried out at the same time. Instead, it is carried out in up to five successive operations, with intervening intervals during which the message characters coming in can be accepted and placed in memory.

The first step in the computation is to set up the arithmetic unit by storing 0 in the B register 111111 (or decimal 63) in the C register, and setting the flip-flops ADC0F, ADC1F and CLBF to 0. With the flip-flop CLBF reset, the contents of the B register will be retained after the arithmetic operations have been performed.

The register R1 is next loaded with the address of $$B'_{254}$$

and the value of $x=\alpha^j$, and beginning with $\alpha^0=1$, is loaded into the accumulator register AC. The operation of the arithmetic unit is then initiated by giving the instruction 6004.

When the instruction 6004 is transferred to the instruction register IR, by a T1 pulse occurring during the FETCH cycle, the BREAK SYNCH flip-flop will be set. The BREAK flip-flop will then be set by the gate 39 in FIG. 4 by the next following T2 pulse, and the 6004P pulse will be produced by the gate 35 at the same time. The signal BRQ will then be produced by the gate 71 in response to the setting of the flip-flop BRF by the 6004P pulse (FIG. 12).

The gate 71 will be enabled, because the contents of cycle counter C will cause the decoder 67 to produce the level $C\neq0$. Between the last mentioned T2 pulse and the next T1 pulse, the desired value of $$B'_{254}$$

will come into the memory register MB. That will occur because the stored address in the register R1 in FIG. 12 will be gated by the gates 27*a* to break address bus with the flip-flop ADC2F reset.

When the data address is strobed into the memory address register MA, the AAP pulse will be produced, causing the gate 47 to increment the contents of the register R1 to 1, to bring into R1 the address of the next character $$B'_{253}$$

The T1 pulse next occurring has no effect this time.

At the next following T2 pulse, referring to FIG. 12, the contents of the finite field adder FFA will be strobed into the B register by the gate 63 in response to the pulse from the gate 65. Since the contents of the accumulator register AC was 1 and the initial contents of the B register was 0, the output of the adder FFA will simply be $$B'_{254}$$

from the MB register. This value is now stored in the register B.

The same T2 pulse will cause the gate 69 in FIG. 12 to produce the pulse C–1→C, decrementing the counter C to decimal 62. Between that T2 pulse and the next T1 pulse, the next symbol $$B'_{253}$$

will come into the memory buffer MB, and at the next T2 pulse the new contents of the finite field arithmetic unit adder FFA will be strobed into the B register. This value will now be $$B'_{254}+B'_{253}$$

At the end of the finite field arithmetic unit computation cycle, 64 interations of the operation $$B\cdot AC+MB\rightarrow B$$

will have been made, and the contents of the B register will be $$B'_{254}+B'_{253}\ .\ .\ .\ B_{190}$$

When the C register has been decremented to 0 and a pulse T2 appears, the gate 73 in FIG. 12 will reset the flip-flop BRF, a pulse will be applied to the clear AC bus to clear the accumulator register AC, and the flip-flop LDACF will be set.

At the next T1 pulse, the contents of the B register will be strobed into the register AC by the gates 55 in response to a pulse from the gate 57. At the same time, the gate 41 will clear the flip-flop ADC2F, which will have no effect since that flip-flop is already reset.

The computer will go out of the BREAK state and perform any operations needed, as indicated by the presence or absence of a program interrupt request, will reload the cycle counter C with the value decimal 63, and will proceed with another instruction 6004 to cause the finite field arithmetic unit to take another 64-step evaluation of the first polynomial. This operation will be continued until, prior to the fifth such iteration, the register CLBF in FIG. 12 will be set to 1. At the end of that computation cycle, after the contents of the B register, which is the final result for the first polynomial, have been transferred into the register AC, the pulse TF and CLB will clear the B register at the same time that the C register is set to 1. The value of the first syndrone $S_0$ has now been computed and can be stored in memory.

The finite field arithmetic unit is then initialized as before, except that the value now stored in the accumulator AC will be the value $\alpha$. The whole process will then be repeated until $S_1$ has been computed, whereupon the system will be prepared for operation with the accumulator initially containing $\alpha^2$. This process will be repeated until the syndrome has been computed in which $\alpha^{63}$ is in the accmulator register. All of the syndromes will now be in memory.

The entire computation of the syndromes involved the repetition 64 times of 255 multiplications and 255 additions, together with intermediate storage and preparation of the arithmetic unit and associate registers for computation. This process can be carried out in the equipment decribed in about 25 milliseconds.

After computing the syndromes, the next step is to find the locations of any errors which may have occurred. That requires the evaluation of expressions of the form $$x=\sum_{i=0}^{m}a_ib_i$$

where the $a_i$ and $b_i$ are entries in an $xy$ matrix such that the addresses for $a_i$ equals $A+32i$ and for $b_i$ equals $B+i$ where A and B are the addresses for $a_0$ and $b_0$, respectively. An auto-indexing memory location of the group from 0010 to 0017 is selected to control the stepping through the successive adjacent values of $b$. The register R1 in the finite field arithmetic unit 9 is used to store the addresses of the $a_i$ that are 32 apart, and the flip-flop ADCO is set to 1 so that the register R1 is automatically incremented by 32 each time it is used. The register R2 is used to store the address of a temporary storage in which the accumulating sum of the polynomial to be evaluated is kept.

First, the temporary storage is cleared. The flip-flops ADC0 and ADC1 are set to 1. The flip-flop CLBF is set to 1, and the cycle counter C is set to 1. The register R1 is loaded with the address of A1, and the register R2 is loaded with the address of the temporary storage. The accumulator register AC is loaded with a value of $b_1$. The command 6004 is then brought into the register MB and operation of the finite field arithmetic unit 9 is commenced in the manner described above. The operations that take place are that the contents of the register R1 is supplied to the memory address register MA to cause the value $a_i$ to be brought into the buffer register MB where it is applied to the finite field adder FFA in FIG. 12.

The output of the finite field multiplier FFM is 0 at this time because the B register stores a 0. The value of $b_i$ is transferred into the B register, the cycle counter C is set to 0, and the contents of the B register are equal to $a_1$.

Since the flip-flop BRF is still set when the T2 pulse that loads the B register is produced another break cycle will take place and the contents of the temporary storage location will be brought into the memory buffer register MB. At the AAP pulse produced when the first access from the register R2 was transferred to the memory address register, the register R1 is advanced by 32, and the flip-flop ADC2 is set to gate the register R2 to the memory address register.

Since the contents of the temporary storage register are 0 at this time, the accumulator register AC contains $b_2$, and the B register contains $a_1$, the output of the adder FFA will be $a_1b_1$. At the next T2 time, the value $a_1b_1$ will be transferred to the B register.

With the C register decremented to 0, the gate 73 in FIG. 12 will produce the pulse T2F in response to the T2 pulse that transfers the contents of the adder to the register B. The pulse T2F will clear the register AC and set the flip-flop LDACF in FIG. 12. The next following T1 pulse operates the gate 57 to transfer the contents of the B register to the register AC, so that AC now holds $a_1b_1$. That T1 pulse is delayed by the delay line 75 to produce the pulse T1D. The presence of this pulse with the level LDAC present produces a pulse TF that resets the cycle counter C to 1, and with the level CLB, sets the B register to 0. The program then resumes with an instruction to deposit the contents of the accumulator register in the temporary storage, and to transfer the address of the next value $b_2$ from the auto indexing register to the memory address register, whereupon the value $b_2$ is placed in the register AC. The command 6004 is then given again and another two-cycle operation of the finite field arithmetic follows.

The AAP pulse produced in the last 6004 cycle resets the flip-flop ADC2F to transfer address control from R1 to R2. However, that pulse does not increment the register R1, because the level $\overline{\text{ADC2}}$ was not present at the gates 47 and 49. Accordingly, during the first cycle of the 6004 instruction, the value $a_2$ will be supplied to the memory buffer register MB.

With the B register cleared, the subsequent transfer to the register will leave B holding $a_2$. On the second cycle of the instruction 6004, access will be had from the register R2 to the memory and the value $a_1b_1$ will be brought out of temporary storage to the buffer MB. The second transfer will then place $a_1b_1+a_2b_2$ in the buffer register B. At the conclusion of the cycle, this value will be transferred to the accumulator register AC. It will then be transferred to the temporary storage and the process will continue until the entire polynomial has been evaluated.

The process is concluded by bringing the value 0 into the buffer register MB by placing 0 in the address then directed by R1, so that the conclusion of the final 6004 two-cycle process of the accumulator AC will hold a 0. An instruction ISZ, placed in front of the jump instruction that causes the apparatus to recycle, then detects the 0 in the register AC and the jump instruction is skipped to continue the program.

The operation of the apparatus to continue the decoding process is broadly based upon the mathematical principles described above. The theory of operation will next be developed in somewhat more detail in the context of the actual operations performed by the apparatus.

Suppose that $t$ errors appear in the received message and that they occur in symbols $i_1, i_2 \ldots i_t$.

The first step in the decoding routine is to calculate the $c$ syndromes $S_j$ as described above.

Suppose that $t$ errors appear in the received message and that they occur in symbols $i_1, i_2 \ldots i_t$. The magnitudes of the errors can be any non-zero elements of the finite field. Call these error values $v_1, v_2 \ldots v_t$. Then $$b_i=\begin{cases} b_i & i\neq i_k \text{ for all } k=1.2, \ldots, t \\ b_i+v_k & i=i_k \text{ for some } k \end{cases}$$

and $$S_j=\sum_{i=0}^{n-1} b_i\alpha^{ij}\sum_{k=1}^{t} v_k\alpha^{i_kj}\sum_{k=1}^{t} v_k(\alpha^{i_k})^j$$

We define $\epsilon_k=\alpha^{i}k$ and call it the $k^{th}$ error locator, for its logarithm to the base $\alpha$ tells us exactly where the $k^{th}$ error occurred.

The problem of correction is precisely the problem of solving simultaneously the equations $$\sum_{k=1}^{t} v_k\epsilon_k^j=S_j \quad j=0, 1, \ldots, c-1 \tag{11}$$

for the $2t$ unknowns $v_1 \ldots v_t$ and $\epsilon_1 \ldots \epsilon_t$. The system is nonlinear and cannot be solved readily by straightforward methods.

The decoding algorithm finds the error locators first. Write $\sigma_1, \sigma_2 \ldots \sigma_t$ for the elementary symmetric functions of the $\epsilon_1 \ldots \epsilon_t$; i.e., $$\sigma_1=\epsilon_1+\epsilon_2+ \ldots +\epsilon_t$$
$$\sigma_2=\epsilon_1\epsilon_2+\epsilon_1\epsilon_3+ \ldots \epsilon_1\epsilon_t+\epsilon_2\epsilon_3+ \ldots \epsilon_{t-1}\epsilon_t$$
$$* \quad * \quad * \quad * \quad *$$
$$\sigma_t=\epsilon_1\epsilon_2 \ldots \epsilon_t$$

It can be shown, by induction on $t$, that $$S_j\sigma_t+S_{j+1}\sigma_{t-1}+ \ldots +S_{j+t-1}\sigma_1=S_{j+t} \text{ for all } j\geq 0$$

When $0\leq t\leq e$, the unknowns $\sigma_1 \ldots \sigma_t$ can be found by solving $$\begin{bmatrix} S_0 & S_1 \ldots & S_{t-1} \\ S_1 & S_2 \ldots & S_t \\ S_2 & S_3 \ldots & S_{t+1} \\ \cdot & \cdot & \cdot \\ \cdot & \cdot & \cdot \\ \cdot & \cdot & \cdot \\ S_{t-1} & S_t \ldots & S_{2t-2} \end{bmatrix} \begin{bmatrix} \sigma_t \\ \sigma_{t-1} \\ \sigma_{t-2} \\ \cdot \\ \cdot \\ \cdot \\ \sigma_1 \end{bmatrix} = \begin{bmatrix} S_t \\ S_{t+1} \\ S_{t+2} \\ \cdot \\ \cdot \\ \\ S_{2t+1} \end{bmatrix} \tag{12}$$

However, the dimension of the matrix is $t\times t$ and $t$ is still unknown. The procedure then is:

(1) Examine the matrix of maximum possible size (i.e., $e\times e$) and find its rank which is equal to $t$.

(2) Triangulate the $t\times t$ sub-matrix found in the top left-hand corner.

(3) Find the $\sigma_1 \ldots \sigma_t$.

Actually, steps (1) and (2) are combined so that, once the rank is found, the desired $t\times t$ matrix has already been triangulated. The procedure used follows.

A $32\times 33$ register block referred to hereinafter as M, is reserved in memory to hold the matrix. $e$ syndromes, starting with $S_0$, are transferred to locations 0 through $e-1$ of M. Then $e$ more, starting with $S_1$ are transferred to locations 32 through $32+(e-1)$ of M. This procedure is followed $e+1$ times till finally $S_e \ldots S_{2e-1}$ are loaded into locations $32e$ through $32e+(e-1)$ of M. The result is that M is filled as shown in Table I. Each column follows sequentially the column to its left. Thus two adjacent entries in a row are 32 registers apart.

TABLE I

| | | | | | | 32−e columns | | | |
|---|---|---|---|---|---|---|---|---|---|
| $S_0$ | $S_1$ | $S_2$ | . . . | $S_{e-2}$ | $S_{e-1}$ | $S_e$ | 0 | . . . | 0 |
| $S_1$ | $S_2$ | $S_3$ | . . . | $S_{e-1}$ | $S_e$ | $S_{e+1}$ | 0 | . . . | 0 |
| $S_2$ | $S_3$ | $S_4$ | . . . | $S_e$ | $S_{e+1}$ | $S_{e+2}$ | 0 | . . . | 0 |
| . | . | . | | . | . | . | . | | . |
| . | . | . | | . | . | . | . | | . |
| . | . | . | | . | . | . | . | | . |
| $S_{e-2}$ | $S_{e-1}$ | $S_e$ | . . . | $S_{2e-4}$ | $S_{2e-3}$ | $S_{2e-2}$ | 0 | . . . | 0 |
| $S_{e-1}$ | $S_e$ | $S_{e+1}$ | . . . | $S_{2e-3}$ | $S_{2e-2}$ | $S_{2e-1}$ | 0 | . . . | 0 |
| 32−e rows | | | | | | | | | |
| 0 | 0 | 0 | . . . | 0 | 0 | 0 | 0 | . . . | 0 |
| . | . | . | | . | . | . | . | | . |
| . | . | . | | . | . | . | . | | . |
| . | . | . | | . | . | . | . | | . |
| 0 | 0 | 0 | . . . | 0 | 0 | 0 | 0 | . . . | 0 |

Note that, no matter what the value of $t$, the coefficients of the $t$ desired equations appear in the $t \times t$ sub-matrix found in the upper left-hand corner. The $t$ constants on the right-hand sides of the equations appear as the first $t$ entries of Column $(t+1)$. If the operations of a Crout reduction of the top left-hand $t \times (t+1)$ matrix are carried over to the rows below the $t^{th}$ and the columns to the right of the $t+1^{st}$, the reduction of the pertinent $t \times t$ matrix will be unaffected.

In all that follows, only the first $e$ rows of the first $e+1$ columns will be involved in the calculations. The $e$ entries of the first column are tested for zeros. If they are all zero, the rank of the matrix is 0. The decoding routine skips to the last step to check that the final c-e syndromes are also zero. If some entry in the column is non-zero, all $e+1$ entries of the row in which it appears is exchanged with the $e+1$ entries of the first row. (If $S_0 \neq 0$ no exchange is effected.) Let us assume $S_0 \neq 0$ for, in any event, the first entry of the matrix will now be non-zero.

The first equation is now normalized so that the leading coefficient is a 1. This is accomplished by finding $S_0^{-1}$ in the table of inverses (described above) and multiplying every other element of the first row by it.

In general, when coefficients are known to become 1 or 0 during the matrix reduction, it is not necessary to store their values so the associated registers can be used for temporary storage.

The first unknown is now eliminated from all but the first equation. This is done by adding, to each equation, the appropriate multiple of the first equation. At this point, it is hoped that $t$ is not greater than 1. If this is truly the case, columns 3, 4 . . . $e+1$ of the matrix are not required in the reduction. The addition of the appropriate multiples of the first row elements in these columns to the remaining entries in these same columns is postponed until it is ascertained that these columns will indeed be required. The calculation that actually takes place at this point is the addition, to the second coefficient of each equation except the first, of the product of the first coefficient of that equation and the second coefficient of the normalized first equation. The resulting contents of the block M are shown in Table II. The entries in parentheses are the values understood to be in each register.

TABLE II

| | | | | |
|---|---|---|---|---|
| $S_0(1)$ | $S_1'=S_1/S_0$ | $S_2'=S_2/S_0$ | . . . | $S_e'=S_e/S_0$ |
| $S_1(0)$ | $S_2''=S_2+S_1S_2'$ | $S_3$ | . . . | $S_{e+1}$ |
| $S_2(0)$ | $S_3''=S_3+S_2S_1'$ | $S_4$ | . . . | $S_{e+1}$ |
| . | . | . | | . |
| . | . | . | | . |
| . | . | . | | . |
| $S_{e+1}(0)$ | $S_e''=S_e+S_{e-1}'S_1$ | $S_{e+1}$ | . . . | $S_{2e-1}$ |

If $t$ actually equals 1, all the original equations are dependent. The newly found entries in Column 2 would all be zero. The next step then is to test the last $e-1$ entries of that column for zeros. If all entries are actually zero, it is assumed that only one error occurred. The decoding routine has already found the solution to $S_0\sigma_1-S_1$ by reducing it to $\sigma_1=S_1'$.

If some entry is non-zero, its entire row is exchanged with the entire Row 2. Let us assume thta the diagonal entry $S_2''$ in Table II is non-zero. We wish to normalize the second equation so that this coefficient is a 1. Then we can eliminate the second unknown from the last $e-2$ equations. However, before we can perform this operation, we must finish adding the multiple of Row 1 to Row 2. Thus, to every element of the second row, is added $S_1$ times the corresponding element of the first row. Then, the inverse of $S_2''$ is found in the table. All but the first two elements of Row 2 are multiplied by $S_2''^{-1}$.

Now the appropriate multiple of Row 2 can be added to all the rows below it. Since, at this point, we hope that $t$ is not more than 2, we perform this calculation on Column 3 and postpone it for the remaining columns. We recall also that the necessary multiples of the third coefficient of the first equation have not yet been added to the entries of Column 3. The two operations are performed simultaneously. The result is shown in Table III below.

Column 3 is tested for zeros from the diagonal down. If every entry is indeed zero, it is assumed that two errors occurred. The equations to be solved are then

(13) $$S_0\sigma_2+S_1\sigma_1=S_2$$

(14) $$S_1\sigma_2+S_2\sigma_1=S_3$$

They have, so far, been reduced to (13a) $$\sigma_2+S_1\sigma_1=S_2'$$

(14a) $$\sigma_1=S_3'''$$

The remaining calculations involved in the solution are left to the next step in the decoding algorithm.

TABLE III

| | | | | | | | |
|---|---|---|---|---|---|---|---|
| $S_0$ | (1) | $S_1'$ | | $S_2'$ | $S_3'$ | | $S'$ |
| $S_1$ | (0) | $S_2''$ | (1) | $\left[S_3'''=\frac{S_3+S_1S_2'}{S_2''}\right]$ | $\left[S_4'''=\frac{S_4+S_1S_3'}{S_2''}\right]$ | . . . | $\left[S_{e+1}'''=\frac{S_{e+1}+S_1S_e'}{S_2''}\right]$ |
| $S_2$ | (0) | $S_3''$ | (0) | $\left[S_4+S_2S_2'+S_3''S_3'''\right]$ | $S_5$ | . . . | $S_{e+2}$ |
| . | | . | | . | . | | . |
| . | | . | | . | . | | . |
| . | | . | | . | . | | . |
| $S_{e-1}$ | (0) | $S_e''$ | (0) | $\left[S_{e+1}+S_{e-1}S_2'+S_e''S_3'''\right]$ | $S_{e+2}$ | . . . | $S_{2e-1}$ |

If a non-zero entry is found in the last $e-2$ entries of Column 3, its entire row is exchanged with Row 3. The appropriate multiples of entries of Rows 1 and 2 are added to the elements of Row 3 to the right of the diagonal. Row 3 is normalized to make its diagonal element 1 and the third unknown is eliminated from the remaining equations. Column 4, from the diagonal down, is tested for zeros. The reduction continues until either a column of zeros is found (and less than $e$ errors are assumed) or the entire $e \times e$ matrix is diagonalized (and $e$ errors are assumed).

To summarize, we describe one general iteration in the matrix reduction. For this purpose, we define the "initial inner product" for the $rkth$ element of a general matrix $(a_{ij})$.

$$IIP(r, k)=\sum_{j=1}^{m} a_{rj}a_{jk} \tag{15}$$

where $m=\min(r,k)$

In what follows, the elements $a_{ij}$ are the values actually stored in the matrix block M.

Suppose the Column $h$, from the diagonal down, has been found to contain a non-zero entry and rows have been exchanged (if necessary) so that the non-zero entry is on the main diagonal. Then the number of errors is at least $h$ and the algorithm proceeds as follows:

(1) If $h \neq 1$, $a_{hk}+IIP(h,k) \rightarrow a_{hk}$ for $k=h+1, h+2 \ldots e+1$ (2) $a_{hh}^{-1}a_{hk} \rightarrow a_{hk}$ for $k=h+1, h+2 \ldots e+1$ (3) If $h=e$, assume $t=e$ and got to Step 7. Otherwise $h+1 \rightarrow h$ and proceed (4) $a_{rh}+IIP(r,h) \rightarrow a_{rh}$ for $r=h, h+1 \ldots e$ (5) If $a_{rh}=0$ for $r=h, h+1 \ldots e$, assume $t=h-1$ and go to Step 7. If $a_{hh}=0$ but $a_{r_0h} \neq 0$ for some $h<r_0 \leq e$, $a_{r_0k} \leftrightarrow a_{hk}$ for $k=1, 2 \ldots e=1$ (6) Now $a_{hh} \neq 0$. Go to step 1

(7) Solve reduced equations for $\sigma_1, \sigma_2 \ldots \sigma_t$.

We now describe the procedure in Step 7. Once the initial $t$ equations have been reduced to triangular form, it is a simple matter to calculate the values of $\sigma_1, \sigma_2 \ldots \sigma_t$ in order. The pertinent entries in the matrix are shown in Table IV. ($S_j(i)$ means $S_j$ with $i$ primes.

TABLE IV

| | | | | | | |
|---|---|---|---|---|---|---|
| (1) | $S_i$ | $S_2'$ | . . . | $S'_{t-2}$ | $S'_{t-1}$ | $S'_t$ |
| (0) | (1) | $S_3'''$ | . . . | $S'''_{t-1}$ | $S'''_t$ | $S'''_{t+1}$ |
| . | . | . | | . | . | . |
| . | . | . | | . | . | . |
| . | . | . | | . | . | . |
| (0) | (0) | (0) | . . . | (1) | $S^{(2t-3)}_{2t-3}$ | $S^{(2t-3)}_{2t-2}$ |
| (0) | (0) | (0) | . . . | (0) | (1) | $S^{(2t-1)}_{2t-1}$ |

At the $h$th iteration in the reduction of the matrix, the $h$th diagonal element played an important role. A temporary storage register T4 is reserved to hold the address of that diagonal element. When the matrix reduction has been completed. T4 contains the address of the element $a_{(t+1)(t+1)}$. This is one more than the address of the constant on the right-hand side of the $t^{th}$ equation. For convenience, a $_{(t+1)(t+1)}$. is set to 1 as shown in Table IV. As they are found, the $\sigma_i$ are stored in place of the right-hand side constants, i.e., in Column $t+1$, and T4 points to the location in which the latest $\sigma$ is stored. For ease in describing the calculations of the $\sigma_i$, we define the "final inner product" of the $h$th diagonal element of the matrix of Table IV.

$$FIP(h)=\sum_{j=h+1}^{t+1} a_{hk}a_{j(t+1)} \tag{16}$$

To find the $\alpha_i$, T4 is reduced by 1 so that it now points to $$S^{(2t-1)}_{2t-1}=\alpha_1$$

If $t=1$, all the $\alpha_i$ have been found. Otherwise, the procedure is as follows:

(1) $1 \rightarrow h$ (2) $T4-1 \rightarrow T4$ (3) $h=1=FIP(t-h) \rightarrow$ location addressed by T4

(4) $h=1 \rightarrow h$. If $h \neq t$, go to Step 2.

When this iteration ends, $\alpha_t, \alpha_{t-1} \ldots \alpha_1$ are in Column $t+1$ of the matrix and T4 contains the address of the first location in that column.

The error locators $\epsilon_1 \ldots \epsilon_t$ are the roots of the polynomial $$\begin{aligned} h(x)&=(x+\epsilon_1)\ (x+\epsilon_2)\ \ldots\ (x+\epsilon_t) \\ &=x^t+\sigma_1x^{t-1}+\ \ldots\ +\sigma_{t-1}x+\sigma_t \end{aligned} \tag{17}$$

The coefficients of this polynomial are now known and the roots can be found by an exhaustive search. For each element $b$ of the finite field, $h(b)$ is evaluated and tested for zero.

In evaluating a polynomial, the unit 9 requires the coefficients be stored in order with the coefficient of the highest power of $x$ first and the constant term last. However, the $\sigma_i$ are stored in Column $t+1$ of the matrix block in reverse order. Nevertheless, they need not be moved in memory. The roots of the polynomial $$g(x)=x^th(1/x)=\sigma_tx^t+\sigma_{t-1}x^{t-1}+\ \ldots\ +a_1x+1 \tag{18}$$

are the reciprocals of the roots of $h$.

The decoder successively evaluates $g(1)$ $g(\alpha-1)$, $g(\alpha-2)$ . . . and tests each result to ascertain whether it is zero. When the routine finds that, for example $g(\alpha-i)=0$, it stores the inverse of $\alpha-i$ (i.e., $\alpha i$), the locator for the error in position $i$) and stores the value $i-n$. After $t$ roots have been found, the search ends and the decoder proceeds to find the error values $v_1 \ldots v_t$. If, however, $g$ has been evaluated at all non-zero elements of the finite field and fewer than $t$ roots have been found, $g$ must have multiple roots and/or multiple roots outside the finite field with $m$ elements—a situation which cannot arise if $t$ distinct errors occurred. It is concluded then that there are more than $e$ errors in the message. The message is flagged accordingly and no correction is attempted.

FIND VALUE OF ERRORS

Once the $t$ error locators have been found, the error values $v_1, \ldots, v_t$ can be derived from the $t$ linear equations $$\begin{gathered} v_1+v_2\ \ldots\ +v_t=S_0 \\ v_11+v_22\ \ldots\ +v_tt=S_1 \\ * \quad * \quad * \quad * \quad * \\ v_11^{t-1}+v_22^{t-1}\ \ldots\ +v_tt^{t-1}=S_{t-1} \end{gathered} \tag{19}$$

The matrix of coefficients is a Vandermonde matrix (i.e., each column is a geometric progression). Such a matrix has a very special property. The cofactor of the $r^{th}$ entry in any column is a multiple of the cofactor of the last entry in the same column. In fact, that multiple is just the $(r-1)^{st}$ elementary symmetric fuction of the ratios in all the columns except the one in question .Thus, writing $D_t^{-1}$ for the determinant of the top left $$(t-1)\times(t-1)$$

minor and $\sigma_i$ $(t-1)$ for the $i^{th}$ symmetric function of the first $t-1$ error locators $\epsilon_1 \ldots, \epsilon_{t\ 1}$, we have $$\begin{aligned} v^t&=\frac{S_0d_{t-1}\sigma^{(t-1)}_{t-1}+S_1D_{t-1}\sigma^{(t-1)}_{t-2}+\ \ldots\ +S_{t-2}D_{t-1}\sigma^{(t-1)}_1+S_{t-1}D_{t-1}}{D_{t-1}\sigma^{(t-1)}_{t-1}+\epsilon_tD_{t-1}\sigma^{(t-1)}_{t-2}+\ \ldots\ +\epsilon_t^{t-2}D_{t-1}\sigma^{(t-1)}_1+\epsilon_t^{t-1}D_{t-1}} \\ &=\frac{S_{t-1}+S_{t-2}\sigma_1{}^{(t-1)}+\ \ldots\ +S_1\sigma^{(t-1)}_{t-2}+S_0\sigma^{(t-1)}_{t-2}}{\epsilon_t^{t-1}+\epsilon_t^{t-2}\sigma_1{}^{t-1}+\ \ldots\ +\epsilon_t\sigma^{(t-1)}_{t-2}+\sigma^{(t-1)}_{t-1}} \end{aligned} \tag{20}$$

Once $v_t$ has been found, the situation is reduced to that of $t-1$ errors if we adjust each $S_j$ by adding to it $v_t\epsilon_t^j$ (cf, Eq. 11).

In general, let us assume that $v_t, v_{t-1}, \ldots v_{k+1}$ have been found and that the syndromes have been adjusted accordingly. Let $i^{(k-1)}$ be the $i^{th}$ elementary symmetric function of $\epsilon_1, \epsilon_2, \ldots, \epsilon_{k-1}$. Then we find $v_k$ from the equations $$(21)\quad \begin{aligned} &v_1+v_2+\ldots+v_k=S_0\\ &v_1\epsilon_1+v_2\epsilon_2+\ldots+v_k\epsilon_k=S_1\\ &* \quad * \quad * \quad * \quad *\\ &v_1\epsilon_1^{k-1}+v_2\epsilon_2^{k-2}+\ldots+v_k\epsilon_k^{k-1}=S_{k-1}\end{aligned}$$

Again taking advantage of the properties of the vandermonde matrix of coefficients, we have $$(22)\quad v_k=\frac{S_{k-1}+S_{k-2}+\sigma_1^{(k-1)}+\ldots+S_1\sigma_{k-2}^{(k-1)}+S_0\sigma_{k-1}^{(k-1)}}{{}_k^{k-1}+\epsilon_k^{k-2}\sigma_1^{k-1}+\ldots+\epsilon_k\sigma_{k-2}^{(k-1)}+\sigma_{k-1}^{(k-1)}}$$

For each $j=0,1, \ldots, c-1$, we can adjust $S_j$ by adding to it $v_k\epsilon_k^j$ and proceed to find $v_{k-1}$.

The actual procedure for finding the $v_1, \ldots, v_t$ is divided into two parts. The first calculates the $\sigma_i^{(k)}$ for $i=0,1, \ldots, k$ and $k=1,2, \ldots, t-1$. They are stored in the columns of the matrix block such that Column $k$ contains $\sigma_0^{(k)}, \sigma_1^{(k)}, \ldots, \sigma_k^{(k)}$. If $t>1$, the first two locations of Column 1 of the matrix are loaded with the values 1 and $\epsilon_1$, respectively.

Let us assume that Column $k$ has been loaded with $1, \sigma_1^{(k)}, \ldots, k^{(k)}$. If $t>k+1$, the calculations continues as follows:

$$0\sigma_{k+1}^{(k)}$$

which is stored immediately following $\sigma_k^{(k)}$, $1>\sigma_0^{(k+1)}$ and $$\sigma_{i=1}^{(k)}\epsilon_{k+1}+\sigma_i^{(k)}>\sigma_i^{(k+1)} \text{ for } i=1, 2, \ldots k+1$$

which are stored in the first $k+2$ locations in column $k+1$.

The second part of the procedure interatively calculates the error values $v_t, v_{t-1}, \ldots, v_1$ and adjusts all the syndromes accordingly. The error values are tabulated in the same order as the error locators. Let us assume that $v_t, v_{t-1}, \ldots, v_{k+1}$ have been found and that the $S_j$ have been adjusted so that they reflect only the first $k$ errors. Column $k-1$ contains the elementary symmetric functions of the error locators $\epsilon_1, \epsilon_2, \ldots, \epsilon_{k-1}$. The Unit 9, in the polynomial mode described above calculates $$(23)\quad \sum_{i=0}^{k-1}\sigma_i^{(k-1)}\epsilon_k^{k-1-i}$$

which is the denominator in Equation 22. The inverse of the result is stored in the $(k+1)^{st}$ location of Column $k-1$ (i.e., immediately after $$\sigma_{k-1}^{(k-1)})$$

The numerator of Equation 22 is an inner product but the vector of $S_j$'s is stored in the reverse order. Thus, the address of the $\sigma_i^{(k-1)}$'s is controlled by the register R1 Unit 9 and is incremented by 1 on each iteration. The PDP–8 regulates the address of the $S_j$'s and on each iteration decrements that address by 1. When the calculation of the numerator is complete, contains the address of the inverse of the denominator and $v_k$ is found with one more multiplication.

For this last multiplication, the flip-flop CLBF is set to 0. This means that the register B contains the value $v_k$ after the operation. It is then an easy matter to add $v_k$ to $S_0$. The product $v_k\epsilon_k$ is found and the result saved both in the B Register and in memory. It is added to $S_1$. The value of $v_k\epsilon_k$ is multiplied by $\epsilon_k$ and again saved both in the B Register and is memory. $S_2$ is adjusted and the process continues till $S_{c-1}$ is up-dated.

The entire operation proceeds till all error values except $v_1$ have been found. The last equation to be solved is simply $v_1=S_0$. Thus, $S_0$ is moved to the head of the table of error values and the $S_j$'s are adjusted for the final time.

At this point, under the assumption that $t>e$, we have found $t$ error locators and $t$ error values. We have also re-evaluated the syndromes to reflect the result of adding to the received message, in each of the indicated locations, the corresponding value. If the received message modified in this way is to be the original coded message, all $c$ adjusted syndromes should be zero. If they are not found all zero, $t$ must have been greater than $e$. The message is flagged as having an excessive number of errors and no correction is attempted.

The probability that all the adjusted syndromes are zero when $t>e$ is very small. It can be safely assumed that, if all the $S_j$ are zero, no more than $e$ errors occured and we have the correct $t, \epsilon_1, \ldots \epsilon_t, v_1, \ldots, v_t$.

We are now ready to perform the actual correction. It should be recalled that $\epsilon_k=\alpha^ik$ and we have a table of $i_{1-n}, \ldots, i_{t-n}$. The Unit 9 is used to perform the operation $$v_k\cdot 1+b_{i_k}\to b_{i_k}$$

for each $k=1,2, \ldots, t$. The Register R1 controls stepping through the table of $v_k$'s. On each iteration, R2 is loaded with the address of $$b'_{i_k}$$

i.e. with the address of $$b'_{n-1}-(i_k^{-n})+1$$

(Recall that the order of storing the message is $b_{n-1}$, $b_{n-2}, \ldots, b_0$.)

After all $t$ corrections have been made, the message block is ready for delivery to the output device. The decoder now enters a tight loop. It repeatedly tests the address in which the latest received symbol was stored by the interrupt fixup routine. When it recognizes that a new message is completely in memory, it is ready to start decoding once again.

An actual decoding program is given in Table V below. Included are initialization, provision for entering desired values of constants, as to fix the value of C, the number of check symbols to be included. Also in the program are routines for collecting statistics on channel errors and decoder performance, in terms of numbers of bits received per error and comparison of decoder output with a standard message, respectively. The latter is useful in checking the operation of the apparatus. The former can be used in an extension of the program to change the value of C from time to time as more or less redundancy was desired under changing channel conditions.

The actual starting address in the program is 0740. However, address 2000 is the nominal starting address, and the program can be started by setting that address into the program counter through the register SWR, then pressing the RUN button on the console. The program will then proceed to location 0740 to commence the program. The contents of memory locations not specified in Table V may be set to zero, but are immaterial.

TABLE V.—MEMORY LOCATION/CONTENTS

| ML | C |
|---|---|
| [1] 0000 | 0000 |
| 0001 | 5602 |
| 0002 | 1021 |
| 0003 | 0000 |
| 0004 | 0000 |
| 0005 | 0000 |
| 0006 | 0000 |
| 0007 | ---- |
| 0007 | ---- |
| 0020 | 0000 |
| 0021 | 0000 |
| 0022 | 0000 |
| 9023 | 0000 |
| 0024 | 0000 |
| 0025 | 0000 |
| 0026 | 0000 |
| 0027 | 0000 |
| 0030 | 0000 |
| 0031 | 0000 |
| 0032 | 0000 |
| 0033 | 0000 |
| 0034 | 0000 |
| 0035 | 0000 |
| 0036 | 0000 |
| 0037 | 0000 |
| 0040 | 0000 |
| 0041 | 0000 |
| 0042 | 0000 |
| 0043 | 0000 |
| 0044 | 0000 |
| 0045 | 0000 |
| 0046 | 0000 |
| 0047 | 0000 |
| 0050 | 0000 |
| 0051 | 0000 |
| 0052 | 0000 |
| 0053 | 0000 |
| 0054 | 0000 |
| 0055 | 0000 |
| 0056 | 0000 |
| 0057 | 0000 |
| 0060 | 0000 |
| 0061 | 0000 |
| 0062 | 0000 |
| 0063 | 0000 |
| 0064 | 0000 |
| 0065 | 0000 |
| 0066 | 0000 |
| 0067 | 0000 |
| 0070 | 0000 |
| 0071 | 0000 |
| 0072 | 0000 |
| 0073 | 0000 |
| 0074 | 0000 |
| 0075 | 0000 |
| 0076 | 0000 |
| 0077 | 0000 |
| 0100 | 0000 |
| 0101 | 0000 |
| 0102 | 0000 |
| 0103 | 0000 |
| 0104 | 0000 |
| 0105 | 0000 |
| 0106 | 0000 |
| 0107 | 0000 |
| 0110 | 0000 |
| 0111 | 0000 |
| 0112 | 0000 |
| 0113 | 0000 |
| 0114 | 1723 |
| 0115 | 1707 |
| 0116 | 3243 |
| 0117 | 3242 |
| 0120 | 0036 |
| 0121 | 3343 |
| 0122 | 6004 |
| 0123 | 6004 |
| 0124 | 3303 |
| 0125 | 3302 |
| 0126 | 3743 |
| 0127 | 3742 |
| 0130 | 3142 |
| 0131 | 2542 |
| 0132 | 0021 |
| 0133 | 7663 |
| 0134 | 2515 |
| 0135 | 1032 |
| 0136 | 2142 |
| 0137 | 0236 |
| 0140 | 0237 |
| 0141 | 3001 |
| 0142 | 1000 |
| 0143 | 0010 |
| 0144 | 0020 |
| 0145 | 0040 |
| 0146 | 0041 |
| 0147 | 0376 |
| 0150 | 0377 |
| 0151 | 7776 |
| 0152 | 7774 |
| 0153 | 7770 |
| 0154 | 7744 |
| 0155 | 7740 |
| 0156 | 7737 |
| 0157 | 7470 |
| 0160 | 7401 |

| ML | C |
|---|---|
| 0161 | 0215 |
| 0162 | 0212 |
| 0163 | 0240 |
| 0164 | 0000 |
| 0165 | 0216 |
| 0166 | 2053 |
| 0167 | 1122 |
| [2] 0230 | 1377 |
| 0231 | 0541 |
| 0232 | 4035 |
| 0233 | 7001 |
| 0234 | 0062 |
| 0235 | 7773 |
| 0236 | 2006 |
| 0237 | 1134 |
| 0240 | 6375 |
| 0241 | 1003 |
| 9242 | 3036 |
| 0243 | 1130 |
| 0244 | 3010 |
| 0245 | 6404 |
| 0246 | 7001 |
| 0247 | 5256 |
| 0250 | 1132 |
| 0251 | 6365 |
| 0252 | 1141 |
| 0253 | 6407 |
| 0254 | 7126 |
| 0255 | 6004 |
| 0256 | 3021 |
| 0257 | 1107 |
| 0260 | 6365 |
| 0261 | 1235 |
| 0262 | 3027 |
| 0263 | 7200 |
| 0264 | 1234 |
| 0265 | 6403 |
| 0266 | 1021 |
| 0267 | 6004 |
| 0270 | 2027 |
| 0271 | 5263 |
| 0272 | 3410 |
| 0273 | 2036 |
| 0274 | 5250 |
| [3] 0275 | 1164 |
| 0276 | 3036 |
| 0277 | 1130 |
| 0300 | 3020 |
| 0301 | 1127 |
| 0302 | 3011 |
| 0303 | 1145 |
| 0304 | 1004 |
| 0305 | 3021 |
| 0306 | 5313 |
| 0307 | 2020 |
| 0310 | 1011 |
| 0311 | 1021 |
| 0312 | 3011 |
| 0313 | 1020 |
| 0314 | 3010 |
| 0315 | 1004 |
| 0316 | 3027 |
| 0317 | 1410 |
| 0320 | 3411 |
| 0321 | 2027 |
| 0322 | 5317 |
| 0323 | 2036 |
| 0324 | 5307 |
| [4] 0325 | 1004 |
| 0326 | 3036 |
| 0327 | 1004 |
| 0330 | 3030 |
| 0331 | 3932 |
| 0332 | 1126 |
| 0333 | 3025 |
| 0334 | 1127 |
| 0335 | 3010 |
| 0336 | 1410 |
| 0337 | 7640 |
| 0340 | 5344 |
| 0341 | 2030 |
| 0342 | 5336 |
| 0343 | 5630 |
| 0344 | 1132 |
| 0345 | 6375 |
| 0346 | 1233 |
| 0347 | 6407 |
| 0350 | 1010 |
| 0351 | 1232 |
| 0352 | 7450 |
| 0353 | 5631 |
| 0354 | 1126 |
| 0355 | 3020 |
| 0356 | 1164 |
| 0357 | 3030 |
| 0360 | 1126 |
| 0361 | 5367 |
| 0362 | 1020 |
| 0363 | 1145 |
| 0364 | 3020 |
| 0365 | 1021 |
| 0366 | 1145 |
| 0367 | 3021 |
| 0370 | 1420 |
| 0371 | 3023 |
| 0372 | 1421 |

| ML | C |
|---|---|
| 0373 | 3420 |
| 0374 | 1023 |
| 0375 | 3421 |
| 0376 | 2030 |
| 0377 | 5362 |
| 0400 | 5341 |
| 0401 | 7240 |
| 0402 | 1025 |
| 0403 | 3011 |
| 0404 | 1011 |
| 0405 | 3012 |
| 0406 | 1011 |
| 0407 | 3013 |
| 0410 | 1032 |
| 0411 | 7041 |
| 4012 | 1126 |
| 0413 | 3020 |
| 0414 | 1020 |
| 0415 | 3026 |
| 0416 | 1011 |
| 0417 | 1032 |
| 0420 | 3023 |
| 0421 | 1036 |
| 0422 | 3027 |
| 0423 | 5225 |
| 0424 | 2020 |
| 0425 | 1023 |
| 0426 | 3010 |
| 0427 | 1020 |
| 0430 | 6365 |
| 0431 | 1032 |
| 0432 | 3030 |
| 0433 | 1411 |
| 0434 | 3021 |
| 0435 | 1410 |
| 0436 | 6004 |
| 0437 | 2030 |
| 0440 | 5234 |
| 0441 | 3412 |
| 0442 | 2027 |
| 0443 | 5224 |
| 0444 | 1036 |
| 0445 | 3030 |
| 0446 | 1413 |
| 0447 | 7640 |
| 0450 | 5254 |
| 0451 | 2030 |
| 0452 | 5246 |
| 0453 | 5377 |
| 0454 | 1025 |
| 0455 | 7041 |
| 0456 | 1013 |
| 0457 | 7450 |
| 0460 | 5304 |
| 0461 | 1026 |
| 0462 | 3020 |
| 0463 | 1164 |
| 0464 | 3030 |
| 0465 | 5274 |
| 0466 | 1020 |
| 0467 | 1145 |
| 0470 | 3020 |
| 0471 | 1026 |
| 0472 | 1145 |
| 0473 | 3026 |
| 0474 | 1420 |
| 0475 | 3021 |
| 0476 | 1426 |
| 0477 | 3420 |
| 0500 | 1021 |
| 0501 | 3426 |
| 0502 | 2030 |
| 0503 | 5266 |
| 0504 | 1032 |
| 0505 | 7041 |
| 0506 | 1126 |
| 0507 | 3020 |
| 0510 | 1036 |
| 0511 | 3027 |
| 0512 | 1025 |
| 0513 | 5315 |
| 0514 | 1026 |
| 0515 | 1145 |
| 0516 | 3026 |
| 0517 | 1023 |
| 0520 | 1145 |
| 0521 | 3023 |
| 0522 | 1023 |
| 0523 | 3010 |
| 0524 | 1020 |
| 0525 | 6265 |
| 0526 | 1032 |
| 0527 | 3030 |
| 0530 | 1426 |
| 0531 | 3021 |
| 0532 | 1410 |
| 0533 | 6004 |
| 0534 | 2030 |
| 0535 | 5331 |
| 0536 | 3426 |
| 0537 | 2027 |
| 0540 | 5314 |
| 0541 | 1425 |
| 0542 | 1121 |
| 0543 | 3020 |
| 0544 | 1420 |

See footnotes at end of table.

TABLE V.—MEMORY LOCATION/CONTENTS—Continued

| ML | C |
|---|---|
| 0545 | 3020 |
| 0546 | 3021 |
| 0547 | 1036 |
| 0550 | 3027 |
| 0551 | 1025 |
| 0552 | 1145 |
| 0553 | 3026 |
| 0554 | 1026 |
| 0555 | 6365 |
| 0556 | 5362 |
| 0557 | 1026 |
| 0560 | 1145 |
| 0561 | 3026 |
| 0562 | 1020 |
| 0563 | 6004 |
| 0564 | 3426 |
| 0565 | 2027 |
| 0566 | 5357 |
| 0567 | 7240 |
| 0570 | 1032 |
| 0571 | 3032 |
| 0572 | 1025 |
| 0573 | 1146 |
| 0574 | 3025 |
| 0575 | 2036 |
| 0576 | 5201 |
| [5] 0577 | 7001 |
| 0600 | 3425 |
| 0601 | 7040 |
| 0602 | 1025 |
| 0603 | 3025 |
| 0604 | 7001 |
| 0605 | 1032 |
| 0606 | 7450 |
| 0607 | 5242 |
| 0610 | 3036 |
| 0611 | 1025 |
| 0612 | 7410 |
| 0613 | 1020 |
| 0614 | 1156 |
| 0615 | 3020 |
| 0616 | 7040 |
| 0617 | 1025 |
| 0620 | 3025 |
| 0621 | 1025 |
| 0622 | 3010 |
| 0623 | 1020 |
| 0624 | 6365 |
| 0625 | 1036 |
| 0626 | 7041 |
| 0627 | 1032 |
| 0630 | 3030 |
| 0631 | 1425 |
| 0632 | 3021 |
| 0633 | 1410 |
| 0634 | 6004 |
| 0635 | 2030 |
| 0636 | 5232 |
| 0637 | 3425 |
| 0640 | 2036 |
| 0641 | 5213 |
| [6] 0642 | 1134 |
| 0643 | 6375 |
| 0644 | 1160 |
| 0645 | 3036 |
| 0646 | 1032 |
| 0647 | 3027 |
| 0650 | 1117 |
| 0651 | 3010 |
| 0652 | 1125 |
| 0653 | 3011 |
| 0654 | 1032 |
| 0655 | 7041 |
| 0656 | 1142 |
| 0657 | 3020 |
| 0660 | 7001 |
| 0661 | 5273 |
| 0662 | 2036 |
| 0663 | 7410 |
| 0664 | 5720 |
| 0665 | 1132 |
| 0666 | 6365 |
| 0667 | 1141 |
| 0670 | 6407 |
| 0671 | 1165 |
| 0672 | 6004 |
| 0673 | 3021 |
| 0674 | 1025 |
| 0675 | 6365 |
| 0676 | 1020 |
| 0677 | 6407 |
| 0700 | 1021 |
| 0701 | 6004 |
| 0702 | 7000 |
| 0703 | 7640 |
| 0704 | 5262 |
| 0705 | 1036 |
| 0706 | 3411 |
| 0707 | 1021 |
| 0710 | 1121 |
| 0711 | 3023 |
| 0712 | 1423 |
| 0713 | 3410 |
| 0714 | 2027 |
| 0715 | 5262 |

| ML | C |
|---|---|
| 0716 | 5717 |
| 0717 | 1111 |
| 0720 | 1534 |
| [7] 0740 | 6002 |
| 0741 | 6032 |
| 0742 | 6042 |
| 0743 | 3005 |
| 0744 | 1122 |
| 0745 | 3111 |
| 0746 | 7040 |
| 0747 | 1111 |
| 0750 | 3017 |
| 0751 | 7330 |
| 0752 | 6513 |
| 0753 | 7402 |
| 0754 | 7604 |
| 0755 | 7041 |
| 0756 | 3003 |
| 0757 | 7402 |
| 0760 | 7604 |
| 0761 | 7041 |
| 0762 | 3004 |
| 0763 | 7040 |
| 0764 | 1004 |
| 0765 | 3104 |
| 0766 | 3006 |
| 0767 | 1126 |
| 0770 | 3010 |
| 0771 | 5772 |
| 0772 | 2012 |
| [8] 1000 | 6032 |
| 1001 | 6031 |
| 1002 | 5201 |
| 1003 | 6036 |
| 1004 | 7106 |
| 1005 | 7206 |
| 1006 | 7510 |
| 1007 | 5201 |
| 1010 | 7006 |
| 1011 | 6031 |
| 1012 | 5211 |
| 1013 | 6034 |
| 1014 | 7420 |
| 1015 | 3620 |
| 1016 | 3220 |
| 1017 | 5200 |
| 1020 | 0000 |
| [9] 1021 | 3304 |
| 1022 | 7010 |
| 1023 | 3305 |
| 1024 | 6501 |
| 1025 | 5251 |
| 1026 | 6504 |
| 1027 | 3506 |
| 1030 | 2106 |
| 1031 | 5234 |
| 1032 | 1122 |
| 1033 | 3106 |
| 1034 | 1106 |
| 1035 | 7041 |
| 1036 | 1017 |
| 1037 | 7650 |
| 1040 | 5246 |
| 1041 | 1305 |
| 1042 | 7104 |
| 1043 | 1304 |
| 1044 | 6001 |
| 1045 | 5400 |
| 1046 | 1306 |
| 1047 | 6001 |
| 1050 | 5707 |
| 1051 | 6041 |
| 1052 | 5302 |
| 1053 | 1417 |
| 1054 | 7510 |
| 1055 | 5261 |
| 1056 | 6046 |
| 1057 | 7200 |
| 1060 | 5241 |
| 1061 | 7200 |
| 1062 | 1111 |
| 1063 | 1150 |
| 1064 | 7450 |
| 1065 | 1122 |
| 1066 | 3111 |
| 1067 | 7040 |
| 1070 | 1111 |
| 1071 | 3017 |
| 1072 | 1111 |
| 1073 | 7041 |
| 1074 | 1107 |
| 1075 | 7640 |
| 1076 | 5253 |
| 1077 | 3005 |
| 1100 | 6042 |
| 1101 | 5241 |
| 1102 | 6032 |
| 1103 | 5241 |
| 1104 | 0000 |
| 1105 | 0000 |
| 1106 | 2537 |
| 1107 | 1535 |
| [10] 1110 | 1354 |
| 1111 | 7201 |
| 1112 | 1032 |
| 1113 | 7500 |

| ML | C |
|---|---|
| 1114 | 5710 |
| 1115 | 3030 |
| 1116 | 1127 |
| 1117 | 3011 |
| 1120 | 7001 |
| 1121 | 3411 |
| 1122 | 1516 |
| 1123 | 3411 |
| 1124 | 1132 |
| 1125 | 6375 |
| 1126 | 7001 |
| 1127 | 1030 |
| 1130 | 7500 |
| 1131 | 5376 |
| 1132 | 3036 |
| 1133 | 1141 |
| 1134 | 6407 |
| 1135 | 1116 |
| 1136 | 3012 |
| 1137 | 1126 |
| 1140 | 3010 |
| 1141 | 1010 |
| 1142 | 5346 |
| 1143 | 1020 |
| 1144 | 3010 |
| 1145 | 1020 |
| 1146 | 1145 |
| 1147 | 3020 |
| 1150 | 3411 |
| 1151 | 1020 |
| 1152 | 3011 |
| 1153 | 7001 |
| 1154 | 3420 |
| 1155 | 1010 |
| 1156 | 6365 |
| 1157 | 1412 |
| 1160 | 3023 |
| 1161 | 1036 |
| 1162 | 7041 |
| 1163 | 1032 |
| 1164 | 3027 |
| 1165 | 1410 |
| 1166 | 3021 |
| 1167 | 1023 |
| 1170 | 6004 |
| 1171 | 3411 |
| 1172 | 2027 |
| 1173 | 5365 |
| 1174 | 2036 |
| 1175 | 5343 |
| [11] 1176 | 1030 |
| 1177 | 3036 |
| 1200 | 1032 |
| 1201 | 7040 |
| 1202 | 3026 |
| 1203 | 7126 |
| 1204 | 1126 |
| 1205 | 3023 |
| 1206 | 1116 |
| 1207 | 3012 |
| 1210 | 1126 |
| 1211 | 5217 |
| 1212 | 1023 |
| 1213 | 1146 |
| 1214 | 3023 |
| 1215 | 1020 |
| 1216 | 1145 |
| 1217 | 3020 |
| 1220 | 1020 |
| 1221 | 6365 |
| 1222 | 1032 |
| 1223 | 7041 |
| 1224 | 1030 |
| 1225 | 6407 |
| 1226 | 1412 |
| 1227 | 6004 |
| 1230 | 1121 |
| 1231 | 3021 |
| 1232 | 1421 |
| 1233 | 3423 |
| 1234 | 2030 |
| 1235 | 5212 |
| 1236 | 2020 |
| 1237 | 1012 |
| 1240 | 3023 |
| 1241 | 1366 |
| 1242 | 1026 |
| 1243 | 3025 |
| 1244 | 1133 |
| 1245 | 1026 |
| 1256 | 5257 |
| 1247 | 7040 |
| 1250 | 1023 |
| 1251 | 3023 |
| 1252 | 1020 |
| 1253 | 1155 |
| 1254 | 3020 |
| 1255 | 7040 |
| 1256 | 1026 |
| 1257 | 3026 |
| 1260 | 1141 |
| 1261 | 6407 |
| 1262 | 1020 |
| 1263 | 6365 |
| 1264 | 1425 |
| 1265 | 3021 |

See footnotes at end of table.

TABLE V.—MEMORY LOCATION/CONTENTS—Continued

| ML | C | ML | C | ML | C |
|---|---|---|---|---|---|
| 1266 | 7040 | 1535 | 3026 | 1705 | 1123 |
| 1267 | 1025 | 1536 | 7040 | 1706 | 3714 |
| 1270 | 3025 | 1537 | 1107 | 1707 | ---- |
| 1271 | 1036 | 1540 | 3013 | 1707 | 0000 |
| 1272 | 3030 | 1541 | 7040 | 1710 | 3020 |
| 1273 | 1025 | 1542 | 1131 | 1711 | 1020 |
| 1274 | 5300 | 1543 | 3012 | 1712 | 7004 |
| 1275 | 3021 | 1544 | 3035 | 1713 | 7006 |
| 1276 | 7040 | 1545 | 1160 | 1714 | 7006 |
| 1277 | 1035 | 1546 | 3036 | 1715 | 0302 |
| 1300 | 3035 | 1547 | 1412 | 1716 | 1300 |
| 1301 | 1435 | 1550 | 7041 | 1717 | 3021 |
| 1302 | 6004 | 1551 | 1413 | 1720 | 1421 |
| 1303 | 2020 | 1552 | 7640 | 1721 | 3411 |
| 1304 | 5275 | 1553 | 2105 | 1722 | 5337 |
| 1305 | 3035 | 1554 | 2036 | 1723 | 0000 |
| 1306 | 3021 | 1555 | 5347 | 1724 | 3020 |
| 1307 | 1365 | 1556 | 1110 | 1725 | 1323 |
| 1310 | 6403 | 1557 | 1003 | 1726 | 3307 |
| 1311 | 1035 | 1560 | 3012 | 1727 | 1020 |
| 1312 | 6004 | 1561 | 1026 | 1730 | 7012 |
| 1313 | 3426 | 1562 | 7450 | 1731 | 7012 |
| 1314 | 1426 | 1563 | 5373 | 1732 | 0302 |
| 1315 | 3010 | | | 1733 | 1300 |
| 1316 | 1423 | [15] 1564 | 3010 | 1734 | 3021 |
| 1317 | 3035 | 1565 | 1410 | 1735 | 1421 |
| 1320 | 1003 | 1566 | 3412 | 1736 | 3411 |
| 1321 | 3030 | 1567 | 1410 | 1737 | 1020 |
| 1322 | 1130 | 1570 | 3412 | 1740 | 0302 |
| 1323 | 3013 | 1571 | 2024 | 1741 | 1300 |
| 1324 | 5334 | 1572 | 2113 | 1742 | 3021 |
| 1325 | 1143 | | | 1743 | 1421 |
| 1326 | 6365 | [16] 1573 | 7040 | 1744 | 3411 |
| 1327 | 1365 | 1574 | 3412 | 1745 | 5707 |
| 1330 | 6407 | 1575 | 7040 | 1746 | 7402 |
| 1331 | 1035 | 1576 | 1107 | [17] 2000 | 5601 |
| 1332 | 6004 | 1577 | 3011 | 2001 | 0740 |
| 1333 | 3010 | 1600 | 7040 | [18] 2011 | 2200 |
| 1334 | 1013 | 1601 | 1102 | 2012 | 1126 |
| 1335 | 7001 | 1602 | 0303 | 2013 | 6365 |
| 1336 | 6365 | 1603 | 7640 | 2014 | 7001 |
| 1337 | 6401 | 1604 | 5211 | 2015 | 3526 |
| 1340 | 7201 | 1605 | 1161 | 2016 | 1134 |
| 1341 | 6004 | 1606 | 3411 | 2017 | 6375 |
| 1342 | 3413 | 1607 | 1162 | 2020 | 1141 |
| 1343 | 2030 | 1610 | 5214 | 2021 | 6407 |
| 1344 | 5325 | 1611 | 1163 | 2022 | 1160 |
| 1345 | 2036 | 1612 | 3411 | 2023 | 3036 |
| 1346 | 5247 | 1613 | 1163 | 2024 | 7126 |
| 1347 | 1516 | 1614 | 3411 | 2025 | 6004 |
| 1350 | 7041 | 1615 | 1034 | 2026 | 3410 |
| 1351 | 1035 | 1616 | 4323 | 2027 | 2036 |
| 1352 | 7650 | 1617 | 1032 | 2030 | 5224 |
| 1353 | 5377 | 1620 | 7041 | 2031 | 3521 |
| 1354 | 1766 | 1621 | 4323 | 2032 | 1127 |
| 1355 | 3533 | 1622 | 1105 | 2033 | 3010 |
| 1356 | 1533 | 1623 | 4323 | 2034 | 1160 |
| 1357 | 3010 | 1624 | 7040 | 2035 | 3036 |
| 1360 | 1516 | 1625 | 3411 | 2036 | 1126 |
| 1361 | 3035 | 1626 | 1110 | 2037 | 1150 |
| 1362 | 7040 | 1627 | 7001 | 2040 | 5243 |
| 1363 | 3036 | 1630 | 7450 | 2041 | 7040 |
| 1364 | 5320 | 1631 | 1123 | 2042 | 1020 |
| 1365 | 2001 | 1632 | 3107 | 2043 | 3020 |
| 1366 | 3143 | 1633 | 1035 | 2044 | 1420 |
| | | 1634 | 1304 | 2045 | 1121 |
| [12] 1377 | 3766 | 1635 | 7640 | 2046 | 3021 |
| 1400 | 1130 | 1636 | 5243 | 2047 | 1410 |
| 1401 | 3010 | 1637 | 1122 | 2050 | 3421 |
| 1402 | 1003 | 1640 | 3107 | 2051 | 2036 |
| 1403 | 3036 | 1641 | 1231 | 2052 | 5241 |
| 1404 | 1410 | 1642 | 3535 | 2053 | 3023 |
| 1405 | 7640 | 1643 | 1035 | 2054 | 1153 |
| 1406 | 5334 | 1644 | 1152 | 2055 | 3036 |
| 1407 | 2036 | 1645 | 7650 | 2056 | 3020 |
| 1410 | 5204 | 1646 | 1110 | 2057 | 1023 |
| | | 1647 | 1003 | 2060 | 7041 |
| [13] 1411 | 2022 | 1650 | 3011 | 2061 | 3021 |
| 1412 | 1032 | 1651 | 1161 | 2062 | 6501 |
| 1413 | 7450 | 1652 | 3411 | 2063 | 5262 |
| 1414 | 5335 | 1653 | 1162 | 2064 | 6504 |
| 1415 | 3036 | 1654 | 3411 | 2065 | 3023 |
| 1416 | 1133 | 1655 | 5263 | 2066 | 7040 |
| 1417 | 6365 | 1656 | 7040 | 2067 | 1023 |
| 1420 | 1141 | 1657 | 3411 | 2070 | 1021 |
| 1421 | 6407 | 1660 | 1005 | 2071 | 7120 |
| 1422 | 1125 | 1661 | 7640 | 2072 | 7640 |
| 1423 | 3010 | 1662 | 5271 | 2073 | 7040 |
| 1424 | 1410 | 1663 | 2005 | 2074 | 7004 |
| 1425 | 7040 | 1664 | 1301 | 2075 | 1020 |
| 1426 | 1107 | 1665 | 6002 | 2076 | 3020 |
| 1427 | 3021 | 1666 | 3000 | 2077 | 1020 |
| 1430 | 1021 | 1667 | 5677 | 2100 | 1144 |
| 1431 | 6375 | 1670 | 7200 | 2101 | 7640 |
| 1432 | 7001 | 1671 | 1102 | 2102 | 5306 |
| 1433 | 6004 | 1672 | 1306 | 2103 | 7001 |
| 1434 | 3421 | 1673 | 7650 | 2104 | 6514 |
| 1435 | 2036 | 1674 | 5346 | 2105 | 5254 |
| 1436 | 5224 | 1675 | 5676 | 2106 | 1020 |
| 1437 | 2112 | 1676 | 2164 | 2107 | 1155 |
| 1440 | 5335 | 1677 | 1053 | 2110 | 7640 |
| [14] 1530 | 1643 | 1700 | 2516 | 2111 | 5257 |
| 1531 | 1622 | 1701 | 1670 | 2112 | 2036 |
| 1532 | 1564 | 1702 | 0017 | 2113 | 5256 |
| 1533 | 2535 | 1703 | 0007 | 2114 | 7001 |
| 1534 | 1333 | 1704 | 7775 | 2115 | 1023 |

See footnotes at end of table.

TABLE V.—MEMORY LOCATION/CONTENTS—Continued

| ML | C | ML | C | ML | C |
|---|---|---|---|---|---|
| 2116 | 1160 | 2270 | 7041 | 2540 | 0212 |
| 2117 | 7450 | 2271 | 1122 | 2541 | 0324 |
| 2120 | 5330 | 2272 | 7450 | 2542 | 0215 |
| 2121 | 3036 | 2273 | 5536 | 2543 | 0212 |
| 2122 | 6501 | 2274 | 3036 | 2544 | 0315 |
| 2123 | 5322 | 2275 | 7040 | 2545 | 0311 |
| 2124 | 6504 | 2276 | 1122 | 2546 | 0324 |
| 2125 | 7200 | 2277 | 3010 | 2547 | 0322 |
| 2126 | 2036 | 2300 | 1010 | 2550 | 0305 |
| 2127 | 5322 | 2301 | 1150 | 2551 | 0240 |
| 2130 | 1122 | 2302 | 3011 | 2552 | 0271 |
| 2131 | 3106 | 2303 | 5776 | 2553 | 0265 |
| 2132 | 6001 | 2304 | 2034 | 2554 | 0260 |
| 2133 | 1122 | 2305 | 7006 | 2555 | 0240 |
| 2134 | 3123 | 2306 | 7006 | 2556 | 0303 |
| 2135 | 5342 | 2307 | 3020 | 2557 | 0317 |
| 2136 | 1411 | 2310 | 1153 | 2560 | 0304 |
| 2137 | 3410 | 2311 | 3027 | 2561 | 0305 |
| 2140 | 2036 | 2312 | 1020 | 2562 | 0322 |
| 2141 | 5336 | 2313 | 7104 | 2563 | 0257 |
| 2142 | 3102 | 2314 | 3020 | 2564 | 0304 |
| 2143 | 3103 | 2315 | 7420 | 2565 | 0305 |
| 2144 | 3104 | 2316 | 5370 | 2566 | 0303 |
| 2145 | 1120 | 2317 | 2033 | 2567 | 0317 |
| 2146 | 3010 | 2320 | 1040 | 2570 | 0304 |
| 2147 | 7146 | 2321 | 7640 | 2571 | 0305 |
| 2150 | 1155 | 2322 | 5777 | 2572 | 0322 |
| 2151 | 3036 | 2323 | 1037 | 2573 | 0240 |
| 2152 | 3410 | 2324 | 7440 | 2574 | 0324 |
| 2153 | 2036 | 2325 | 5332 | 2575 | 0305 |
| 2154 | 5352 | 2326 | 2051 | 2576 | 0323 |
| 2155 | 3035 | 2327 | 5366 | 2577 | 0324 |
| 2156 | 1122 | 2330 | 2041 | 2600 | 0240 |
| 2157 | 3107 | 2331 | 5366 | 2601 | 0255 |
| 2160 | 1167 | 2332 | 1151 | 2602 | 0255 |
| 2161 | 3535 | 2333 | 7500 | 2603 | 0255 |
| 2162 | 3112 | 2334 | 5342 | 2604 | 0255 |
| 2163 | 3113 | 2335 | 7200 | 2605 | 0240 |
| 2164 | 1107 | 2336 | 2052 | 2606 | 0301 |
| 2165 | 1147 | 2337 | 5366 | 2607 | 0302 |
| 2166 | 3110 | 2340 | 2042 | 2610 | 0214 |
| 2167 | 1035 | 2341 | 5366 | 2611 | 0305 |
| 2170 | 7450 | 2342 | 7640 | 2612 | 0240 |
| 2171 | 5375 | 2343 | 5350 | 2613 | 0302 |
| 2172 | 1154 | 2344 | 2053 | 2614 | 0301 |
| 2173 | 7640 | 2345 | 5366 | 2615 | 0313 |
| 2174 | 5611 | 2346 | 2043 | 2616 | 0305 |
| 2175 | 3022 | 2347 | 5366 | 2617 | 0322 |
| 2176 | 3024 | 2350 | 1166 | 2620 | 0240 |
| 2177 | 3105 | 2351 | 3360 | 2621 | 0303 |
| 2200 | 1106 | 2352 | 1037 | 2622 | 0310 |
| 2201 | 7040 | 2353 | 7110 | 2623 | 0301 |
| 2202 | 1110 | 2354 | 2360 | 2624 | 0322 |
| 2203 | 7550 | 2355 | 7110 | 2625 | 0314 |
| 2204 | 5210 | 2356 | 7440 | 2626 | 0311 |
| 2205 | 1160 | 2357 | 5354 | 2627 | 0305 |
| 2206 | 7710 | 2360 | 2053 | 2630 | 0240 |
| 2207 | 5200 | 2361 | 5366 | 2631 | 0304 |
| [19] 2210 | 7200 | 2362 | 1360 | 2632 | 0317 |
| 2211 | 2102 | 2363 | 1153 | 2633 | 0307 |
| 2212 | 3034 | 2364 | 3365 | 2634 | 0240 |
| 2213 | 3033 | 2365 | 2043 | 2635 | 0305 |
| 2214 | 1131 | 2366 | 3037 | 2636 | 0301 |
| 2215 | 6365 | 2367 | 5373 | 2637 | 0323 |
| 2216 | 1132 | 2370 | 2037 | 2640 | 0331 |
| 2217 | 6375 | 2371 | 7410 | 2641 | 0240 |
| 2220 | 1141 | 2372 | 2040 | 2642 | 0306 |
| 2221 | 6407 | 2373 | 2027 | 2643 | 0317 |
| 2222 | 7040 | 2374 | 5312 | 2644 | 0330 |
| 2223 | 1107 | 2375 | 5243 | 2645 | 0215 |
| 2224 | 3010 | 2376 | 2136 | 2646 | 0212 |
| 2225 | 1160 | 2377 | 2450 | 2647 | 0307 |
| 2226 | 3036 | 2400 | ---------- | 2650 | 0305 |
| 2227 | 1410 | 2400 | ---------- | 2651 | 0317 |
| 2230 | 3021 | 2400 | 1213 | 2652 | 0322 |
| 2231 | 7001 | 2401 | 3210 | 2653 | 0307 |
| 2232 | 6004 | 2402 | 1040 | 2654 | 0305 |
| 2233 | 7100 | 2403 | 7410 | 2655 | 0240 |
| 2234 | 7440 | 2404 | 2210 | 2656 | 0310 |
| 2235 | 5304 | 2405 | 7110 | 2657 | 0317 |
| 2236 | 1037 | 2406 | 7440 | 2660 | 0327 |
| 2237 | 1143 | 2407 | 5204 | 2661 | 0240 |
| 2240 | 3037 | 2410 | 2067 | 2662 | 0311 |
| 2241 | 7430 | 2411 | 3040 | 2663 | 0324 |
| 2242 | 2040 | 2412 | 5614 | 2664 | 0305 |
| 2243 | 2036 | 2413 | 2067 | 2665 | 0315 |
| 2244 | 5227 | 2414 | 2366 | 2666 | 0240 |
| 2245 | 7300 | [20] 2515 | 0000 | 2667 | 0313 |
| 2246 | 1103 | 2516 | 0260 | 2670 | 0311 |
| 2247 | 1033 | 2517 | 0261 | 2671 | 0316 |
| 2250 | 3103 | 2520 | 0262 | 2672 | 0307 |
| 2251 | 7430 | 2621 | 0263 | 2673 | 0240 |
| 2252 | 2104 | 2522 | 0264 | 2674 | 0314 |
| 2253 | 1006 | 2523 | 0265 | 2675 | 0317 |
| 2254 | 7640 | 2524 | 0266 | 2676 | 0326 |
| 2255 | 5540 | 2525 | 0267 | 2677 | 0305 |
| 2256 | 1034 | 2526 | 0270 | 2700 | 0240 |
| 2257 | 1157 | 2527 | 0271 | 2701 | 0315 |
| 2260 | 7710 | 2530 | 0301 | 2702 | 0311 |
| 2261 | 5537 | 2531 | 0302 | 2703 | 0313 |
| 2262 | 6002 | 2532 | 0303 | 2704 | 0305 |
| 2263 | 1106 | 2533 | 0304 | 2705 | 0240 |
| 2264 | 1160 | 2534 | 0305 | 2706 | 0316 |
| 2265 | 3106 | 2535 | 0306 | 2707 | 0301 |
| 2266 | 1106 | 2536 | 0212 | 2710 | 0316 |
| 2267 | 6001 | 2537 | 0305 | 2711 | 0240 |

See footnotes at end of table.

TABLE V.—MEMORY LOCATION/CONTENTS—Continued

| ML | C | ML | C | ML | C |
|---|---|---|---|---|---|
| 2712 | 0317 | 2775 | 0307 | 3060 | 0003 |
| 2713 | 0302 | 2776 | 0317 | 3061 | 0341 |
| 2714 | 0317 | 2777 | 0316 | 3062 | 0027 |
| 2715 | 0305 | 3000 | 0240 | 3063 | 0132 |
| 2716 | 0240 | 3001 | 0330 | 3064 | 0067 |
| 2717 | 0320 | 3002 | 0322 | 3065 | 0377 |
| 2720 | 0305 | 3003 | 0301 | 3066 | 0061 |
| 2721 | 0324 | 3004 | 0331 | 3067 | 0332 |
| 2722 | 0305 | 3005 | 0240 | 3070 | 0364 |
| 2723 | 0322 | 3006 | 0331 | 3071 | 0230 |
| 2724 | 0240 | 3007 | 0317 | 3072 | 0267 |
| 2725 | 0321 | 3010 | 0313 | 3073 | 0260 |
| 2726 | 0325 | 3011 | 0305 | 3074 | 0171 |
| 2727 | 0305 | 3012 | 0240 | 3075 | 0264 |
| 2730 | 0305 | 3013 | 0332 | 3076 | 0343 |
| 2731 | 0316 | 3014 | 0305 | 3077 | 0312 |
| 2732 | 0240 | 3015 | 0302 | 3100 | 0274 |
| 2733 | 0322 | 3116 | 0322 | 3101 | 0265 |
| 2734 | 0317 | 3017 | 0301 | 3102 | 0053 |
| 2735 | 0307 | 3020 | 0240 | 3103 | 0275 |
| 2736 | 0305 | 3021 | 0261 | 3104 | 0215 |
| 2737 | 0322 | 3022 | 0262 | 3105 | 0071 |
| 2740 | 0240 | 3023 | 0263 | 3106 | 0061 |
| 2741 | 0323 | 3024 | 0264 | 3107 | 0363 |
| 2742 | 0325 | 3025 | 0265 | 3110 | 0044 |
| 2743 | 0307 | 3026 | 0266 | 3111 | 0372 |
| 2744 | 0301 | 3027 | 0267 | 3112 | 0360 |
| 2745 | 0322 | 3030 | 0270 | 3113 | 0044 |
| 2746 | 0215 | 3031 | 0271 | 3114 | 0176 |
| 2747 | 0212 | 3032 | 0260 | 3115 | 0254 |
| 2750 | 0324 | 3033 | 0272 | 3116 | 0321 |
| 2751 | 0301 | 3034 | 0255 | 3117 | 0256 |
| 2752 | 0302 | 3035 | 0273 | 3120 | 0201 |
| 2753 | 0314 | 3036 | 0254 | 3121 | 0211 |
| 2754 | 0305 | 3037 | 0256 | 3122 | 0163 |
| 2755 | 0240 | 2040 | 0257 | 3123 | 0131 |
| 2756 | 0325 | 3041 | 0225 | 3124 | 0007 |
| 2757 | 0316 | 2042 | 0120 | 3125 | 0372 |
| 2760 | 0303 | 3043 | 0306 | 3126 | 0373 |
| 2761 | 0314 | 3044 | 0113 | 3127 | 0011 |
| 2762 | 0305 | 3045 | 0005 | 3130 | 0220 |
| 2763 | 0240 | 3046 | 0270 | 3131 | 0126 |
| 2764 | 0326 | 3047 | 0152 | 3132 | 0056 |
| 2765 | 0311 | 3050 | 0251 | 3133 | 0103 |
| 2766 | 0303 | 3051 | 0275 | 3134 | 0351 |
| 2767 | 0324 | 3052 | 0274 | 3135 | 0264 |
| 2770 | 0317 | 3053 | 0213 | 3136 | 0171 |
| 2771 | 0322 | 3054 | 0107 | 3137 | 0377 |
| 2772 | 0240 | 3055 | 0261 | 3140 | 0032 |
| 2773 | 0327 | 3056 | 0322 | | |
| 2774 | 0301 | 3057 | 0112 | | |

Notes to Table V refer to the number at the left of certain entries in the program, and are as follows:

1 The block of addresses from 0000 to 0167 contains constants, variables, and temporary storage locations used in the program. The initial contents are given; these may change during the execution of the program.

2 The block of addresses from 0230 to 0274 contains the program for computing the syndromes $S_j$.

3 The block of addresses from 0275 to 0324 contains the program for loading the $e$ by $e+1$ matrix with the computed syndromes.

4 The block of addresses from 0325 to 0576 contains the program for operating on the syndrome matrix.

5 The block of addresses from 0577 to 0641 contains the program for calculating the $\sigma_i$.

6 The block of addresses from 0642 to 0720 contains the program for determining the error locators.

7 Address 0740 is the actual program starting location, and contains the command IOF to turn off the program interrupt facility. The addresses from 0740 to 0772 contain the initial steps in the program. The HLT commands in locations 0753 and 0757 stop the program to permit the operator to insert the valves of $c$ and $e$, respectively. The program continues by computing and storing the values of $\alpha^{-i}$ in the inverse table. The location of the first address in the inverse table is 2012, stored in location 0772.

8 The block of addresses from 1000 to 1020 contains a read-in mode loader program, corresponding to the RIM loader program for the PDP8 and normally stored in location 7756 through 7777. This program is used to load a program on paper tape.

9 The block of addresses from 1021 to 1107 contains the program interrupt subroutine for servicing interrupt requests.

10 The block of addresses from 1110 to 1175 contains the program for generating the symmetric functions of the $\epsilon_i$.

11 The block of addresses from 1176 to 1366 contains the program for computing the message errors.

12 The block of addresses from 1377 to 1410 contains the program for rechecking the syndromes.

13 The block of addresses from 1411 to 1440 contains the program for actually correcting the message.

14 The block of addresses from 1530 to 1563 contains the program for checking the decoded message with a known sample message, and can be omitted if that feature is not desired.

15 The block of addresses from 1564 to 1572 contains a program that comprises an excessive error subroutine.

16 The block of addresses from 1573 to 1746 contains a program that prepares the decoded message for printing in base 16 numbers on the teletypewriter.

17 The location 2000 contains the command 5601, or JMPIY, where the jump is to location 1 on the same page, or 2001. Location 2001 contains the full address 0740 of the first program command.

18 The block of addresses from 2011 to 2207 contains the program for constructing the inverse table, and preparations for the actual decoding routine beginning at address 2200.

19 The block of addresses from 2210 to 2414 contains a program for collecting statistics on the number of bits per error-free interval of operation of the decoder.

20 The block of addresses from 2515 to 3140 contains a correctly encoded sample message for use in the tests described above; this message can be omitted if desired.

The following storage assignments are implicit in the above program, and need not be entered: The plural message input-output buffer begins at locations 6004 and continues to 7777. The matrix is stored in a block beginning with 3743. The syndromes are stored in a block beginning with 3243. The error corrections are stored in a block beginning with 3243. The inverse table begins at location 3343.

As has previously been described, the set of coded messages at redundancy $c$ (where $c$ is the number of check symbols) consists of all sequences $B_0 \ldots, B_{n-1}$ of elements of the finite field with $n+1=p^m$ elements (where $p$ is any prime number, $m$ any positive integer), which satisfy the following $c$ simultaneous linear equations:

$$(4a) \qquad \sum_{i=0}^{n-1} B_i \alpha^{ij} = 0, \text{ where } j=0, 1, \ldots (c-1)$$

(Equation $4a$ is essentially Equation 4 above, with $n=2^m$ and $2e=c$).

Here $\alpha$ is a primitive element of the finite field and $c$ is a positive integer; it will be recalled that if any $e$ of the symbols $B_i$ of a received message are in error, the decoding procedure will correctly recover the message provided $e \leq c/2$.

The encoding consists of computing, for any given sequence $B_0, \ldots, B_{(n-c-1)}$ of $n-c$ data symbols, $c$ check symbols $B_{n-c}, \ldots B_{n-1}$, so that the resulting block $B_0, \ldots, B_{n-1}$ of $n$ symbols satisfies Equations $4a$. In order to do this, the encoder uses $n-c$ elements $d_{c,0}, d_{c,1}, \ldots, d_{c,(n-c-1)}$ of the finite field—we shall say presently how these are obtained—and computes the check symbols as follows:

$$(24) \qquad B_i = d_{c,(n-c-1)} B_{(i-1)} + d_{c,(n-c-2)} B_{(i-2)} + \ldots d_{c,0} B_{i-(n-c)}$$
$$i=(n-c), (n-c+1), \ldots (n-1)$$

Thus, $B_{n-c}$, the first check symbol, is computed as a linear combination of the given $n-c$ data symbols; then $B_{(n-c+1)}$, the second check symbol, is computed as the same linear combination of data symbols shifted over one, with the first check symbol replacing the last data symbol. The first message symbol $B_0$ may be transmitted at this point, since it is no longer needed for the encoding. Computing with shifted symbols continues in the same manner; after each computation, another message symbol may be transmitted and the last computed check symbol used in computing the next. The finite field arithmetic unit 9 is especially adapted for these computations by reason of its capability for high speed addition and multiplication.

As will appear, the coefficients $d_{c,i}$ necessary for the encoding in accordance with Equation 24 are functions of $c$ and $\alpha$, but not of the message content. Accordingly, once a value of $c$ has been assigned, the coefficients are computed, and are kept fixed as long as the value of $c$ is not changed. This feature has been incorporated so that, with a very small amount of additional program—and a reurn link from receiver to transmitter—the amount of redundancy, and thereby the error-correcting capability, may be varied automatically by the coder-decoder monitoring the number of errors that occur as the channel characteristics vary with time.

We will first present an efficient procedure for the computation of the encoding coefficients $d_{c,i}$. We will then indicate how it may be proved by routine methods that the correct message set is obtained by encoding in accordance with Equation 24.

Auxiliary quantities $$b_{c,i}^{(j)}$$

are used, where $j=0, 1, \ldots (n-c-1)$ and $i=0, 1, \ldots (n-c)$. We set $$b_{c,0}^{(j)}$$

$=1$, $j=0, 1, \ldots (n-c)$, and $$b^{(j)}_{c,i}=0$$

for $j=0, 1, \ldots (i-1)$ and $i=1, 2, \ldots, (n-c)$. The iterative relation $$(25) \qquad b^{(j+1)}_{c,i}=b^{(j)}_{c,i}+\alpha^{(c+j)}b^{(j)}_{c,(i-1)}, \; i\leq j+1$$

is used as follows. First, with $j=0$, $$b^{(1)}_{c,1}=b^{(0)}_{c,1}+\alpha^c b^{(0)}_{c,0}=0+\alpha^c.1=\alpha^c$$

$$(b^{(1)}_{c,i}=0 \text{ for } i=2, \ldots (n-c), \text{ as noted above})$$

$$b^{(2)}_{c,1}=b^{(1)}_{c,1}+\alpha^{c+1}b^{(1)}_{c,0}=\alpha^c+\alpha^{c+1}+1=\alpha^c+\alpha^{c+1}$$

$$(b^{(2)}_{c,i}=0 \text{ for } i=3, \ldots (n-c) \text{ as noted above})$$

$$b^{(3)}_{c,1}=b^{(2)}_{c,1}+\alpha^{c+2}b^{(2)}_{c,0}=\alpha^c+\alpha^{c+1}+\alpha^{c+2}.1=\alpha^c+\alpha^{c+1}+\alpha^{c+2}$$

$$b^{(3)}_{c,2}=b^{(2)}_{c,2}+\alpha^{c+2}b^{(2)}_{c,1}=\alpha^{c+1}\alpha c+\alpha^{c+2}(\alpha^c+\alpha^{c+1})$$
$$=\alpha^{c+1}\alpha^{c+}\alpha^{c+2}\alpha^{c+}\alpha^{c+2}\alpha^{c+1}$$

$$b^{(3)}_{c,3}=b^{(2)}_{c,3}+\alpha^{c+2}b_{c,\,2=0}+\alpha^{c+2}\alpha^{c+1}\alpha^c=\alpha^{c+2}\alpha^{c+1}\alpha^c$$

$$(b^{(3)}_{c,i}=0 \text{ for } i=4, \ldots, n-c \text{ as noted above})$$

$$b^{(4)}_{c,1}=b^{(3)}_{c,1}+\alpha^{c+3}b_{c,0}=\alpha^c+\alpha^{c+}{}_1+\alpha^{c+2}+\alpha^{c+3}.1$$
$$=\alpha^c+\alpha^{c+1}+\alpha^{c+2}+\alpha^{c+3}$$

and so forth. It will be seen that after $n-c$ steps (involving a total of very nearly $(n-c)^2/2$ adds and multiplies) we have $$b^{(n-c)}_{c,1}=\alpha^c+\alpha^{c+}{}_1+ \ldots +\alpha^{n-1}$$

$$b^{(n-c)}_{c,2}=\alpha^c\alpha^{c+1}+\alpha^c\alpha^{c+2}+ \ldots +\alpha^{n-2}\alpha^{n-1}$$

$$b^{(n-c)}_{c,n-c}=\alpha^c\alpha^{c+1} \ldots \alpha^{n-c}$$

We set $$(26) \qquad d_{c,i}=\frac{(-1)^{i+1}b^{(n-c)}_{c,i}}{b_{c,\,{n-c \atop n-c}}}, \; i=1, \ldots, (n-c-1)$$

and $$(27) \qquad d_{c,0}=-1$$

It is straightforward to check that sequences $B_i$, $i=0, 1, \ldots, (n-1)$, generated in accordance with Equations 24 by means of the coefficients of Equations 26 and 27 satisfy the Equations 4*a*. The sequences generated in this way clearly form an $(n-c)$—dimensional subspace of the $n$-dimensional vector space of all sequences of length $n$ of elements of the finite field. On the other hand, it is not difficult to show that the $c$ Equations 4*a* are linearly independent (any $c$ columns of the coefficient matrix $\alpha^{ij}$ form a Vandermonde matrix in distinct entries, so these columns are linearly independent) and hence have a solution space of dimension $n-c$. If follows that all the desired code sequences and only those are generated by means of Equations 24 with the coefficients given by Equations 26 and 27.

It should be mentioned in conclusion that the foregoing method of generating the encoding coefficients—which are fixed as long as $c$ is fixed—and using them to accomplish the encoding takes advantage of the high speed multiply-and-add capability of the finite field arithmetic unit 9 to provide a high degree of adjustability, in that the amount of redundance may readily be varied, either by external intervention or under program control. However, in the modulo 2 case, for example, a fixed redundancy encode-only device could be made using only mod-2 addition and shifting along with a very modest amount of control circuitry for each bit of each check symbol is in fact just the modulo 2 sum of certain of the bits of the data symbols.

The manner in which the apparatus of our invention can be programmed for encoding will be apparent from the preceding description. However, there follow in Tables VI and VII examples of suitable programs for generating the coding coefficients and coding a stored message suitable for decoding with the decoding program given above.

TABLE VI.—PROGRAM FOR GENERATING CODING COEFFICIENTS

| Memory location | Contents | Memory location | Contents |
|---|---|---|---|
| 0060 | 3001 | 4423 | 3066 |
| 0061 | 4000 | 4424 | 1062 |
| 0062 | 7501 | 4425 | 3067 |
| 0063 | 3001 | 4426 | 7000 |
| 0064 | 0073 | 4427 | 1065 |
| 4400 | 1061 | 4430 | 6365 |
| 4401 | 3071 | 4431 | 1066 |
| 4402 | 2071 | 4432 | 3071 |
| 4403 | 7001 | 4433 | 1067 |
| 4405 | 3073 | 4434 | 3072 |
| 4406 | 1062 | 4435 | 7000 |
| 4407 | 3072 | 4436 | 1471 |
| 4410 | 3471 | 4437 | 3073 |
| 4411 | 2071 | 4440 | 2071 |
| 4412 | 2072 | 4491 | 1471 |
| 4413 | 5207 | 4442 | 6004 |
| 4414 | 3461 | 4443 | 3471 |
| 4415 | 1064 | 4444 | 2072 |
| 4416 | 6375 | 4445 | 5236 |
| 4417 | 5260 | 4446 | 2065 |
| 4420 | 1060 | 4447 | 2067 |
| 4421 | 3065 | 4450 | 5227 |
| 4422 | 1061 | 4451 | 7402 |

TABLE VII.—ENCODING PROGRAM

| Memory location | Contents | Memory location | Contents |
|---|---|---|---|
| 1100 | 3001 | 4013 | 6375 |
| 1101 | 3000 | 4014 | 1306 |
| 1102 | 4000 | 4015 | 3313 |
| 1103 | 1112 | 4016 | 3312 |
| 1104 | 1105 | 4017 | 1711 |
| 1105 | 0000 | 4020 | 6004 |
| 1106 | 7501 | 4021 | 3312 |
| 1107 | 7700 | 4022 | 2311 |
| 4000 | 1300 | 4023 | 2313 |
| 4001 | 6407 | 4024 | 5217 |
| 4002 | 1301 | 4025 | 1304 |
| 4003 | 3310 | 4026 | 6375 |
| 4004 | 1307 | 4027 | 1312 |
| 4005 | 3314 | 4030 | 6004 |
| 4006 | 1310 | 4031 | 3711 |
| 4007 | 3311 | 4032 | 2310 |
| 4010 | 1302 | 4033 | 2314 |
| 4011 | 6365 | 4034 | 5206 |
| 4012 | 1303 | 4035 | 7402 |

While we have described our invention with respect to the details of a particular embodiment thereof, useful both for coding and decoding and involving as an element a conventional digital computer, it will be apparent to those skilled in the art that if so desired the apparatus could be used as a coder alone or as a decoder alone. Of course, no structural changes would be required to use the decoder as a coder. However, a considerably smaller unit could be made if it were desired to code only. It will also be apparent that the apparatus is suitable for other computing purposes in which a large number of iterative finite field multiplications and additions are needed. Other changes and variations will occur to those skilled in the art upon reading our description, and such may obviously be made without departing from the scope of our invention.

Having thus described our invention, what we claim is:

1. In combination with an internally programmed digital computer having an input/output bus and means for exchanging data on said bus with a set of external devices connected to the bus, an arithmetic unit comprising a finite field multiplier responsive to two applied $m$-bit digital signals for producing an $m$-bit digital output signal equal to the finite field product of said applied signals, a finite field adder having first and second sets of $m$ input terminals for receiving two $m$-bit digital signals and $m$ output terminals, said adder being responsive to signals applied to said input terminals to produce an $m$-bit output signal on said output terminals equal to the modulo two sum of the signals applied to said input terminals, said first set of input terminals being connected to said multiplier to receive said multiplier output signal, means for connecting the second set of input terminals of said adder to said input/output bus, an $m$-bit register, gate means for transferring the output signal from said adder to said register, means for applying the contents of said register as one $m$-bit input signal to said multiplier, means connected to said input/output bus for supplying a second signal to said multiplier, and gate means for transferring the contents of said register to said input/output bus.

2. Apparatus of the class described, comprising an $m$-bit register having $m$ input terminals and $m$ output terminals, a finite field multiplier having two sets of $m$-bit input terminals and a set of $m$-bit output terminals interconnected by a multiplicity of gates arranged in a parallel arithmetic array for producing on said output terminals within the settling time of the gates and without iterative processing an $m$-bit signal equal to the finite field product of the signals applied to said input terminals, a finite field adder having two sets of $m$-bit input terminals and a set of $m$-bit output terminals interconnected by a multiplicity of gates arranged in a parallel arithmetic array for producing on its output terminals within the settling time of the gates and without iterative processing an $m$-bit signal equal to the modulo two sum of the signals applied to its input terminals, the output terminals of said adder being connected to the input terminals of said register, one set of input terminals of said adder being connected to the output terminals of said multiplier, and one set of input terminals of said multiplier being connected to the output terminals of said register.

3. The apparatus of claim 2, further comprising an internally programmed digital computer having a data exchange bus, whereby digital signals can be exchanged between the computer and a device connected to the bus, means connecting the second sets of input terminals of said adder and said multiplier to said bus, and means connecting the output terminals of said register to said bus.

4. In apparatus for decoding digital signals expressed in an error correcting code of the class comprising blocks of $n$ symbols or which $2e$ are error correcting symbols and $n-2e$ are data symbols and an error free code block is one in which $$\sum_{i=0}^{2m-2} B_i\alpha^{ij}=0, j=0, 1, \ldots, (2e-1)$$

where $i$ and $j$ are integers, the $B_i$ are $m$-bit symbols in the code, and $\alpha$ is a primitive element of the $m$-bit finite field such that any element N of the field can be expressed as $$N=\sum_{i=0}^{m-1} y_i\alpha_i$$

where the $y_i$ are 1 or 0, a finite field arithmetic unit including a register for storing an $m$-bit signal B and circuit means including a multiplicity of gates interconnected in a parallel arithmetic array for producing within the settling time of the gates and without iterative processing a $m$-bit digital output signal $AB+C$ in response to two applied signals A and C, means for transferring the output signal of said circuit means to said register, means for applying digital signals A and C to said arithmetic unit, means for applying a signal stored in said register to said circuit means as the signal B and means for storing the digital signals produced by said arithmetic unit.

5. A decoder, comprising means for registering a received message comprising an $n$-symbol block of $m$-bit symbols $B_i^1$ including $2e$ check symbols selected to make each value $S_j$ of $$S_j=\sum_{i=0}^{2m-2} B_i\alpha^{ij}=0, \text{ for } j=0, 1, \ldots (2e-1)$$

where $\alpha$ is the primitive element of an $m$-bit finite field and $B_i^1=B_i$ unless errors have occurred, means for computing the numbers $$S_j=\sum B_i'\alpha^{ij} \text{ for } j=0, 1, \ldots (2e-1)$$

means interconnected with said computing means for storing said computed numbers, means for computing from said stored numbers the error symbols $V_i$ which added modulo 2 to any erroneous symbols $B_i^1$ will produce the original symbols $B_i$, and means for adding the computed error symbols $V_i$ to the erroneous symbols $B_i^1$ to produce a sequence of corrected message symbols.

6. In combination with an internally programmed digital computer having an addressable memory, a finite field arithmetic unit for evaluating expressions of the class including polynomials of the form $$\sum_{i=0}^{n}\sum_{j=0}^{m} a_ib_j$$

where $i$ and $j$ may progress by integral or multiple increments from an initial value to a terminal value, said arithmetic unit comprising, in combination, a finite field adder including a multiplicity of gates interconnected in a parallel arithmetic array for producing within the settling time of the gates and without iterative processing an output signal equal to the modulo 2 sum of two applied input signals, a finite field multiplier including a multiplicity of gates interconnected in a parallel arithmetic array for producing within the settling time of the gates and without iterative processing an output signal equal to the finite field product of two applied input signals, means for connecting said multiplier to said adder to apply the output signal of said multiplier as one input signal to said adder, a result register, gate means operable to supply the output signal of said adder to said result register, means for applying the signal stored in said result register as one input signal to said multiplier, means controlled by said computer for supplying second input signals to said adder and to said multiplier, and gate means operable to apply a signal to said computer in accordance with the contents of said result register.

7. Apparatus of the class described comprising an internally programmed digital computer having an addressable memory, a memory address register, a memory buffer register, and an accumulator register, logic circuit means having $3m$ input terminals and $m$ output terminals for producing on said output terminals an $m$-bit digital output signal $A\cdot B+C$ in response to three $m$-bit digital signals A, B and C applied to said input terminals, an $m$-bit result register, gate means connected between said logic circuit means and said result register and operable to store said output signal in said result register, means for applying the signal stored in said register to said logic circuit means as said signal B, means connecting said memory address register to said logic circuit means to supply the signal C, means connecting said memory buffer register to said logic circuit means to supply the signal A, gate means operable to store the contents of said result register in said accumulator register, an auxiliary address register, register control means operable to increment the contents of said auxiliary register by a predetermined amount, a cycle counter, means for loading said address register and said cycle counter from said memory under program control, sequencing means settable to a first and a second state, means controlled by said computer for setting said sequencing means to its first state in response to a programmed instruction, means controlled by said sequencing means in its first state for repeatedly setting the contents of the auxiliary address register into the memory address register, causing the contents of the specified memory location to be placed in the memory buffer register, operating said first recited gate means to store the output signal from said logic circuit means in said result register, and stepping said cycle counter toward a predetermined count, means responsive to storage of a signal in said memory address register for operating said register control means to increment the contents of said auxiliary address register, and means controlled by said cycle counter when said predetermined count is reached for setting said sequencing means to its second state and storing the contents of said result register in said accumulator register.

8. The apparatus of claim 7, further comprising an addressable random access memory, first and second address registers for storing addresses in said memory, bistable means having first an second states and settable by an applied pulse to the state it is not in, means operated by said bistable means in its first state for connecting said first address register to said memory, means operated by said bistable means in its second state for connecting said second address register to said memory, means for sequentially applying pulses to said bistable means, and means for supplying the contents of the memory at the address supplied to the memory to said logic circuit means as the signal C.

9. In coding apparatus for producing coded blocks of $n$ $m$-bit symbols of which $2e$ are error correcting symbols and $n-2e$ are data symbols from $n-2e$ $m$-bit data signals, a random access addressable memory, internally programmed sequencing means for exchanging signals between said memory and external devices connected to said sequencing means, a finite field arithmetic unit including an $m$-bit register for storing an $m$-bit signal B and circuit means connected to said register for producing an $m$-bit digital output signal $A \cdot B + C$ in response to two applied signals A and C and a signal B stored in said register, and means controlled by said sequencing means and said arithmetic unit for computing from a sequence of $n-2e$ data signals stored in said memory the $2e$ $m$-bit error correcting signals which form with the data signals the functions $$S_j = \sum_{i=0}^{2m-2} B_i \alpha^{ij} = 0$$

for $j=0, 1, 2 \ldots (2e-1)_0$

10. The apparatus of claim 9, further comprising means controlled by said sequencing means for storing said computed error correcting signals in said memory adjacent said data signals.

References Cited

UNITED STATES PATENTS

| | | | |
|---|---|---|---|
| 3,278,729 | 10/1966 | Chien | 235—153 |
| 3,291,972 | 12/1966 | Helm | 235—153 X |
| 3,413,599 | 11/1968 | Freiman | 340—146.1 |

MALCOLM A. MORRISON, Primary Examiner

C. E. ATKINSON, Assistant Examiner

U.S. Cl. X.R.

235—153, 164

PO-1050
(5/69)

UNITED STATES PATENT OFFICE
CERTIFICATE OF CORRECTION

Patent No. 3,533,067 Dated October 6, 1970

Inventor(s) Neal Zierler and John Terzian

It is certified that error appears in the above-identified patent and that said Letters Patent are hereby corrected as shown below:

In Column 5, line 14 after "$S_j$" insert -- = --; line 33 change "$S_{2t-1}$" (first occurrence) to --$S_{2t-2}$--; and line 40 change "$x_{2y^{t-2}}$" to --$x_{2y^{t-2}}$--.

In Column 6, line 75 change "but" to --bus--.

In Column 7, line 14 after "A" insert --C--;and line 21 after "lead" insert --AC--.

In Column 10, line 27 change "to" to --the--.

In Column 11, line 41 after C3 change "DCA N" to --DCA Y--.

In Column 12, line 3 change "$0\lambda 0 \lambda 0 \lambda 1 \lambda 1 \lambda 0 \wedge 0$, $1 \lambda 1 \wedge 1$" to --$0 \wedge 0 = 0 \wedge 1 = 1 \wedge 0 = 0$, $1 \wedge 1 = 1$--.

In Column 18, line 3 change "$\overline{ACD0}$" to --$\overline{ADC0}$--; and line 4 change "$\overline{ACD2}$" to --$\overline{ADC2}$--.

In Column 23, line 27 change "$t_4 \alpha^2$" to --$t_4 \alpha^4$--; line 39 change "j=i-z" to --j=1-2--; line 47 change "m-i" to --m-1--; and line 48 change "(2m-2)" (first occurrence) to --(2m-3--.

In Column 25, line 15 delete "through" (third occurrence); line 18 delete "+" after $t_9$ and substitute -- = --; line 22 change "$2\alpha$" to --$\alpha 2$--; and line 23 delete "=" after $\alpha_9$ and substitute --+--.

In Column 26, line 14 change "MB4" to --$\overline{MB4}$--.

In Column 32, line 61 change "(c-2)" to --(c-1)--;line 65 after "6" insert --4--.

In Column 34, line 36 change "accmulator" to --accumulator--; line 38 change "involved" to --involves--; and line 41 change "associate" to --associated--.

PO-1050
(5/69)

UNITED STATES PATENT OFFICE
CERTIFICATE OF CORRECTION

Patent No. 3,533,067 Dated October 6, 1970

Inventor(s) Neal Zierler and John Terzian

It is certified that error appears in the above-identified patent and that said Letters Patent are hereby corrected as shown below:

In Column 35, line 9 insert --now-- after "are"; and line 53 insert --B-- before "register".

In Column 36, line 19 insert -- = -- after "$b_i \alpha^{ij}$" and -- = -- after "$v_k \alpha^{ijk}$".

In Column 38, line 9 change "$S_1S_2$'" to --$S_1S_1$'--; line 10 change "$S_{e+1}$" to --$S_{e+2}$--; and line 15 change "$S_e'' = S_{e+}S_{e-1}'S_1$" to --$S_e'' = S_e+S_{e-1}S_1'$--; and line 24 change "thta" to --that--.

In Column 39, line 26 change "got" to --go--.

In Column 40, line 59 change "fuction" to --function--; line 66 change "$e_t$ 1" to --$e_{t-1}$--; and line 74 change "$S_0 \sigma\frac{(t-1)}{t-2}$" (second occurrence) to --$S_0 \sigma\frac{(t-1)}{t-1}$--.

In Column 43, line 13 change "9023" to --0023--; line 16 change "9242" to --0242--; line 53 change "3932" to --3032--; and line 64 change "6265" to --6365--.

In Column 44, line 64 change "1256" to --1246--.

In Column 45, line 12 change "2020" to --2030--; and line 13 change "5337" to --5327--.

In Column 48, line 58 change "reurn" to --return--.

In Column 51, line 66 change "$B_i{}^1$" to --$B_i$'--; and line 73 change "$B_i$1" to --$B_i$'--.

In Column 52, line 4 change "$B_i$1" to --$B_i$'--; and line 6 change "$B_i$1" to --$B_i$'--.

Signed and sealed this 13th day of July 1971.

(SEAL)
Attest:

EDWARD M.FLETCHER,JR.
Attesting Officer

WILLIAM E. SCHUYLER, JR.
Commissioner of Patents